United States Patent
Liu

(10) Patent No.: US 11,298,663 B2
(45) Date of Patent: Apr. 12, 2022

(54) THIN METAL/CERAMIC HYBRID MEMBRANE SHEET AND FILTER

(71) Applicant: Molecule Works Inc., Richland, WA (US)

(72) Inventor: Wei Liu, Richland, WA (US)

(73) Assignee: Molecule Works Inc., Richland, WA (US)

( * ) Notice: Subject to any disclaimer, the term of this patent is extended or adjusted under 35 U.S.C. 154(b) by 422 days.

(21) Appl. No.: 16/237,166

(22) Filed: Dec. 31, 2018

(65) Prior Publication Data

US 2020/0070102 A1     Mar. 5, 2020

Related U.S. Application Data

(60) Provisional application No. 62/723,821, filed on Aug. 28, 2018.

(51) Int. Cl.
*B01D 53/22*     (2006.01)
*B01D 69/12*     (2006.01)
(Continued)

(52) U.S. Cl.
CPC ........ *B01D 69/122* (2013.01); *B01D 67/0069* (2013.01); *B01D 67/0083* (2013.01);
(Continued)

(58) Field of Classification Search
CPC ............ B01D 67/0088; B01D 2325/06; B01D 63/08; B01D 67/0083; B01D 69/122;
(Continued)

(56) References Cited

U.S. PATENT DOCUMENTS

RE33,273 E  *  7/1990  Speaker ............. B01D 67/0088
                                                          210/500.27
5,186,833 A     2/1993  McHenry et al.
                        (Continued)

FOREIGN PATENT DOCUMENTS

| CN | 104258737 A   | 1/2015  |
|----|---------------|---------|
| WO | 03/024892 A1  | 3/2003  |
| WO | 2006/113179 A2| 10/2006 |

OTHER PUBLICATIONS

Barascu, et al., "Porous Glass Membranes with an Aligned Pore System Via Stretch Forming in Combination with Thermally Induced Phase Separation", ISSN 10876596, Glass Physics and Chemistry, 2015, vol. 41, No. 1, pp. 73-80. © Pleiades Publishing, Ltd., (2015).
(Continued)

*Primary Examiner* — Anthony R Shumate
(74) *Attorney, Agent, or Firm* — The Marbury Law Group, PLLC

(57) ABSTRACT

A thin micro-porous membrane sheet and filtering device using it is presented. The membrane sheet includes a thin porous metal sheet of thickness between 20 and 200 μm with a porous ceramic coating of thickness less than 25 μm on at least one of its surfaces. The porous metal sheet has mean pore sizes at micro and sub-micrometer level and has a surface substantially free of pores greater than 10 micrometers. The ceramic coating layer may be made of particles with a mean particle size in a range of 10 to 300 nm and contains certain sintering promoters. The ceramic coating is sintered with the metal sheet in non-oxidizing environment at lower temperatures than typical ceramic membranes. The thin membrane sheet is used to filter fine particulates from micrometers to nanometers from a liquid or gas stream. The
(Continued)

thin membrane sheet may be assembled into a filter device having high surface area packing density and straight mini-flow channels.

21 Claims, 34 Drawing Sheets

(51) Int. Cl.
 *B01D 67/00* (2006.01)
 *B01D 71/02* (2006.01)
 B01D 63/08 (2006.01)

(52) U.S. Cl.
 CPC ..... *B01D 67/0088* (2013.01); *B01D 67/0095* (2013.01); *B01D 71/022* (2013.01); *B01D 71/024* (2013.01); B01D 63/08 (2013.01); B01D 2325/02 (2013.01); B01D 2325/04 (2013.01); B01D 2325/06 (2013.01)

(58) Field of Classification Search
 CPC ............ B01D 2325/04; B01D 2325/02; B01D 67/0069; B01D 71/022; B01D 71/024; B01D 67/0095
 See application file for complete search history.

(56) References Cited

U.S. PATENT DOCUMENTS

| | | | | |
|---|---|---|---|---|
| 2006/0062982 | A1* | 3/2006 | Cunningham | H01M 50/46 428/220 |
| 2010/0178468 | A1* | 7/2010 | Jiang | C23C 16/45536 428/164 |
| 2011/0284456 | A1* | 11/2011 | Brozell | B01D 71/74 210/500.21 |
| 2011/0297612 | A1* | 12/2011 | Hester | B01D 71/26 210/500.21 |
| 2013/0146521 | A1* | 6/2013 | Brozell | B01D 69/122 210/259 |
| 2014/0151288 | A1* | 6/2014 | Miller | B01D 71/021 210/497.01 |
| 2014/0154464 | A1* | 6/2014 | Miller | B01D 67/0062 428/137 |
| 2015/0056399 | A1* | 2/2015 | Takeoka | B01D 67/009 428/64.1 |
| 2017/0252705 | A1* | 9/2017 | Song | B01D 69/02 |
| 2017/0292189 | A1* | 10/2017 | Edwards | B01D 69/122 |
| 2019/0060841 | A1* | 2/2019 | Liu | B01D 69/10 |
| 2020/0406202 | A1* | 12/2020 | Miyahara | B01D 69/122 |

OTHER PUBLICATIONS

Podchernyaeva, et al., "Protective Coatings On Heat-Resistant Nickel Alloys (Review)", Powder Metallurgy and Metal Ceramics, vol. 39, Nos. 9-10, p. 434-,444 (2000).

Dudnik, et al., Theory and Technology of Sintering Processes,Thermal and Thermochemical Treatment Sintering of Ultradisperse Powders Based on Zirconium Dioxide (Review), Powder Metallurgy and Metal Ceramics, vol. 34, Nos. 5,6, pp. 263-264, (1995).

* cited by examiner

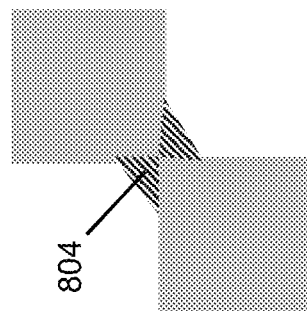
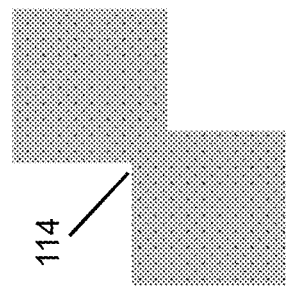
FIG. 8A
FIG. 8B
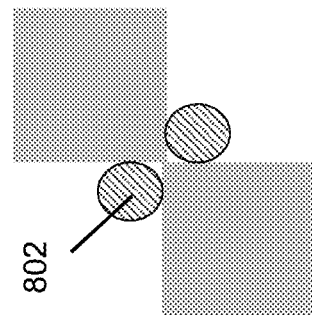
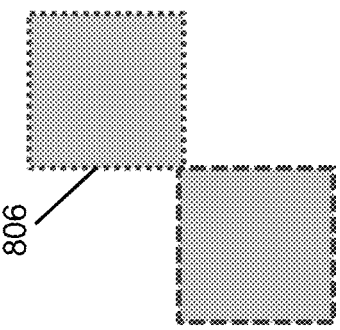
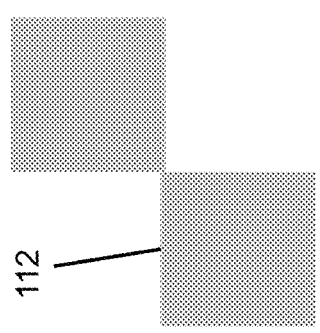

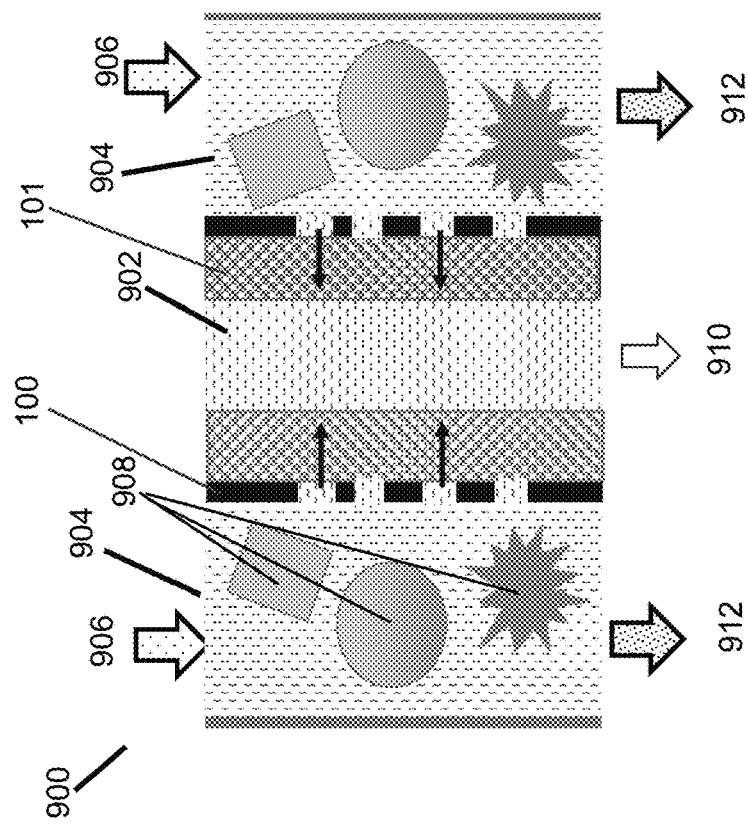
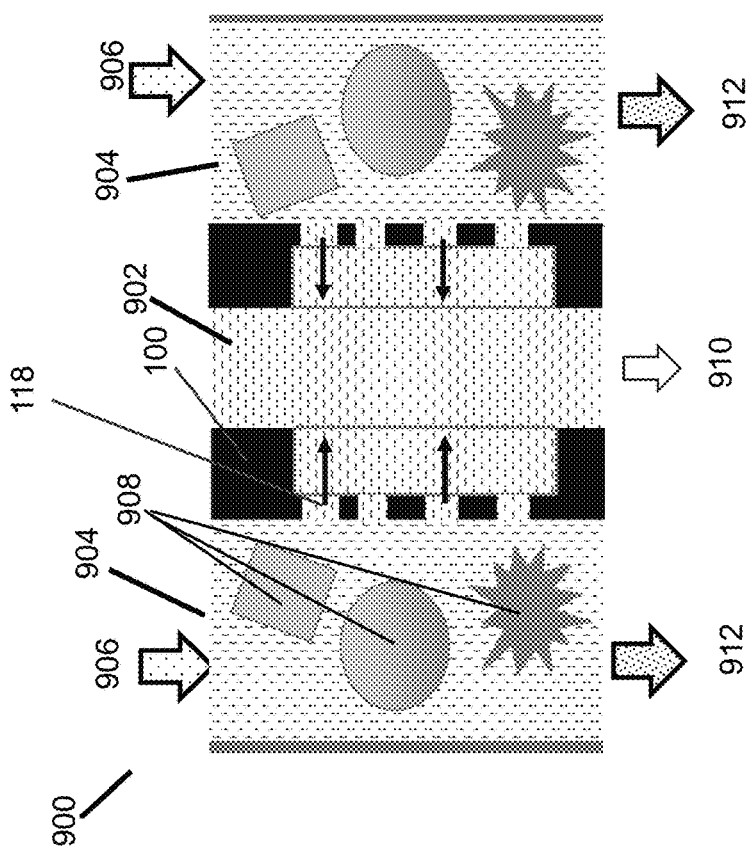
FIG. 9A
FIG. 9B one-layer 200nm YSZ coating

| Spot | Ni | Y | Zr | Hf |
|---|---|---|---|---|
| 1 | 0.036 | 0.111 | 1.0 | 0.006 |
| 2 | 0.035 | 0.110 | 1.0 | 0.007 |
| 3 | 0.037 | 0.111 | 1.0 | 0.007 | one-layer 50nm YSZ coating

| Spot | Ni | Y | Zr | Hf |
|---|---|---|---|---|
| 1 | 0.047 | 0.111 | 1.0 | 0.004 |
| 2 | 0.044 | 0.106 | 1.0 | 0.007 |
| 3 | 0.051 | 0.105 | 1.0 | 0.004 |
| 4 | 0.044 | 0.104 | 1.0 | 0.012 |
| 5 | 0.041 | 0.106 | 1.0 | 0.004 | two-layer 200nm/50nm YSZ coating

| Spot | Ni | Y | Zr | Hf |
|---|---|---|---|---|
| 1 | 0.033 | 0.104 | 1.0 | 0.006 |
| 2 | 0.031 | 0.107 | 1.0 | 0.012 |
| 3 | 0.023 | 0.110 | 1.0 | 0.003 |
| 4 | 0.025 | 0.110 | 1.0 | 0.006 |

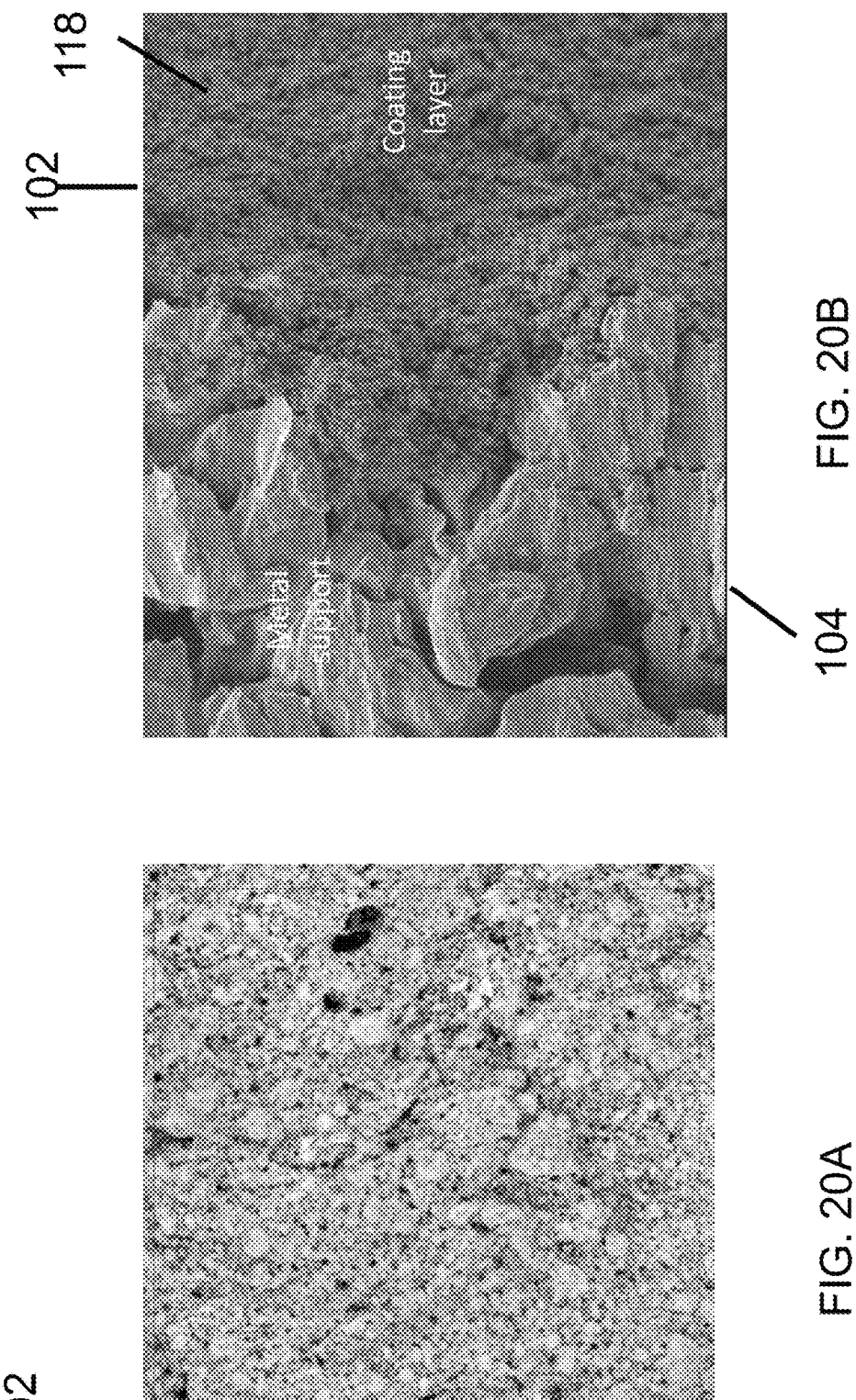

THIN METAL/CERAMIC HYBRID MEMBRANE SHEET AND FILTER

CROSS REFERENCE TO RELATED PATENT APPLICATION

This application claims the benefit of U.S. Provisional Application No. 62/723,821, Aug. 28, 2018, hereby incorporated herein by reference in its entirety.

FIELD OF THE INVENTION

The embodiments of the present invention are generally directed to inorganic membranes and filters, and specifically to thin metal and ceramic membrane sheets for removal of particulates with sizes at or below micrometer level.

BACKGROUND OF THE INVENTION

Membranes and filters are widely used in both industrial processes and consumer products for removal of particulate matters from various liquid or gas fluids. The working principles may be generalized into two categories: i) blocking the particulates outside of the filtering medium and ii) adsorbing the particulates inside pores of the filtering medium. Micro-, ultra-, and nano-filtration membranes (MF, UF, NF) fall into the former category. HEPA (high efficiency particulate air) air filters, high-efficiency particulate absorber, or high-efficiency particulate arresting filters commonly used in buildings today belong to the latter category. Membranes that block particulates on its exterior surface generally can be cleaned and used for long time. In contrast, filtering mediums with the interior pores loaded with particulates are very difficult to be cleaned and reused. Thus, HEPA air filters are typically for once-time usage. A ceramic diesel particulate filter may be regenerated by burning off the combustible soot particulates trapped inside the pores, which consumes significant energy and demands high durability of the filtering material.

MF, UF, and NF membranes, which remove particulates of sizes from micrometer to nano-meter, are an industry of tens of billion US dollar/year market. Basically, bacteria, viruses, and nano-particles, which are harmful to human health, can be removed by these membranes. Most of these membranes used today are made of polymeric materials, particularly for water-related filtration applications at low temperatures (<60° C.). However, these polymeric materials are not stable at high temperatures, not stable in oil and organic solvents, prone to bacteria growth, and mechanically weak. Thus, application of polymeric filters is limited by these intrinsic material properties.

It is desirable to make the membranes out of metallic and ceramic materials for those applications for which the polymeric membrane could not perform or does not perform well. Porous metal and ceramic membrane tubes have been commercialized for many years. The high cost and low membrane area packing density are viewed as hindrance to more widespread application of these products. Producing ceramic and metal membranes with high surface area packing at a competitive cost has been sought by the industry for several decades. The product form of present interest is membrane sheets or plates because a number of identical membrane sheets can be stacked together to address application needs at different scales.

A casting, cutting, and stretching method was studied by Barascu in 2015 to make porous glass plates having pore sizes at 100 nm level out of alkali-borosilicate glasses (Barascu, A; Kullmann, J; Reinhardt, B; Rainer, T; Roggendorf, H; Syrowatka, F; Enke, D. "Porous Glass Membranes with an Aligned Pore System Via Stretch Forming in Combination with Thermally Induced Phase Separation" Glass Physics And Chemistry 41 (2015) 73-80). A method to make large sizes of ceramic membrane plate was disclosed in WO 2003024892 A1 (赵世凯,薛友祥,张 鹤,穆晓艳,曹俊昌,张晓丽 "The method of preparing a thin-walled large-size ceramic membrane of the hollow plate" CN104258737B, Priority date 2014-09-10). The thin-walled hollow ceramic flat membrane is made of $\alpha$-$Al_2O_3$ powder by extrusion and sintering. A modification coating is applied to reduce the membrane surface pore size.

Ceramic materials are brittle and difficult to be made as thin porous sheets. Michael 2005 teaches preparation of thin film ceramic membranes by laminating a thin electrolyte layer with a thicker ceramic layer that forms a network of support ribs (Michael J. Day; Todd G. Lesousky; Matthew M. Seabaugh; Katarzyna Sabolsky "Self-supporting ceramic membranes and electrochemical cells and electrochemical cell stacks including the same" WO2006113179A2. Original Assignee: Nextech Materials, Ltd; Priority date 2005-04-19). A composite membrane concept consisting essentially of a microporous ceramic layer deposited on a porous metal support having a first surface and a second surface was disclosed by McHenry (James A. McHenry, Harry W. Deckman, Wen-Yih F. Lai, Michael G. Matturro, Allan J. Jacobson, Jack W. Johnson "Composite metal-ceramic membranes and their fabrication" U.S. Pat. No. 5,186,833A, Current Assignee: ExxonMobil Research and Engineering Co; 1991-10-10). However, the literature does not teach a ceramic/metal composite membrane structure that does not crack and does not delaminate. Because the ceramic material often has different thermal expansion coefficient from the metallic material, membrane defects, such as cracks and deformation, readily occur when the composite is subject to heating and cooling. Adhesion is another challenge. Because it is difficult to form a stable bonding between the ceramic and metallic materials, the membrane coating layer often delaminates or separates from the support.

Some fundamental material issues with coating of ceramics onto the metal were delineated in a review by Podchernyaeva 2000 (A. Podchernyaeva, A. D. Panasyuk, M. A. Teplenko, and V. I. Podol'skii "Protective Coatings on Heat-Resistant Nickel Alloys" Powder Metallurgy and Metal Ceramics, 39 (2000) 434-444). Ceramic materials require high temperatures for sintering. For example, sintering zirconia materials requires temperatures above 1000° C. (E. V. DudnikZ. A. ZaitsevaA. V. ShevchenkoL. M. Lopato. "Sintering of ultradisperse powders based on zirconium dioxide (review)" Powder Metallurgy and Metal Ceramics, Vol 34 (1995) 263-271). At such high sintering temperatures, the porous metallic support structure tends to degrade or deform. Another complicated factor is removal of organic additives in the ceramic coating layer, which are introduced by the coating process. For pure ceramic membranes, the organic additives can be burned out by sintering in air or an oxidizing gas environment. However, the metal will be oxidized under such conditions. The metallic structures can be destroyed or made fragile due to oxidation of the metallic grains.

SUMMARY OF THE INVENTION

An embodiment of the thin ceramic/metal sheet membrane 100 is depicted in FIG. 1. A ceramic membrane layer 102 is deposited on a porous thin (20-200 µm) metal support sheet 104 as an ultrathin (<~25 µm), uniform, stable film. To make such a membrane coating 102, the surface of the support sheet 104 to be coated is preferably substantially free of pores or holes greater than 10 µm. The microstructure of the coating/support interface 108 is illustrated in FIG. 2. The ceramic coating 102 is made of ceramic particles 112 bonded each other. The pores 118 in the ceramic coating 102 are formed among the ceramic particles 112. The particle size is less than the support pore size so that some ceramic particles 112 may enter into pores 116 of the support 104. Sintering of the ceramic particles to obtain neck-to-neck bonding 114 is desirable for a stable membrane with strong adhesion on the support. A coating layer 102 without enough sintering would just be a loose layer of particle deposits that can be blown or washed away. Sintering of the particles 112 inside the support pores 116 with the particles 112 outside of the support pores 116 enables the ceramic membrane coating layer 102 to be locked into the support pores 116. As a result, strong membrane adhesion onto the support 104 is obtained even if there is no or little chemical bonding between the support 104 and the ceramic coating 102. The ceramic particle size should be small enough that the ceramic particles 112 can be sintered at temperatures without causing significant damage to the support structure 104. In general, the sintering temperature requirement increases with the particle size. The particle sizes of the present invention are preferably 300 nm on average or below. The membrane pore size decreases with size of the particles 112 used for coating. That is, smaller particle sizes can be used to produce a membrane 102 of smaller pores.

Thinness of the support sheet 104 is one desirable membrane feature, because a thin support sheet 104 reduces material usage and manufacturing cost, increases permeance, and enables assembly of membrane filters with high membrane area packing density. On the other hand, adequate thickness of the membrane sheet 100 is needed to have enough mechanical strength for handling the membrane sheet 100 and for the filtering application. The thickness of the present embodiment is preferably between about 20 to about 200 µm.

The ceramic coating layer thickness 110 above the support surface is preferably less than about 25 µm. If the membrane layer 102 is too thick, cracks and delamination can occur during membrane drying and/or sintering, because significant chemical and mechanical stress can be generated during drying, sintering or usage. The penetration depth 106 of the membrane material into the support pore 116 is preferably less than 10 µm. Deeper penetration can generate significant stress that results in membrane 102 failures because the ceramic particles 112 and metallic support 104 can have very different physical and chemical properties.

BRIEF DESCRIPTION OF THE DRAWINGS

FIGS. 8A and 8B are flow diagrams illustrating methods of sintering enhancement.

FIGS. 9A and 9B are a schematic illustration illustrating the operation of filter comprising flat sheet membranes in two different types of configurations.

FIG. 15A, Ni–YSZ; FIG. 15B, Ni+Mn–YSZ and FIG. 15C, LiSi–YSZ.

FIGS. 20A and 20B are micrographs illustrating the surface texture and the cross section of a fractured sheet with ceria coating, respectively.

DETAILED DESCRIPTION OF THE INVENTION

Figure 3B:
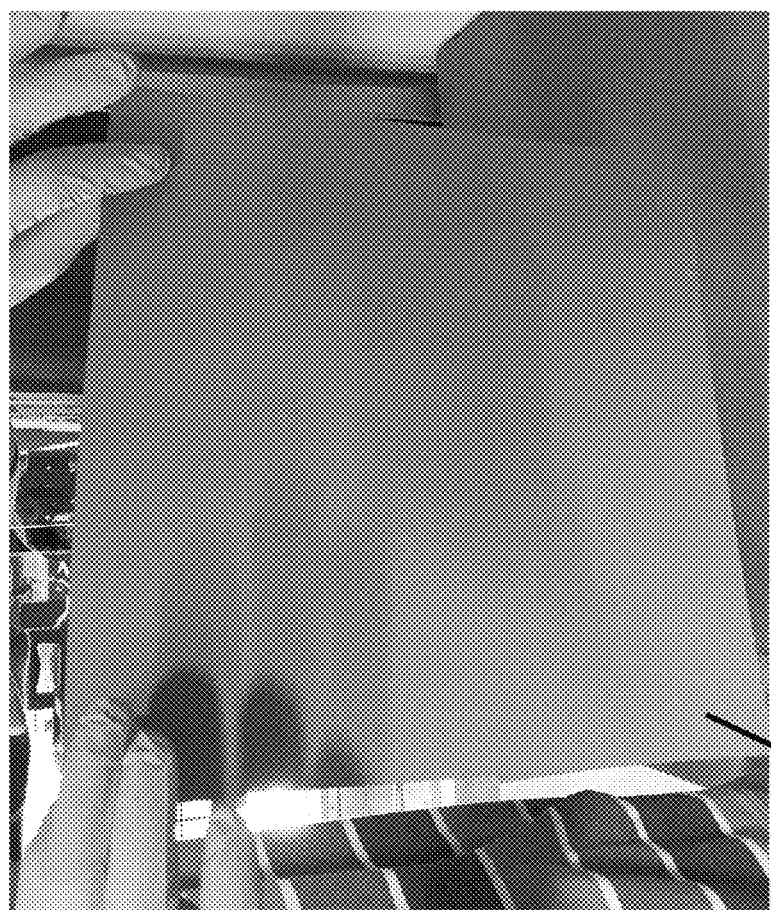
FIGS. 3A and 3B are photographs illustrating the morphology of a ceramic/metal sheet membrane according to an embodiment.
Figure 3A:
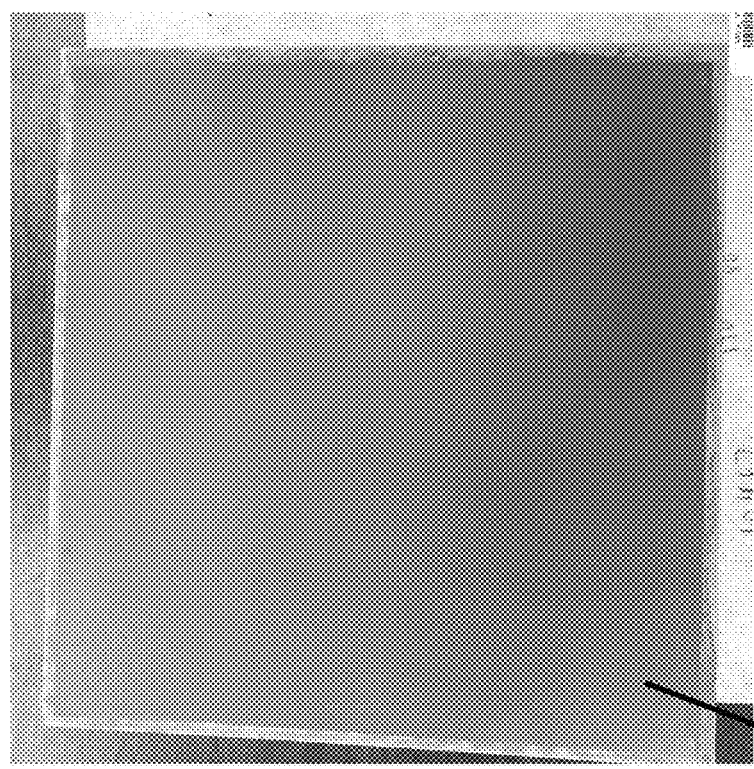

Morphologies of thin porous-metal support sheets 104 of present embodiments herein with and without a ceramic membrane coating are illustrated with a 21 cm×21 cm×50 μm thick porous nickel alloy sheet 104 in FIGS. 3A and 3B, respectively. The flat metal sheet 104 has a uniform, smooth surface for deposition of the ceramic membranes 102. The thin flat metal sheet 104 provides both mechanical rigidity and ductility so that it stays flat during various handling processes. The metal support 104 must maintain mechanical integrity of the membrane sheet 100 during preparation of the ceramic membranes 102, when the membrane sheet 100 is packaged into a filter, and under application conditions. Preparation of the ceramic membrane 104 typically requires high-temperature sintering. Thus, the metal support 104 should have enough thermal stability. The ceramic/metal membrane 100 may be used for filtration of various gases and liquid fluid. The metal support 104 should have adequate chemical stability. Precious metals, such as Pt, Pd, Rh and their alloys, possesses those properties but are expensive. Inexpensive metallic materials, such as Ni, nickel alloy, titanium, steel, and stainless steel, are preferred for most practical applications. From the point of view of reducing material usage, increasing permeance, and increasing membrane area packing density in a membrane module or filter, the support sheet thickness should be as thin as possible. On the other hand, the support sheet 104 should have adequate strength for membrane processing and for applications. The thickness of the support sheet 104 of present embodiment is preferably about 20 to 200 μm. A support sheet 104 of such thickness can be manufactured at high throughput and low costs, while providing enough strength and permeance for most practical applications.

Figure 3C:
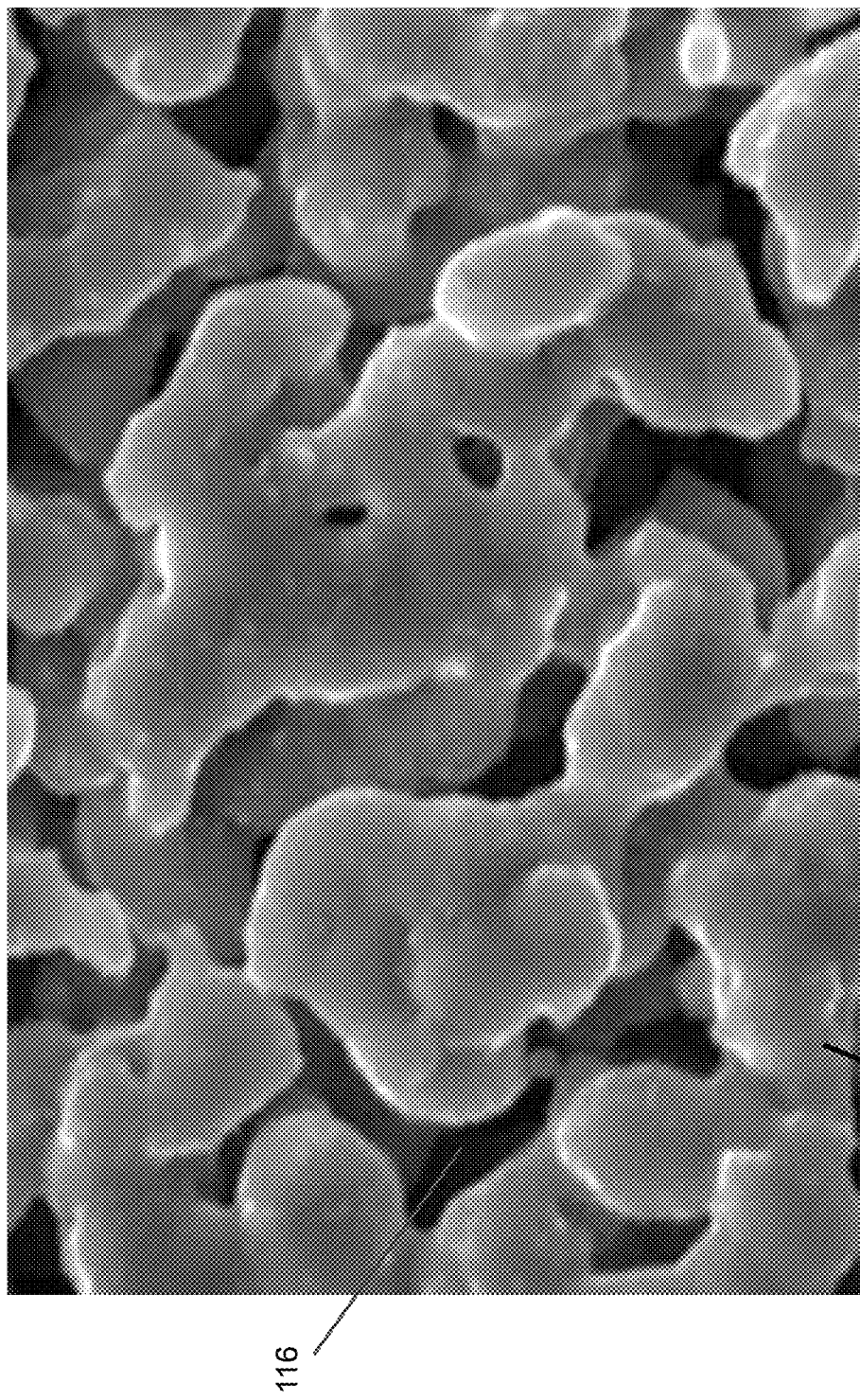
FIG. 3C is a micrograph illustrating the surface texture and pore size of a thin porous metal support sheet according to an embodiment.

The porous metal sheet 104 of present embodiment has uniform pores 116 of sizes at micro- and sub-micrometer level. FIG. 3B shows no visible holes or pores. The microporous structures of the support sheet 104 can be analyzed with scanning electron microscopy (SEM). FIG. 3C shows representative structures (10,000× magnification) of the thin porous metal sheet 104 of the present embodiment. Metallic grains 120 of micrometer sizes are sintered neck-to-neck to form networked pores/voids 116 throughout the metal support sheet 104. The metallic grain and pore sizes appear uniform. Rough pores or defects at tens of micrometer are absent, which is desirable for the preparation of a thin, continuous ceramic coating 102. The temperature for sintering of particles, grains or to crystallize rapidly increases with the particle size. With comparable particle sizes, transition metals have much lower sintering temperatures than ceramic materials. Thus, the size of the ceramic particles 112 should be small enough so that they can be sintered without causing significant sintering of the porous metallic support sheet 104. Significant sintering or densification of the porous metallic support 104 reduces the permeance and also generates large stresses that result in membrane defects. The average ceramic particle sizes to produce the ceramic membrane 102 of present embodiment are preferably about 300 nm or less.

Figure 2:
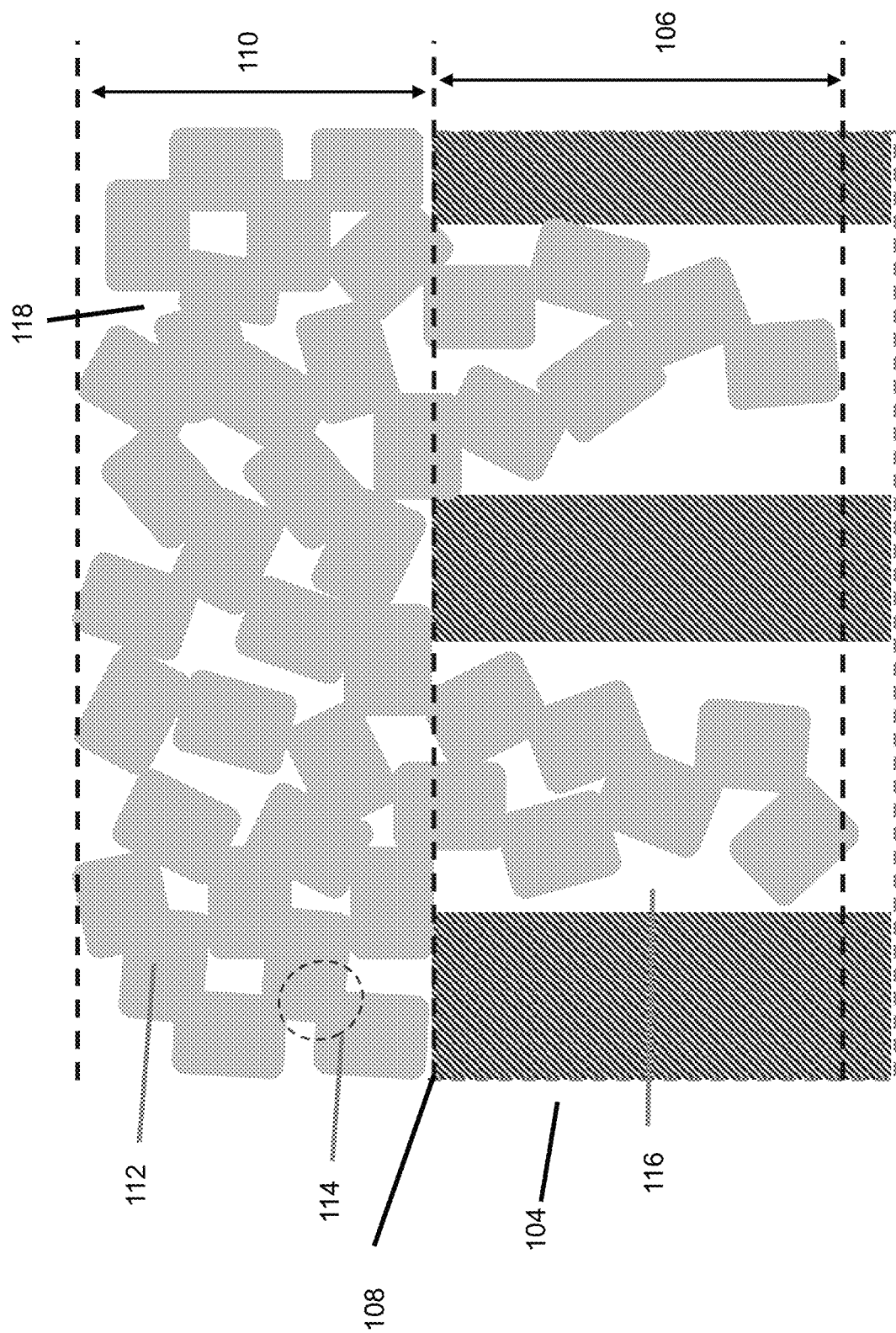
FIG. 2 is a schematic illustration of a ceramic/metal sheet membrane structure according to an embodiment.

To form a continuous ceramic membrane coating layer 102, the size of the support pores 116 is preferably three to ten times the size of the size of the ceramic particles 112 used to form the ceramic coating 102. If the support pore size is smaller than the ceramic particle size, the ceramic coating 102 would mostly be deposited on the exterior surface of the metal support sheet 104 and mechanical interlock (FIG. 2) would not be made to obtain strong membrane adhesion. Membrane coating adhesion via a mechanical interlocking mechanism is preferred because it is more versatile in the selection of membrane materials and to the use of the ceramic/metal sheet membranes 100 for different applications. Without mechanical interlock, the ceramic membrane coating layer 102 can be adhered onto the metal support 104 by forming chemical bonding between the ceramic particles 112 and metallic grains. However, such chemical bonding is very material-specific and can be weakened or destroyed by mechanical and/or chemical stresses induced during the membrane sintering and applications. For example, mismatch in thermal expansion coefficient between the metallic and ceramic materials can cause breakage of the bonds during rapid heating/cooling cycles. For example, chemical bonding between the metallic and ceramic materials can be destroyed when the ceramic/metal membrane 100 is immersed inside a fluid that changes interfacial chemistry. The support pores 116 should not be too large relative to the ceramic particles 112, because the ceramic particles 112 can penetrate through the support pores 116. Excessive penetration of the ceramic particles 112 into the support pores 116 results in i) drastic decrease of the permeance of the metallic support 104 and ceramic membrane 102, and ii) generation of large chemical and physical stresses in the support sheet 104. The large stress ultimately leads to deformation or failure of the ceramic/metal membrane sheet 100.

Figure 3D:
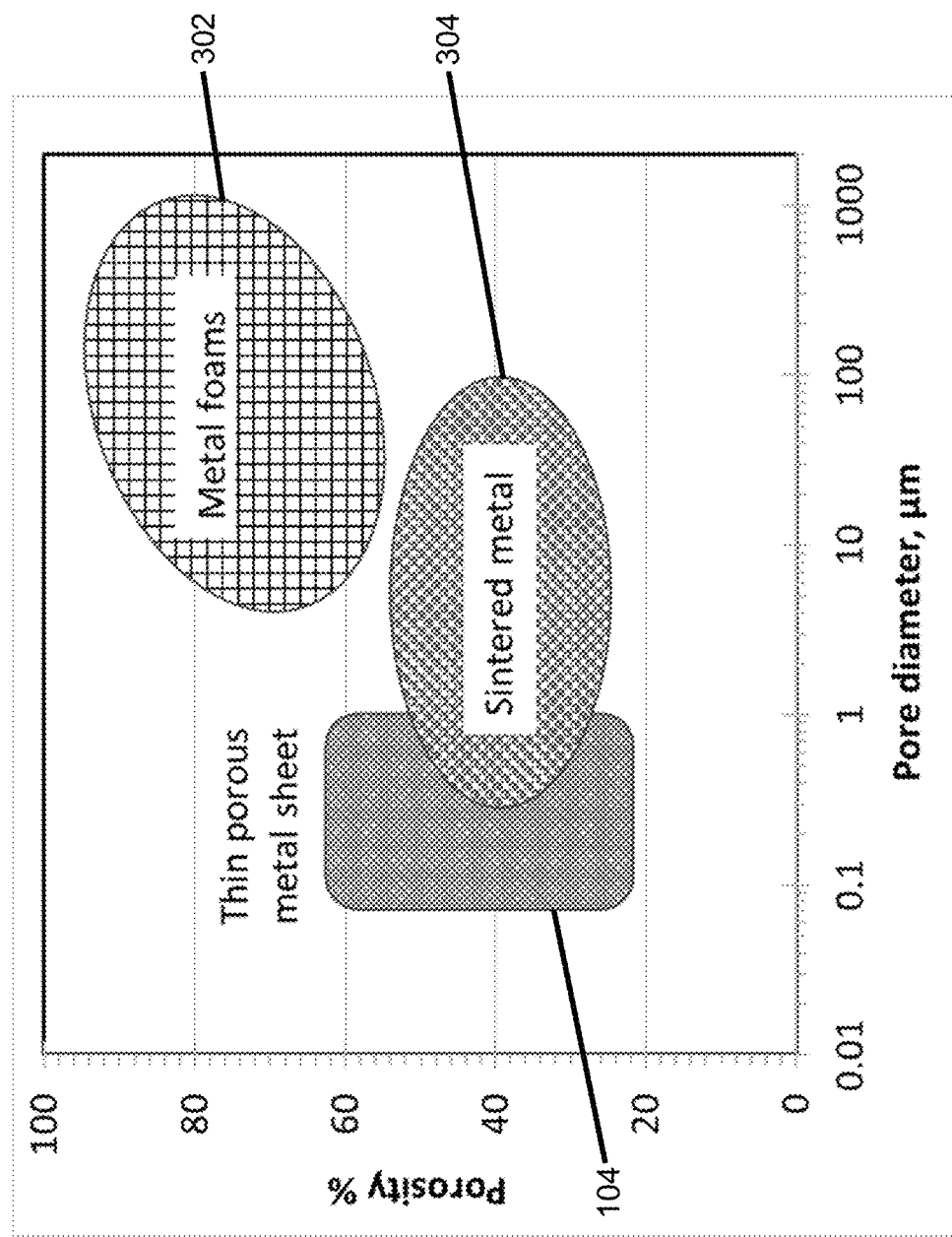
FIG. 3D is a plot illustrating pore size ranges of porous metal materials.

FIG. 3D shows an embodiment of a metal support sheet 104 having a preferred pore size and porosity range in comparison to conventional porous metallic structures. The conventional metal foams or meshes 302 have pore sizes in the range of tens of micrometers to hundreds of micrometers, which are too large to prepare the ceramic membranes 102 of present embodiment. The porous metal produced by sintering of metallic particles 304 generally has a wide pore size distribution. Even though some sintered metal plates have a pore size rated at micrometer and sub-micrometer level, the presence of pores in tens of micrometer is evident under SEM. It is expensive to produce uniform metallic particles 120 at the micrometer level and difficult to process the metallic particles 120 having such small size because of their extremely high reactivity under environmental conditions. As a result, metallic particles 120 of broad size distribution are often used to produce sintered metal products. The pore size and porosity of the present embodiment are preferably in the range of 0.1 to 2.0 μm and 20 to 60%, respectively. The technical insight for the preferred the pore size range is described above. The optimum porosity is determined by permeance, membrane stability, and mechanical strength. The strength of the metal support sheet 104 increases with decreasing porosity, while the permeance increases with porosity. The porosity of the metal support 104 also affects the formation and stability of the membrane coating 102. A support sheet 104 of very low porosity (e.g., <20%) does not only have low permeance but also makes it difficult to obtain strong membrane adhesion via mechanic interlock. A support sheet 104 of very high porosity (e.g., >65%) is weak in a thin sheet form which makes it difficult to control the coating particle penetration 106 into the support pores 116 below a certain value, such as 10 µm.

Figure 4A:
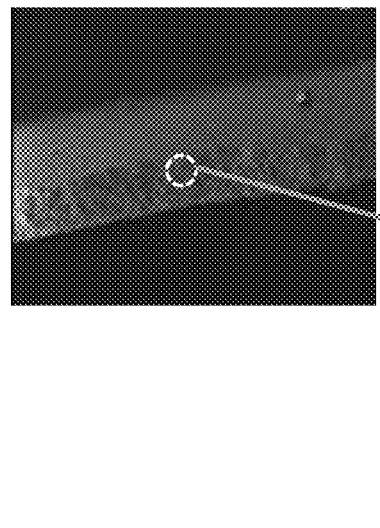
FIGS. 4A-4F are micrographs illustrating the microstructure of porous thin metal sheet of different thickness.
Figure 4B:
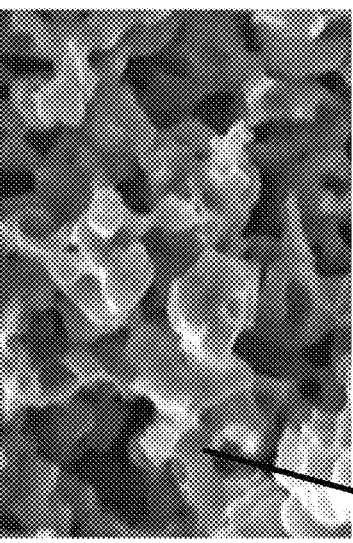
Figure 4C:
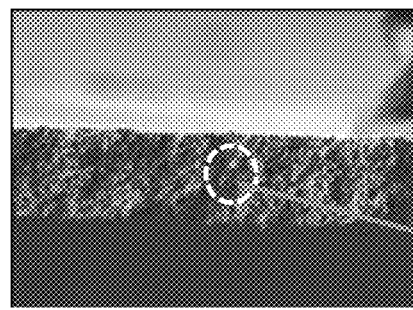
Figure 4D:
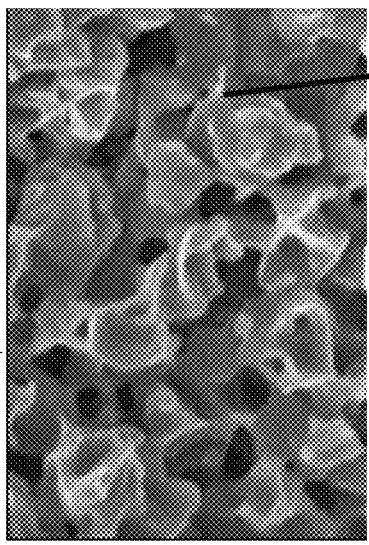
Figure 4E:
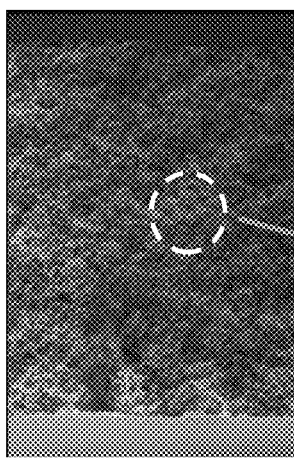
Figure 4F:
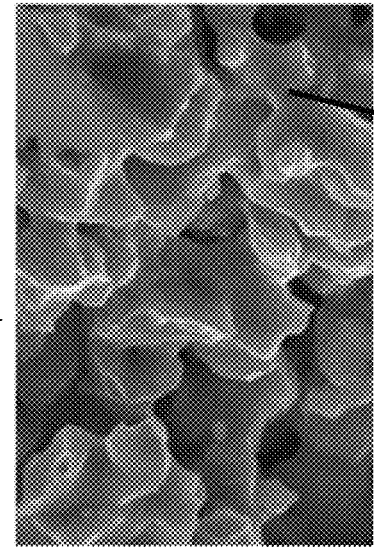
Figure 5B:
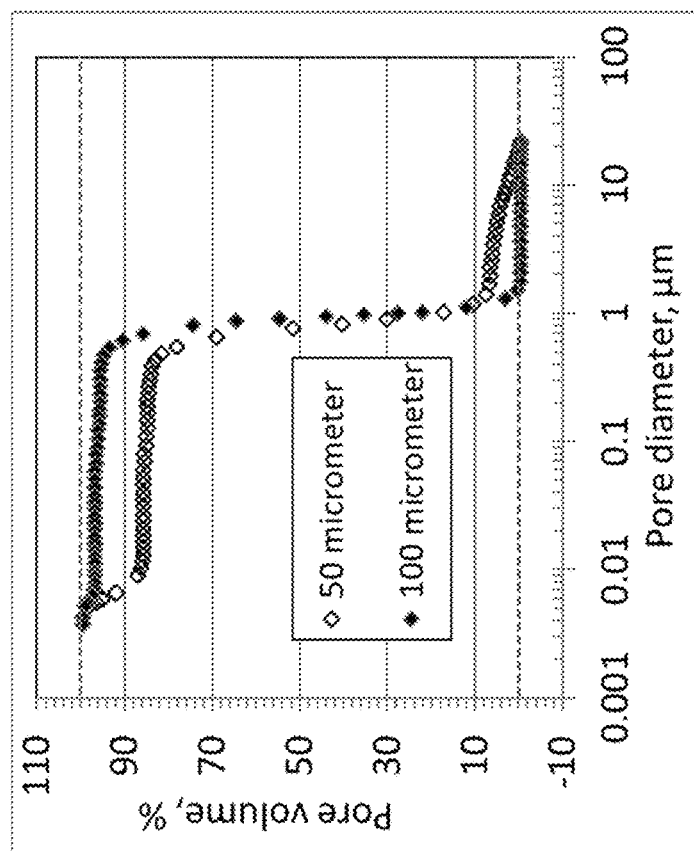
FIG. 5B is a plot illustrating the pore size distribution as measured by mercury porosimetry of a thin porous metal support sheet according to an embodiment.
Figure 5A:
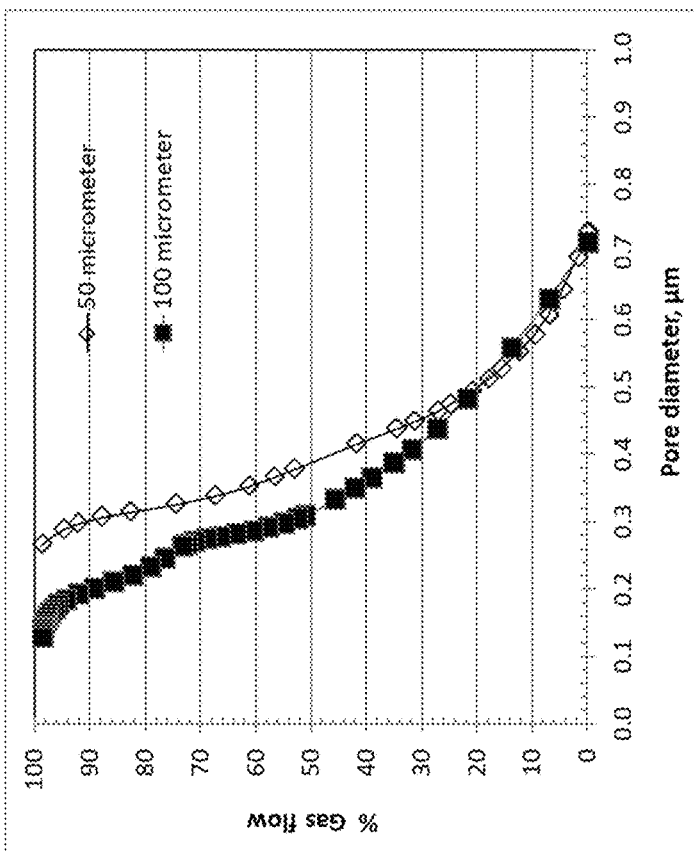
FIG. 5A is a plot illustrating the pore size distribution as measured by capillary gas flow of a thin porous metal support sheet according to an embodiment.

In addition to the average pore size, uniformity of the porous structure is another desirable support feature for the preparation of a thin high-performance ceramic membrane 102. Uniform porous structures of the support sheet of the present embodiment are illustrated with sheets of three different thicknesses in FIGS. 4A-4F. SEM analysis (500× magnification) of the fractured sheets reveals uniform networked porous structures throughout the sheet thickness for all the 25 (FIG. 4A), 50 (FIG. 4C), and 100 (FIG. 4E) µm-thin sheets 104. Under high magnification (10,000×), sintered metallic grains are visible for the three sheets: 25 (FIG. 4B), 50 (FIG. 4D), and 100 (FIG. 4F) µm thickness. Microscopy analysis is very useful in revealing the pore structures and surface texture of a metal support sheet directly. The uniformity of a porous metal sheet 104 can be quantified indirectly with other established analytical methods. FIGS. 5A and 5B show the pore size distribution of porous metal sheets 104 measured with capillary flow (FIG. 5A) and mercury porosimetry FIG. 5B) methods. The 50 µm- and 100 µm-thin porous nickel sheets 104 are used as an example. The capillary flow assesses the average pore size based on a gas fluid to flow through the metal sheet 104. The plot in FIG. 5A shows that the contribution to the gas flow by pores 116 greater than 0.75 µm is 0%. Such pore size distribution suggests that particles greater than 0.75 µm will be blocked by the support sheet 104. The 100 µm sheet 104 provides smaller pores 116 than the 50 µm sheet 104 at the same percentage of gas flow. Mercury porosimetry provides good characterization of exterior pores of a porous metal sheet. FIG. 5B shows that pores 116 greater than 20 µm account for 0% of the pore volume for both metal sheets 114, indicating the absence of surface pores 116 above 20 µm. Pores greater 2 µm account for about 5% of the 50 µm-sheet pore volume and 0% the 100 µm-sheet pore volume. Most pores are within the range of 0.5 to 1.0 µm for the two sheets 104.

Figure 6A:
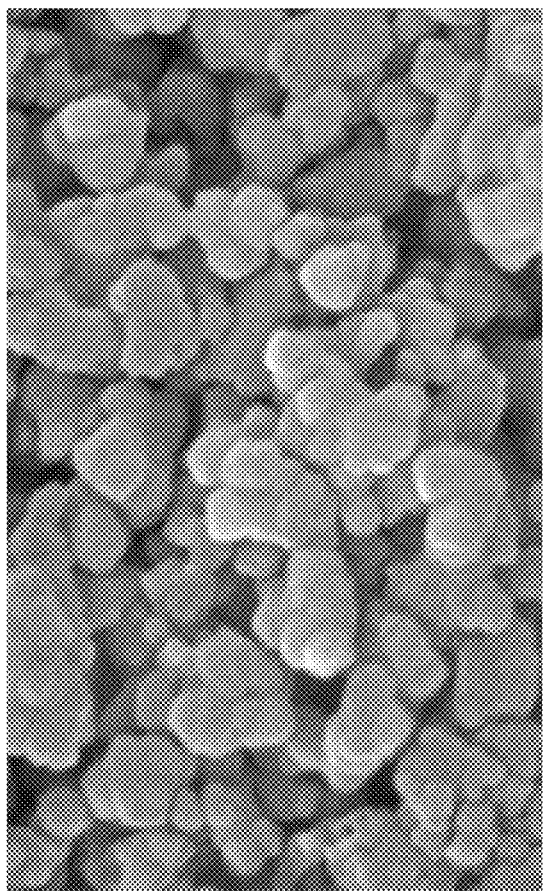
FIGS. 6A and 6B are micrographs illustrating the morphology of zirconia particles used to form a membrane coating according to an embodiment.
Figure 6B:
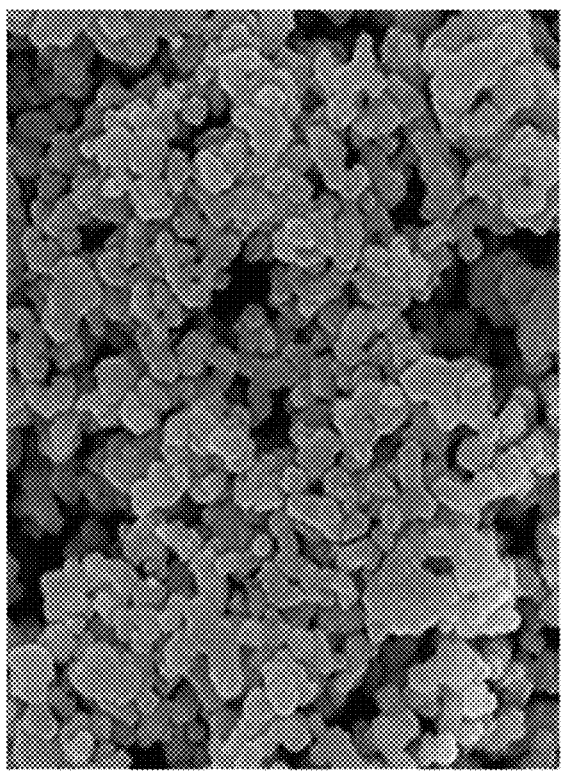

With a preferred porous metal support sheet 104, ceramic materials of suitable properties should be used to produce high-performance ceramic membranes 102. First, the ceramic materials should be stable under the preparation conditions and various application conditions. Second, the ceramic material should be inexpensive. Third, the ceramic material can be sintered without damaging the metal support 104. Fourth, the ceramic material should have adequate particle sizes as discussed above. The particle size may be characterized as primary particle size, crystalline size, or grain size. The ceramic material of present embodiment is preferably ceria, zirconia, and/or alumina. These materials have excellent stability in various gases and various liquid fluids. Alumina exists in different crystal phases based on the calcination temperature. Stabilized ceria and zirconia keep the same crystal structure (face-centered-cubic) at all temperatures. They are often stabilized by doping the lattice structure with other metal oxides. For example, zirconia stabilized by yttrium oxide is commonly used. Ceria can be stabilized with alkaline earth and rare earth metal oxides. Based on the preferred support and ceramic materials, the size of the ceramic particles 112 is preferably to be below 300 nm on average. The particle size can be assessed by microscopy analysis and by X-ray diffraction. FIGS. 6A and 6B show yttria-stabilized zirconia (YSZ) particles of two different sizes under 50,000× magnification. The first one has average particle size 200-300 nm (FIG. 6A), while the second one has average particle size of 50-60 nm (FIG. 6B). Both particle sizes are suitable for preparation of the ceramic membrane 102.

Figure 7:
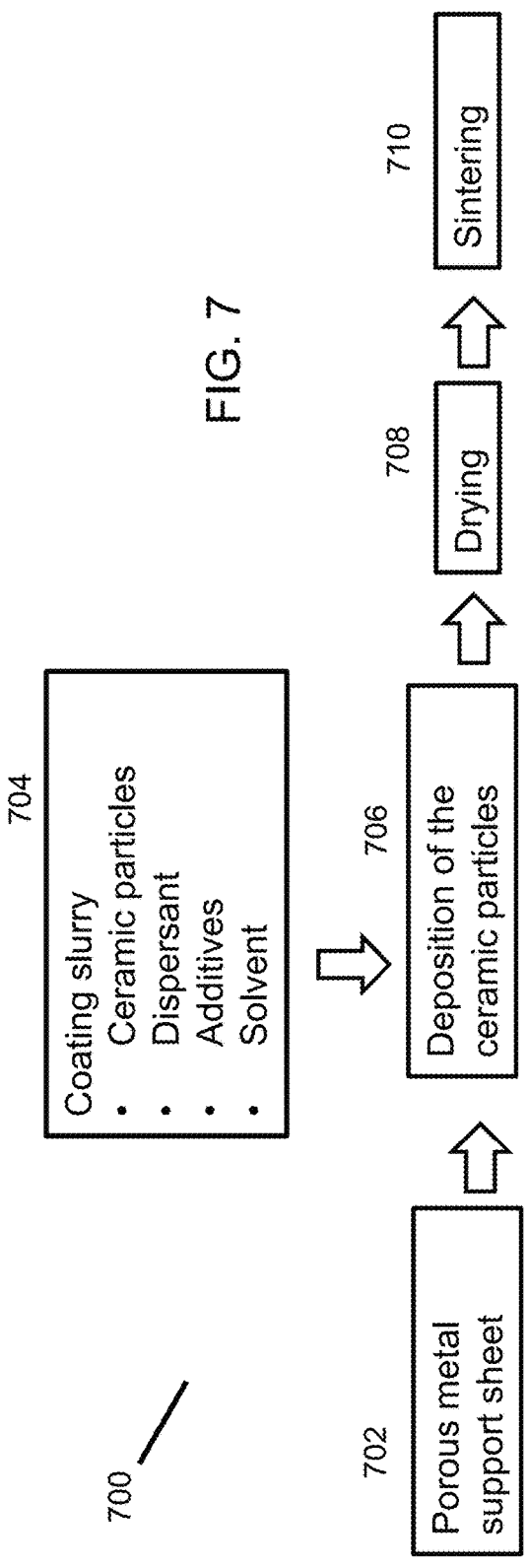
FIG. 7 is a flow diagram illustrating a process for making a membrane according to an embodiment.

Ceramic particles 112 can be deposited on the flat metal support sheet 104 by a dry or wet process. The dry process includes sputtering deposition or plasma spray. The wet chemistry process is a versatile way to make the ceramic membranes 102 of different materials and/or different pore sizes using the same equipment. FIG. 7 outlines the major process steps of a method 700 of making a ceramic membrane 102 via the wet chemistry route. In first step 702, a porous metal sheet 104 of the properties described above is acquired and inspected as the support sheet 104. The porous metal sheet 104 should be free of any visible pinholes and have a smooth surface free of debris. In second step 704, a ceramic material of the properties as described above is selected and made into a coating slurry by mixing a ceramic powder 112 with a dispersant and additives in a solvent. The dispersant is used to prevent the ceramic particles 112 from agglomerating. Other additives may be used to reduce surface tension of the slurry and enhance the binding of the ceramic particles 112 so that a uniform coating layer can be formed without cracks. The mixture can be milled or vigorously mixed to obtain a stable, homogenous slurry. In the next step 706, the coating slurry is applied onto the metal support sheet 104 to form a coating layer of a desirable thickness and penetration. Several techniques can be used to apply the coating, including screen printing, filtration, and spray coating. Screen printing is preferred when making a coating of thickness above 10 µm with high solid content in the slurry. Spray coating is preferred when a thinner coating is prepared with dilute slurry. In the next step 708, the coated sheet is dried to remove the solvent. The drying conditions are controlled to prevent formation of cracks, including gas environment, temperature, and time. After drying, the coated ceramic particles 112 can become a layer of loosely-packed ceramic powder that may be easily blown away. Thus, some binders are often added into the slurry to keep the coating layer intact after drying. Coating and drying may be repeated to smoothen the surface of the coating layer and/or generate a graded coating structure. For example, multiple coatings can be formed with slurries of decreasing particle sizes to make a coating layer of gradually-reduced pore size from the coating/support interface to exterior surface of the coating layer. In a fifth step 710, the dried coated membrane sheet is loaded into a furnace for sintering. Sintering is one very challenging yet significant step for preparation of the ceramic membrane 102 on a porous metal support 104. In the sintering step, any unnecessary organic additive is removed and the ceramic particles 112 are sintered together to form an integrated ceramic/metal membrane 100. Different from pure ceramic membranes, a metal cannot be calcined at high temperatures. Even in a non-oxidizing gas environment, the porous metal sheet 104 can be densified if the sintering temperature is higher than the formation temperature. For a sheet 104 made of Nickle alloy, the preferred sintering temperature is below 900° C. For a sheet 104 made of steel, the preferred sintering temperature is below 1200° C. In conventional ways, the coated sheet may be heated in an oxidizing gas environment at moderate temperatures (below 500° C.) to remove all the organic constituents and then, is heated in a reducing gas environment at higher temperature. In a preferred embodiment, the sintering is conducted in a non-oxidizing environment in one step by using an appropriate slurry composition and sintering conditions (gas environment and temperature profile).

The sintering temperature requirement decreases with reducing particle size. However, the ceramic particles 112 cannot be too small relative to the size of the support pores 116. If the ceramic particles 112 are too small, the ceramic particles 112 can go through the support pores 116 without formation of a continuous ceramic coating layer 102. Even if a continuous coating layer 102 is formed with very small particles 112, large stresses can be generated in the coating layer 102 during drying and sintering so that the coating layer 102 cracks. Two methods, as illustrated in FIGS. 8A and 8B, are found to lower the sintering temperature for a given ceramic particle size. Point-to-point contact of ceramic particles 112 in the coated layer is preferred to generate uniform pore size and porosity. In the first method 800A (FIG. 8A), a sintering or binding aid 802 is incorporated into the contacting area of adjacent ceramic particles 112. Upon heating, the sintering aid 802 forms a bond 804 which binds the ceramic particles 112 together even if the ceramic particles 112 are not sintered. Example of organic sintering aids 802 that are thermally and chemically durable are polymers, such as polytetrafluoroethylene (PTFE). An example of an inorganic sintering aid 802 is silicate glass. These sintering aids 802 have much lower melting temperatures than the ceramic particles 112. Upon heating, the sintering aids 802 melt and occupy the corners among the ceramic particles 112 by capillary force. The ceramic particles 112 are bonded together after the melt is solidified after cooling. Thus, the application temperature of the ceramic membranes 102 containing a sintering aid 802 should be lower than the sintering aid 802 melting point. The sintering aid 802 can be added in slurry batching or added after the ceramic coating is done. The relative volume ratio of the sintering aid 802 to the ceramic particles 112 is preferably 0.01/1 to 0.30/1. The second method 800B (FIG. 8B) is to introduce sintering promoters 806 in the crystal of the ceramic particles 808. The sintering promoter 806 is preferably dispersed uniformly on the exterior surface of the ceramic crystals 112. The sintering promoter 806 may or may not diffuse into the ceramic crystals 112. Addition of the sintering promoter 806 has minimal impact on the size of the ceramic particles 112. The sintering promoter 806 lowers the sintering temperature of the ceramic particles 112 so that the ceramic particles 112 after sintering are bonded together through neck-to-neck 114 connection instead of point-to-point contacting. The sintering promoter 806 may be doped into the lattice structure of the ceramic crystals 112 after sintering without forming a separate crystal phase. The sintering promoter 806 preferably has crystal phase miscibility with the ceramic particles 112 to be coated. Metal oxide promoters 806 are used for metal oxide particles 112. The atomic ratio of the sintering promoter 806 to the ceramic particles 112 is preferably about 0.01/1 to 0.30/1.0. For zirconia particles, the sintering promoters 806 are iron oxide, nickle oxide, manganese oxide, cobalt oxide, silica, and silicate. For ceria, the sintering promoters 806 are alkaline earth metal oxide, rare earth metal oxide, and transition metal oxides (e.g., manganese oxide, nickel oxide, cobalt oxide).

The thin ceramic/metal membrane sheet 100 can be used to build a membrane filter 900 of high membrane area packing density and multiple functions. As shown in FIG. 9A, the metal/ceramic membrane sheets 100 are stacked together to form small (<2.0 mm spacing) permeate 902 and feed 904 flow channels. A membrane sheet surface having smaller pores 118 is exposed to a feed fluid 906 to block particulates 908. By use of thin membrane sheets 100, the membrane area packing density is mainly determined by the feed channel 904 and permeate channel 902 spacing. The membrane area packing density increases with decreasing channel spacing. For the feed channel 904, decreasing the channel spacing can also reduce accumulation of particulates 908 on the surface of the membrane 100. To further minimize accumulation of particulates 908 in the feed channel 904, the feed channel 904 is preferably made straight, substantially free of dead spaces. On the other hand, the hydraulic pressure drop for channel flow increases rapidly with decreasing hydraulic diameter of the channel. The hydraulic diameter of the feed 904 and permeate 902 channels is preferably in the range to 0.5 to 3.0 mm. Exiting the feed channel 904 is a raffinate 912, while a permeate 910 exits the permeate channel 902. The thin flat sheet membrane having sufficient mechanical strength and rigidity enables integration of filtration with adsorption. As illustrated in FIG. 9B, an adsorbent layer 101 can be arranged on the back side of each membrane sheet 100 in a filter module assembly for selective adsorption of certain molecules permeated through the membrane pore. The adsorbent layer can be a sheet made of an adsorbent material or a densely-packed adsorbent particle layer. The adsorbent materials are preferably compatible with the porous metal support sheet material 104, i.e., no negative interactions. Examples of such adsorbent materials are zeolites, activated carbon, high surface alumina, and high surface area silica. The adsorption layer thickness is preferably about 0.1 to 10 mm.

Flux and permeance are two important performance parameters to characterize productivity of a membrane. They can be calculated using the following equations with experimental measurements:

$$J = \frac{q}{S_m}$$

$$P = \frac{J}{\Delta p}$$

Where J=flux, q=permeation flow rate of the fluid, $S_m$=area of the membrane 100 exposed to the feed fluid, P=permeance, $\Delta p$=pressure gradient across the membrane 100.

By convention, different flux and permeance units are used for gas and liquid filtration. For gas filtration, the flux and permeance are expressed as mol/($m^2 \cdot s$) and mol/($m^2 \cdot s \cdot Pa$), respectively. For liquid filtration, the flux and permeance are expressed as liter/($m^2 \cdot h$) and liter/($m^2 \cdot h \cdot bar$), respectively.

In cross-flow filtration, cross flow velocity is an important operating condition and can be calculated as follows:

$$V = \frac{Q_f}{SA_f}$$

Where V=cross flow velocity, $Q_f$=feed flow rate, $SA_f$=cross-sectional area of feed channel for the feed to flow through.

In cross-flow filtration, the pressure may vary over the membrane surface due to fluid pressure drop. Trans-membrane-pressure (TMP) is calculated as an average pressure gradient as follows:

$$TMP = \frac{\Delta p_{inlet} + \Delta p_{outlet}}{2}$$

The filtering efficiency is another performance parameter for characterizing the effectiveness of a membrane and is calculated based on experimental measurements as follows:

$$\eta = 1 - \frac{C_p}{C_f}$$

Where η=filtering efficiency, Cp=concentration of the target solute in permeate, $C_f$=concentration of the solute in feed.

The membrane area packing density is a parameter which may be used to characterize the productivity of a filter device. The membrane area packing density of a module core comprising a stack of flat membrane sheets 100 is described by the following equation:

$$SA_m = \frac{S_m}{V_m} = \frac{1}{\frac{l_f}{2} + \frac{l_p}{2} + l_m}$$

Where $SA_m$=specific area of membrane, $S_m$=total membrane area in module core, $V_m$=volume of the module core, $l_f$=spacing of feed flow channel, $l_p$=spacing of permeate channel, $l_m$=membrane sheet thickness (may include lining thickness).

For thin membrane sheets, the membrane area packing density increases with decreasing spacing of feed and permeate channel.

Example I. One-Layer Coating of Zirconia Particles on Porous Ni Sheet

Yittria-stabilized zirconia (YSZ) containing 10 at % Y of average crystalline size of 200 nm is used to make a first layer coating on the porous Ni sheet 104. This YSZ powder is made into base coating solutions. The Base 2 coating solution is prepared as follows: 25 g of the 200 nm YSZ powder is added into 16 cc of solvent consisting of ethanol and methyl ethyl ketone (MEK) at volume ratio of 0.2:0.8 with further addition of 0.52 cc of dispersant PS-21A (or PS-131) and 0.52 cc of PolyVinylButyral (PVB-79) binder. The mixture is ball milled to result in a homogenous slurry. The particle or agglomerate size distribution in the slurry may be characterized on a Microtrac particle size analyzer.

In an embodiment, d50 and d90 are 44 and 117 μm, respectively, which means 50% of the solid in the slurry exists as agglomerates smaller than 44 μm and 90% of the solid exists as agglomerates smaller than 117 μm. The slurry is diluted to 0.5 wt. % with the ethanol+MEK solvent for vacuum filtering. The Base 3A coating solution is an aqueous slurry with Tiron as the dispersant. 20 g of the 200 nm YSZ powder is mixed with 0.10 g of Tiron dispersant in 167 g of de-ionized water. The mixture is ball milled with 3 mm zirconia milling beads to homogenous slurry. The slurry is further mixed with 165 g of 20 wt. % PEG solution, 5.67 g of 1 wt. % DCB and 75.50 g of de-ionized water. d50 and d90 are 0.25 and 0.67 μm, respectively. Thus, the YSZ particles are more dispersed in the aqueous slurry than in the organic solvent slurry. The final mixture is diluted to 0.5 wt. % solid loading for vacuum filtering.

2.5 cm×3.5 cm coupons are cut out of a porous Ni sheet and used as the support 104. The coupon is mounted onto a vacuum coater. The coating solution is poured onto the front surface of the coupon. On the back surface of the coupon, a vacuum is pulled to produce a uniform layer of the ceramic particle deposit. The wet coating is dried at ambient conditions. After drying, the coupon is placed inside a reactor and sintered in 100% H$_2$ under the following temperature profile: ramp from 25 to 500° C. at 2 C/min, ramp from 500 to 750° C. at 1° C./min, hold at 750° C. for 4 h. Table 1 lists two groups of membrane samples coated. The areal loading density (mg/cm$^2$) is a parameter that may be used to quantify the amount of coating per cm$^2$ of the support surface. The coating layer thickness may be determined by the thickness difference between the bare support sheet 102 and coated sheet 100.

Figure 10:
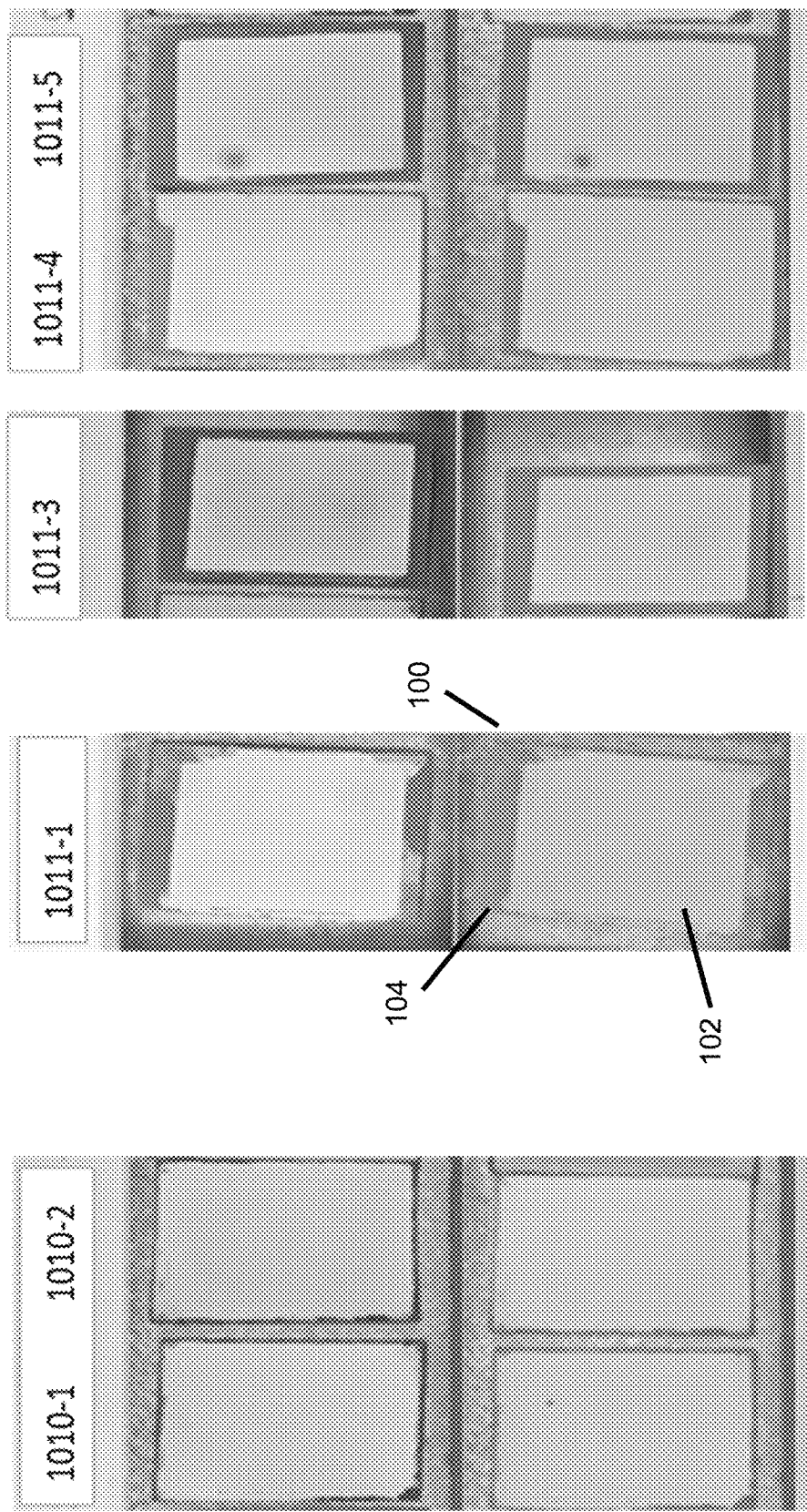
FIG. 10 presents photographs illustrating the morphologies of one-layer coatings made from 200 nm YSZ particles.

The morphologies of the coating surface are shown in FIG. 10. For each sample, the upper and lower pictures show respective surface textures after coating and after sintering. No cracks are observed with these samples after drying. No cracks and/or delamination are observed after sintering. The ceramic coating layer 102 adheres onto the Ni support sheet 104 well. The YSZ and nickel materials have very different thermal expansion coefficients. The results suggest that the YSZ coating layer can be sintered without causing cracks with the membrane design of this embodiment. The organic additives in the coating solution can be removed in a reducing gas environment without turning into coke. The results demonstrate the feasibility of making porous ceramic coatings 102 on a porous metal sheet 104 without cracks and delamination over ranges of areal loading density from 2.7 to 7.5 mg/cm$^2$ and thickness from 6.2 to 21 μm.

TABLE 1

Samples of one-layer coating with 200 nm YSZ particles

| | Ni support sheet | | | Coating | | | Membrane thickness after sintering | |
|---|---|---|---|---|---|---|---|---|
| Sample ID | Avg thickness, μm | STDEV, μm | Porosity | Slurry ID | Volume used, cc | Loading, mg/cm$^2$ | Avg, μm | STDEV, μm |
| 1010-1 | 53.0 | 0.7 | 0.30 | base 3A | 8 | 3.7 | 16.0 | 0.8 |
| 1010-2 | 46.3 | 0.9 | 0.26 | base 3A | 8 | 3.4 | 12.8 | 0.6 |
| 1010-3 | 52.1 | 1.1 | 0.30 | base 3A | 8 | 5.9 | 17.0 | 1.5 |
| 1010-4 | 48.8 | 1.0 | 0.24 | base 2 | 4 | 4.6 | 11 | 1.0 |
| 1010-6 | 49.4 | 1.7 | 0.24 | base 2 | 4 | 5.7 | 14 | 1.9 |

TABLE 1-continued

Samples of one-layer coating with 200 nm YSZ particles

| Sample ID | Ni support sheet | | | Coating | | | Membrane thickness after sintering | |
|---|---|---|---|---|---|---|---|---|
| | Avg thickness, μm | STDEV, μm | Porosity | Slurry ID | Volume used, cc | Loading, mg/cm² | Avg, μm | STDEV, μm |
| 1010-7 | 49.1 | 0.7 | 0.24 | base 2 | 4 | 7.5 | 21 | 1.0 |
| 1011-1 | 47.8 | 0.7 | 0.22 | base 3A | 6 | 2.9 | 11.9 | 0.7 |
| 1011-2 | 48.1 | 0.7 | 0.24 | base 3A | 6 | 3.2 | 7.1 | 1.0 |
| 1011-3 | 53.0 | 1.0 | 0.24 | base 3A | 6 | 2.7 | 6.2 | 1.0 |
| 1011-4 | 53.0 | 1.1 | 0.30 | base 2 | 4 | 5.7 | 8.0 | 0.8 |
| 1011-5 | 46.8 | 0.7 | 0.23 | base 3A | 6 | 3.6 | 6.8 | 0.8 |

Example II. Two Layers of Zirconia Coating on Porous Ni Sheet

In addition to the Base 2 and Base 3A coating solutions for the first layer of coating described in example I, a base 3B solution is prepared using the same recipe and procedure as base 3A except for Davin 821 added as dispersant. The first-layer coating is made with the coating solution diluted to 0.5 wt. %, as described in example I.

Figure 11:
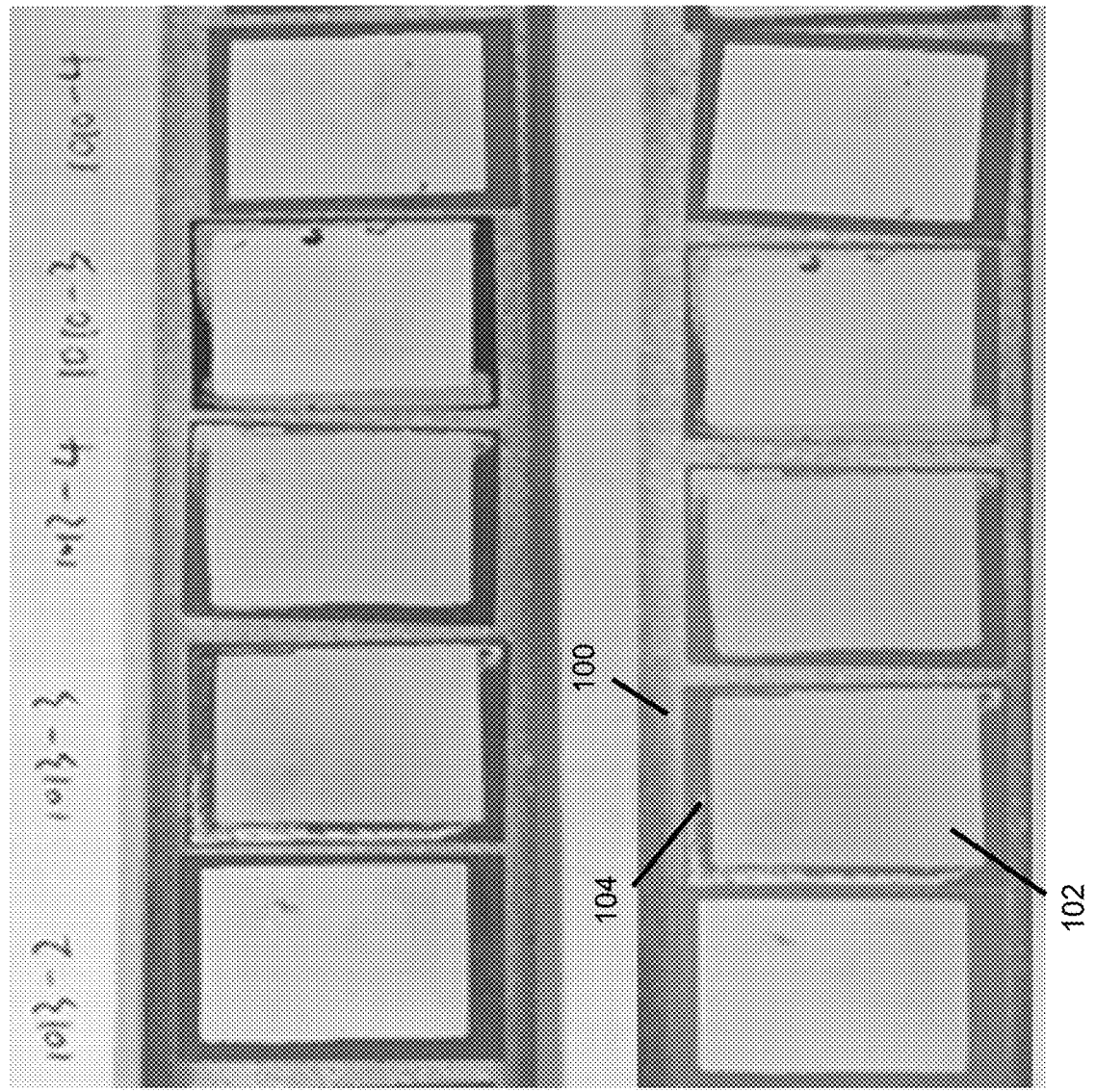
FIG. 11 presents photographs illustrating the morphologies of two-layer coatings made from 200 nm YSZ particles followed by 50 nm particles.

The F2 coating solution is prepared with a YSZ powder of 50 nm average crystalline size. The preparation procedure is the same as used for the Base 2 solution. The F2 coating solution is diluted to 0.25 wt. % solid for the second layer of coating by vacuum filtering. 2.5 cm×3.5 cm porous Ni sheets 104 are used as a support. Membrane coupons 100 with two layers of coating are listed in Table 2. The second layer coating is added after the first layer is dried at room temperature under vacuum. After coating, the membrane coupons 100 are sintered under the same conditions as used for the one-layer coating in Example I. FIG. 11 shows that the surface morphologies before (upper image) and after (lower image) sintering look same or similar. No cracks and/or delamination are seen. The results show the feasibility of making two-layer ceramic coatings 102 on a porous Ni sheet 104 with different sizes of the particles 112 over the ranges of areal loading density from 2.8 to 5.9 mg/cm² for first-layer coating and from 0.32 to 0.55 mg/cm² for second-layer coating by one-time sintering.

TABLE 2

Membrane coupons with two layers of coating

| | First layer of coating with 200 nm YSZ particle | | | Second layer of coating with 50 nm YSZ particle | |
|---|---|---|---|---|---|
| Sample ID | Slurry | Volume, ml | Loading, mg/cm² | Volume, ml | mg/cm² |
| 1013-2 | base 2 | 3.0 | 2.8 | 2.0 | 0.42 |
| 1013-3 | base 3B | 4.0 | 2.9 | 2.0 | 0.45 |
| 1013-4 | base 3B | 4.0 | 3.2 | 2.0 | NA |
| 1010-3 | base 3A | 4.0 | 5.9 | 2.0 | 0.55 |
| 1010-4 | base 3A | 4.0 | 4.6 | 2.0 | 0.32 |

Example III. Three Layers of Coating

Figure 12:
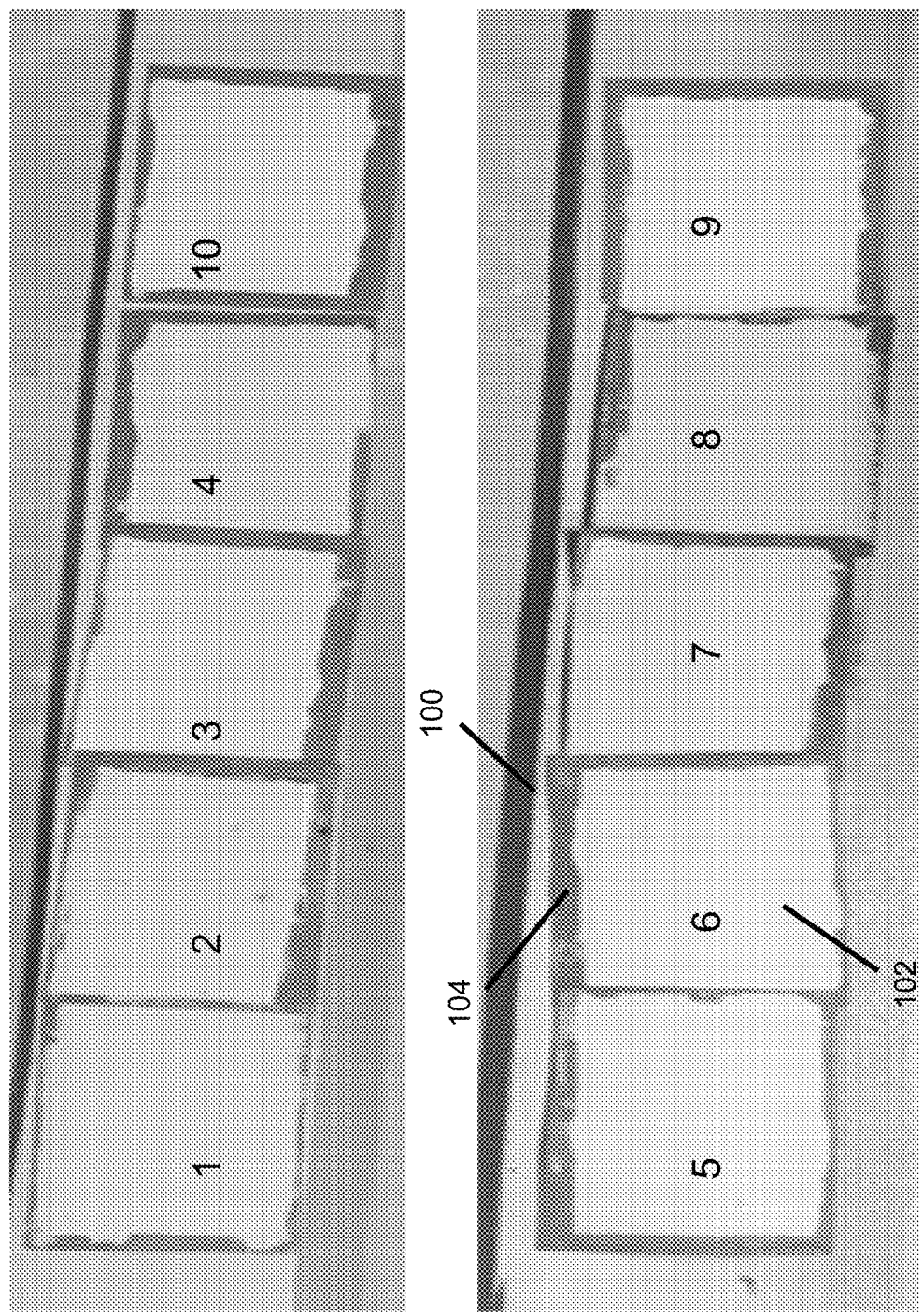
FIG. 12 presents photographs illustrating the morphologies of three-layer coatings after sintering.

A base 2 solution as prepared in Example I is used for first layer of coating. The F2 coating solution as prepared in Example II is used for second layer of coating. The first coating is deposited by filtering 15 cc of the base 2 coating solution containing 0.5 wt. % of the 200 nm YSZ particle. The second coating is deposited by filtering 5 cc of the F2 coating solution of 0.25 wt. % 50 nm YSZ. The coatings are deposited on a 3.0 cm×5.0 cm porous Ni sheet. Table 3 lists the areal loading density ranged from 3.7 to 5.8 mg/cm². A zirconia colloidal solution of 10 nm average particle size is diluted to different concentrations for the third layer of coating. The coating is formed by immersing the two-layer coated membrane coupon into the 10 nm colloidal solution, taking it out, and draining excessive solution. The third layer loading density is below 0.25 mg/cm². After drying, the coupon is placed inside a reactor and sintered in 100% $H_2$ under the following temperature profile: ramp from 25 to 500° C. at 2° C./min, ramp from 500 to 800° C. at 1° C./min, hold at 800° C. for 4 h. FIG. 12 shows that all ten membrane coupons 100 stay flat after sintering. No cracks and delamination are observed. This example indicates that three-layer coatings can be sintered at one time, which significantly reduces the membrane manufacturing cost as compared to using multiple sintering times.

TABLE 3

Membrane coupons coated three times (200 nm YSZ/50 nm YSZ/10 nm YSZ)

| Sample ID | Metal sheet thickness, um | Metal sheet porosity, % | 1st coating slurry | 2nd coating slurry | Areal loading density of 1st + 2nd coating, mg/cm² | Sol for 3rd coating, wt. % | Areal loading density of 3rd coating, mg/cm² |
|---|---|---|---|---|---|---|---|
| 1228-1 | 49 | 41 | base 2 | F2 | 4.8 | 0.1 | 0.02 |
| 1228-2 | 49 | 49 | base 2 | F2 | 5.0 | 0.1 | 0.00 |

TABLE 3-continued

Membrane coupons coated three times (200 nm YSZ/50 nm YSZ/10 nm YSZ)

| Sample ID | Metal sheet thickness, um | Metal sheet porosity, % | 1st coating slurry | 2nd coating slurry | Areal loading density of $1^{st} + 2^{nd}$ coating, mg/cm$^2$ | Sol for $3^{rd}$ coating, wt. % | Areal loading density of $3^{rd}$ coating, mg/cm$^2$ |
|---|---|---|---|---|---|---|---|
| 1228-3 | 49 | 44 | base 2 | F2 | 5.2 | 0.2 | 0.03 |
| 1228-4 | 49 | 47 | base 2 | F2 | 5.0 | 0.2 | 0.02 |
| 1228-5 | 49 | 43 | base 2 | F2 | 5.0 | 0.5 | 0.11 |
| 1228-6 | 49 | 44 | base 2 | F2 | 5.5 | 0.5 | 0.02 |
| 1228-7 | 49 | 49 | base 2 | F2 | 5.6 | 1.0 | 0.24 |
| 1228-8 | 49 | 44 | base 2 | F2 | 3.7 | 1.0 | 0.19 |
| 1228-9 | 49 | 47 | base 2 | F2 | 5.3 | | |
| 1228-10 | 49 | 42 | base 2 | F2 | 5.8 | | |

Example IV. Incorporation of Sintering Promoters into Ceramic Coating Layer

A 3 cm×5 cm area of a porous Ni support sheet 104 is first coated with 12 cc of the Base 2 solution diluted to 0.5 wt. % loading of the 200 nm YSZ and then coated with 5 cc of the F2 solution diluted to 0.25 wt. % loading of the 50 nm YSZ. After drying, the coated membrane coupon 100 is immersed in a solution containing the sintering promoter 802. Excessive solution is drained off, while the porous ceramic coating layer 102 is filled with the promoter solution. The soaked membrane coupon 100 is dried and sintered. Table 4 shows the impact of the promoter 802 and sintering conditions on the membrane coating.

The promoters 802 evaluated include transition metal nitrates (Co, Ni, Fe), zirconia and silica colloidal solutions, and zirconium acetate. The transition metal nitrate is prepared as 1M solution. The nitrate decomposes into transition metal oxide under the sintering conditions to function as a sintering promoter. Zirconium acetate decomposes into nano-sized zirconium oxide to act as a sintering promoter 802 under the sintering conditions. The 10 nm zirconia colloidal solutions in both acetate and nitrate (from NYACOL) forms are tested. The silica colloidal solution has 20 nm particles (NexSil™ 20K-30, NYACOL). The as-received colloidal solution is concentrated and diluted with water to desired solid loading. The nano-particles are retained in the ceramic coating layer after drying to function as the sintering promoter.

The coated samples are sintered in a reactor under a controlled gas flow and temperature profile. The gas environments tested are 3% $H_2/N_2$, $N_2$, humid 3% $H_2/N_2$, and humid $N_2$. The humidity is added by bubbling the dry gas through a water bottle. Water vapor may promote sintering of metal oxides and may also oxidize some residual carbonaceous materials at the sintering temperature. The temperature is controlled by ramping from 25 to 500° C. at 2° C./min, ramping from 500° C. to sintering temperature at 1° C./min and holding the sintering temperature for 4 h. Two sintering temperatures, 700 and 800° C., are evaluated.

After sintering, the membrane coupons are inspected for shape deformation and cracks. The results are summarized in Table 4. All the membrane coupons show a degree of deformation after sintering, i.e., the sheet is no longer flat. No delamination occurs. However, cracks are observed with some of the membrane samples. In general, soaking the ceramic-coated samples with high concentrations of the promoter solution tends to result in cracks. Cracks even occur after the soaking with the membrane samples soaked in the 5 and 10 wt. % of colloidal zirconia solution. To most membrane samples, cracks occur after sintering.

This example indicates the sensitivity of membrane sintering with addition of sintering promoters 802. The impact of the kind of the promoter 802 and the amount of its addition on the membrane formation appear more significant than the sintering temperature and gas environment.

TABLE 4

Two-layer ceramic coatings (200 nm YSZ/50 nm YSZ) incorporated with different sintering promoter

| Sample No | Sintering promoter | Solution concentration, M or wt. % | Sintering temperature, ° C. | Sintering gas | Shape deformation | Crack |
|---|---|---|---|---|---|---|
| 1 | Mn(NO$_3$)$_2$ | 1.0 | 800 | H$_2$O+ 3% H$_2$/N$_2$ | Yes | No |
| 2 | Mn(NO$_3$)$_2$ | 1.0 | 800 | H$_2$O+ N$_2$ | Yes | No |
| 3 | Mn(NO$_3$)$_2$ | 1.0 | 700 | H$_2$O+ N$_2$ | Yes | Yes |
| 4 | Mn(NO$_3$)$_2$ | 1.0 | 700 | N$_2$ | Yes | No |
| 5 | Mn(NO$_3$)$_2$ | 0.5 | 700 | N$_2$ | Yes | No |
| 6 | Ni(NO$_3$)$_2$ | 0.5 | 800 | H$_2$O+ 3% H$_2$/N$_2$ | Yes | No |
| 7 | Ni(NO$_3$)$_2$ | 1.0 | 800 | H$_2$O+ 3% H$_2$/N$_2$ | Yes | No |
| 8 | Ni(NO$_3$)$_2$ | 2.0 | 800 | H$_2$O+ 3% H$_2$/N$_2$ | Yes | Yes |
| 9 | Ni(NO$_3$)$_2$ | 1.0 | 800 | H$_2$O+ N$_2$ | Yes | No |
| 10 | Ni(NO$_3$)$_2$ | 1.0 | 700 | H$_2$O+ N$_2$ | Yes | No |
| 11 | Ni(NO$_3$)$_2$ | 1.0 | 700 | N$_2$ | Yes | No |

TABLE 4-continued

Two-layer ceramic coatings (200 nm YSZ/50 nm YSZ) incorporated with different sintering promoter

| Sample No | Sintering promoter | Solution concentration, M or wt. % | Sintering temperature, °C | Sintering gas | Shape deformation | Crack |
|---|---|---|---|---|---|---|
| 12 | Fe(NO$_3$)$_3$ | 1.0 | 800 | H$_2$O+ 3% H$_2$/N$_2$ | Yes | Yes |
| 13 | Fe(NO$_3$)$_3$ | 1.0 | 700 | H$_2$O+ N$_2$ | Yes | No |
| 14 | Fe(NO$_3$)$_3$ | 1.0 | 700 | N$_2$ | Yes | No |
| 15 | Co(NO$_3$)$_2$ | 1.0 | 800 | H$_2$O+ 3% H$_2$/N$_2$ | Yes | No |
| 16 | Co(NO$_3$)$_2$ | 1.0 | 800 | 3% H$_2$/N$_2$ | Yes | No |
| 17 | Co(NO$_3$)$_2$ | 1.0 | 700 | N$_2$ | Yes | No |
| 17 | Co(NO$_3$)$_2$ | 1.0 | 700 | N$_2$ | Yes | No |
| 18 | 10 nm ZrO$_2$ colloid-acetate | 5 wt. % | 800 | H$_2$O+ 3% H$_2$/N$_2$ | Yes | No |
| 19 | 10 nm ZrO$_2$ colloid-nitrate | 5 wt. % | 800 | 3% H$_2$/N$_2$ | Yes | No |
| 20 | 10 nm ZrO$_2$ colloid-acetate | 5 wt. % | 700 | N$_2$ | Yes | No |
| 21 | 10 nm ZrO$_2$ colloids acetate | 5 wt. % | 700 | N$_2$ | Yes | No |
| 22 | 10 nm ZrO$_2$ colloids nitrate | 5 wt. % | 700 | N$_2$ | Yes | No |
| 23 | Zr(AC)$_2$ | 10 wt. % | 700 | N$_2$ | Yes | Cracked after soaking |
| 24 | Zr(AC)$_2$ | 5 wt. % | 700 | N$_2$ | Yes | Cracked after soaking |
| 25 | Zr(AC)$_2$ | 2 wt. % | 700 | N$_2$ | Yes | No |
| 26 | Zr(AC)$_2$ | 2 wt. % | 700 | N$_2$ | Yes | No |
| 27 | Zr(AC)$_2$ | 1.0 wt. % | 700 | N$_2$ | Yes | No |
| 28 | 20 nm SiO$_2$ colloid | 5 wt. % | 700 | N$_2$ | Yes | Yes |
| 29 | 20 nm SiO$_2$ colloid | 2 wt. % | 700 | N$_2$ | Yes | No |

Example V. Membrane Coating with Particles Pre-Incorporated with Sintering Promoters In this example, the sintering promoter 806 is incorporated into the ceramic particles 112 prior to coating. A 200 nm YSZ powder is impregnated with a promoter solution by use of the incipient wetness technique. The impregnated powder is dried at room conditions and calcined at 400° C. for 4 hours at 2° C./min ramp rate. The resulting powder is milled and used to prepare a coating solution in the way as described in examples I and II.

In this example, 4 g of the 200 nm YSZ powder mixed with 8 g of isopropanol (IPA) solvent, 0.1 g of PS131 dispersant, and 0.1 g of the PVB binder is ball milled at 110 RPM overnight. The resulting homogenous slurry is diluted to 0.5 wt. % with IPA and used for the first layer of the coating by vacuum filtration. A 50 nm YSZ coating solution is prepared with the same composition and procedure by use of the 50 nm YSZ powder. The milled slurry concentrate is diluted to 0.25 wt. % with IPA and used for the second layer of coating by vacuum filtration.

A 3.5 cm×5.5 cm coupon is cut out of a porous Ni sheet 104 of 49 μm thickness and coated on a 3.0 cm×5.0 cm area. The first coating is deposited by filtering 7.5 cc of the 0.5 wt. % 200 nm YSZ, while the second coating is made by filtering 5 cc of a 0.25 wt. % 50 nm YSZ solution. Eight of the membrane coupons are listed in Table 5. The 200 nm YSZ powder is doped with Mn, Ni, and LiSi promoters 806, while the 50 nm YSZ powder is added without a promoter 806. The LiSi promoter 806 is introduced by use of a lithium silicate colloidal solution of 20 nm particles at 12 wt. % solid. The coating loading ranges from 2.7 to 4.6 mg/cm$^2$. After drying at ambient conditions, the coated samples are sintered in humidified 3% H$_2$/N$_2$ under a temperature profile of 25 to 500° C. at 2° C./min, 500 to 750° C. at 1° C./min, and 4-h at 750° C.

TABLE 5

Two layers of ceramic membrane coatings with the 200 nm YSZ particles pre-doped with sintering promoter

| Sample ID-20180222 | Support porosity, % | 1$^{st}$ coating material | Sinter promoter solution used for impregnation | 2nd coating material | Total coating loading, mg/cm$^2$ |
|---|---|---|---|---|---|
| 1 | 44 | Mn-YSZ 200 nm | 1.0M Mn nitrate | 50 nm YSZ | 2.7 |
| 2 | 46 | Mn-YSZ 200 nm | 1.0M Mn nitrate | 50 nm YSZ | 4.3 |
| 3 | 42 | Ni-YSZ 200 nm | 1.0M Ni nitrate | 50 nm YSZ | 3.5 |
| 4 | 38 | 0.5 Mn + 0.5 Ni-YSZ 200 nm | 0.5M Ni + 0.5M Mn nitrate | 50 nm YSZ | 3.5 |

TABLE 5-continued

Two layers of ceramic membrane coatings with the
200 nm YSZ particles pre-doped with sintering promoter

| Sample ID-20180222 | Support porosity, % | 1st coating material | Sinter promoter solution used for impregnation | 2nd coating material | Total coating loading, mg/cm² |
|---|---|---|---|---|---|
| 5 | 46 | LiSi-YSZ 200 nm | 12 wt. % 20 nm lithium silicate colloidal solution | 50 nm YSZ | 3.3 |
| 6 | 44 | LiSi-YSZ 200 nm | 12 wt. % 20 nm lithium silicate colloidal solution | 50 nm YSZ | 3.4 |
| 7 | 46 | Ni-YSZ 200 nm | 1.0M Ni nitrate | 50 nm YSZ | 4.6 |
| 8 | 45 | LiSi-YSZ 200 nm | 12 wt. % 20 nm lithium silicate colloidal solution | 50 nm YSZ | 3.6 |

Figure 13:
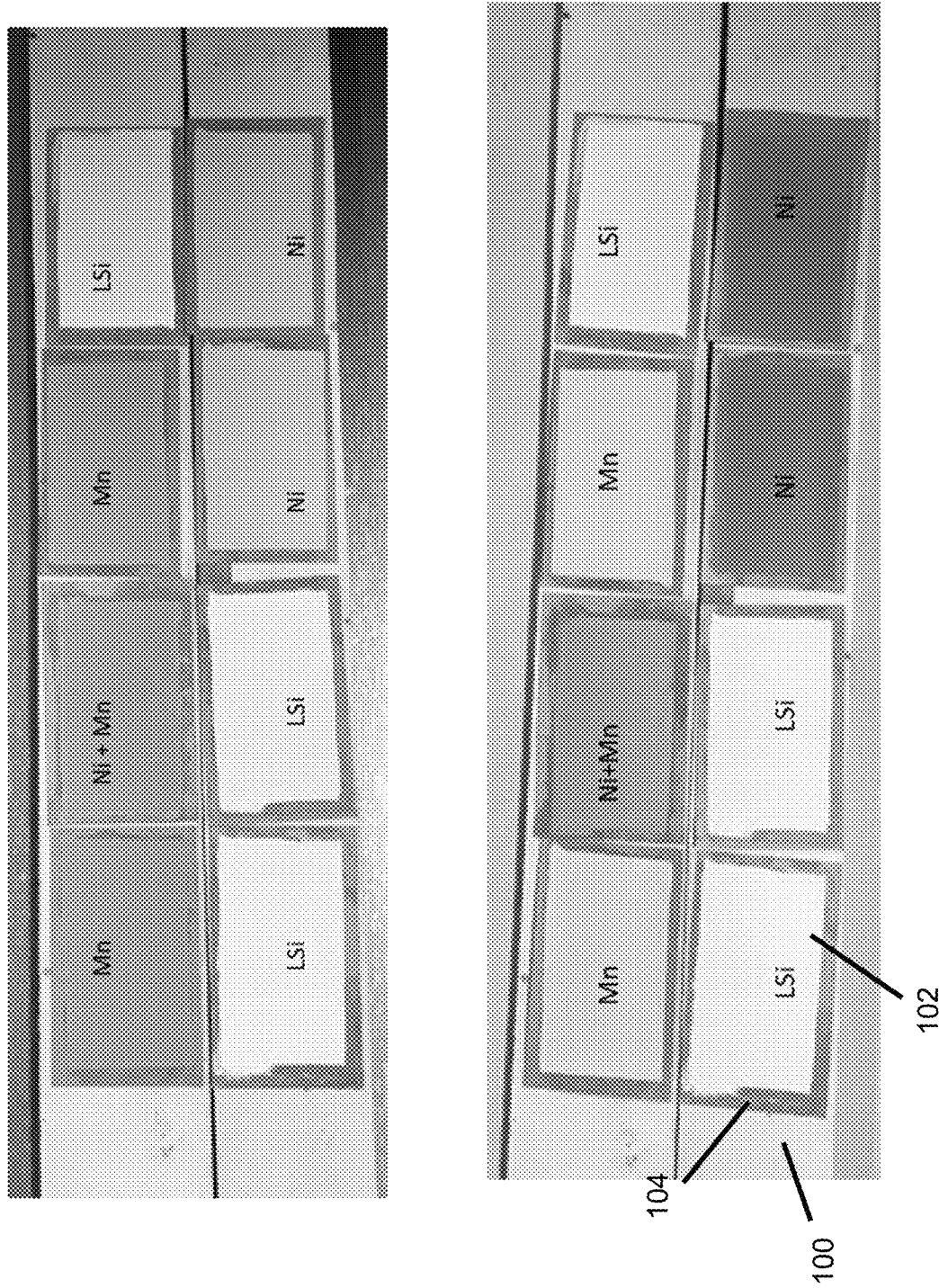
FIG. 13 presents photographs illustrating the morphologies of two-layer coatings made with a sintering promoter.

The morphologies of the samples listed in Table 5 before (upper image) and after (lower image) sintering are shown in FIG. 13. No cracks are observed after the coating is dried. No cracks and/or delamination are observed after sintering. The membrane coupons 100 stay flat and uniform after sintering. The results indicate that pre-doping the YSZ powder with a sinter promoter 806 is effective.

Figure 14:
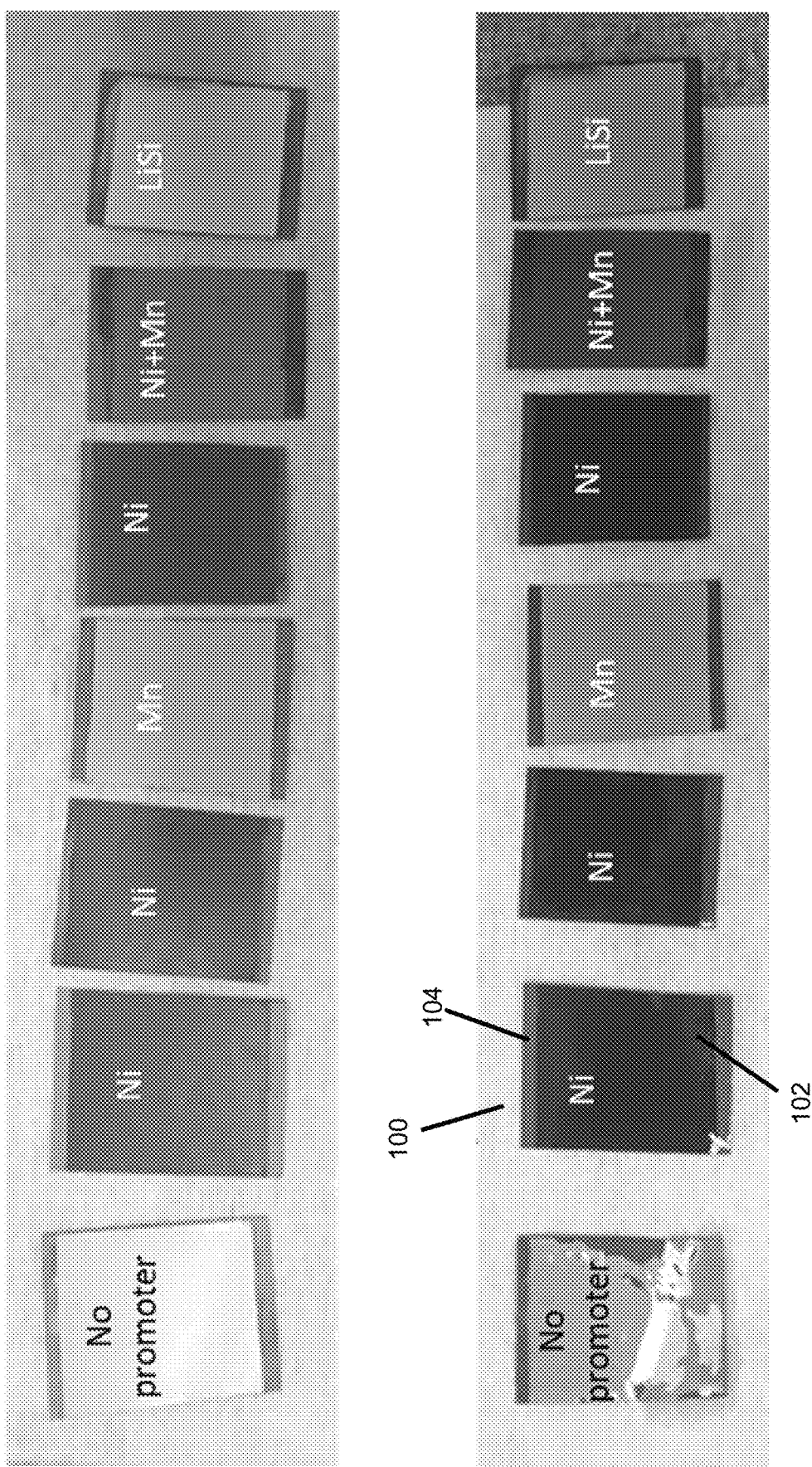
FIG. 14 presents photographs illustrating the stability of membrane subject to soaking in a hot KOH solution.

Addition of the sintering promoter 806 is expected to enhance the stability of the membrane 100 without sintering at excessively high temperatures. The impact of the sintering promoter 806 on the membrane stability is shown by soaking the membrane coupons 100 in 50 wt. % KOH/water solution at 120° C. The two-layer coating 102 sample without any sintering promoter 806 is used for comparison. This membrane 100 sample looks uniform and has good coating adhesion. However, after being immersed in a hot KOH solution, a significant portion of the ceramic membrane coating 102 is delaminated (FIG. 14). By comparison, the ceramic/metal membranes 100 sintered with the promoter 806 all look intact after hot KOH soaking.

Figure 15C:
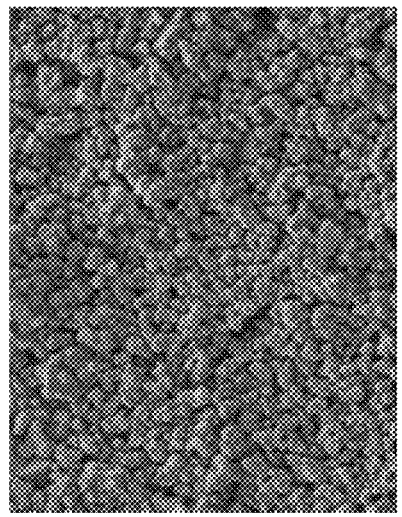
FIGS. 15A-15C are micrographs illustrating the microstructures of ceramic coating surfaces including.
Figure 15B:
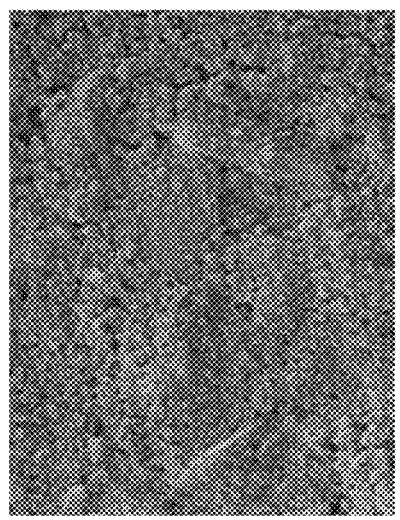
Figure 15A:
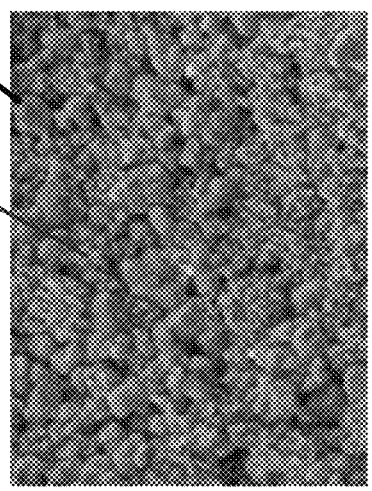

The microstructures of the ceramic coating surface are analyzed by SEM/EDS. FIGS. 15A-15C show the surface textures under 50,000×, 15,000×, and 15,000× magnification for the respective Ni-, Ni+Mn-, and LiSi-promoted membrane coatings. FIG. 15A (50,000× magnification) shows that voids between the 200 nm YSZ crystals are filled with the 50 nm YSZ particles. There is more 50 nm YSZ coverage on the Ni+Mn promoted membrane than the Ni and LiSi-promoted one. Given the same 50 nm YSZ coating solution and same volume used, penetration of the 2nd layer coating particle into the 1st layer can be significantly affected by textures of the first layer coating. EDS analysis of the membrane surface confirms the absence of segregated NiO, MnO, or lithium silicate particles, indicating that these promoters are incorporated into the YZS crystal. The membrane surface compositions are listed in table 6. The atomic ratio of promoter to Zr is in the range of 2.8/100 to 5.2/100. These promoters are present as minor constituent in the membrane.

TABLE 6

Surface composition of two-layer ceramic membrane coatings with the 200 nm YSZ particles pre-doped by sintering promoter

| Atomic ratio | Ni-YSZ 200 nm/50 nm YSZ | Mn + Ni-YSZ 200 nm/50 nm YSZ | LiSi-YSZ 200 nm/50 nm YSZ |
|---|---|---|---|
| Si/Zr | 0.0% | 0 | 5.2% |
| Mn/Zr | 0.0% | 1.2% | 0.0% |
| Ni/Zr | 3.1% | 1.4% | 0.0% |
| Y/Zr | 8.8% | 9.3% | 9.0% |
| Hf/Zr | 0.8% | 0.4% | 0.7% |
| Zr/Zr | 100.0% | 100.0% | 100.0% |

Example VI. Coatings with Different Sizes of YSZ Particles

The 200 nm and 50 nm YSZ powder materials are impregnated with respective 1.0M and 0.25 M Nickel nitrate solutions to introduce a NiO sintering promoter, as described in Example V. A 3.5 cm×5.5 cm coupon is cut out of a porous Ni sheet 104 and coated on 3.0 cm×5.0 cm area. The 0.25M Ni YSZ 50 nm and 1.0M Ni YSZ 200 nm powders are used to make the first layer coating 102 using the vacuum filtration technique. The YSZ solid loading and the amount of the solution used are listed in Table 7. The two-layer coating 102 is prepared using the 1.0M Ni YSZ 200 nm for the first layer of coating 102 and the 50 nm YSZ for second layer of coating 102. Solid loading in the coating solution and the amount of solution used for filtering are listed in Table 7. The coating loading is about 3.1-3.3 mg/cm². It is confirmed that the 50 nm YSZ particle can be directly coated to generate a continuous coating layer. No cracks are observed with the coating. The coated samples, after being dried at ambient conditions, are sintered in a continuous hydrogen furnace in which the membrane samples travel through a tunnel furnace that is controlled with a temperature profile from 25 to 805° C. and with counter current hydrogen gas flow. After the sintering, the membrane coupons stay flat and show no cracks or delamination.

Figure 16A:
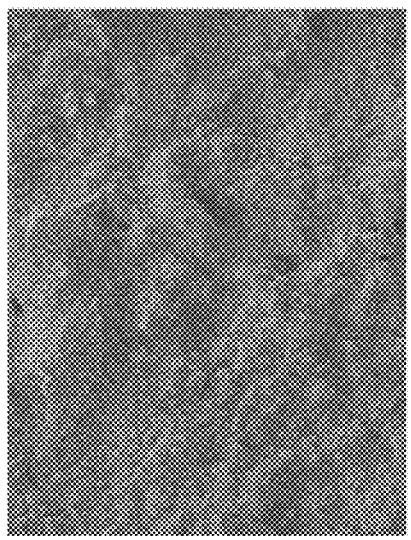
FIGS. 16A-16F are micrographs illustrating the surface and cross-sectional structures of coatings with different particles sizes according to embodiments.
Figure 16C:
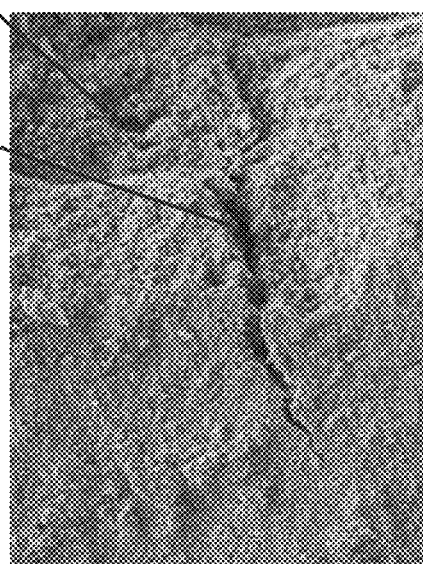
Figure 16E:
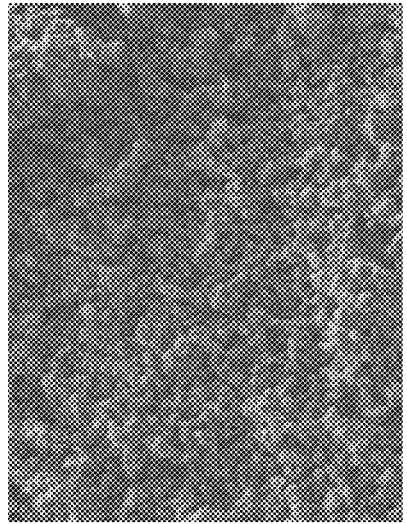
Figure 16B:
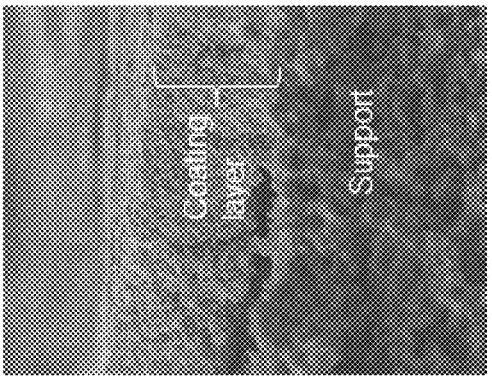
Figure 16D:
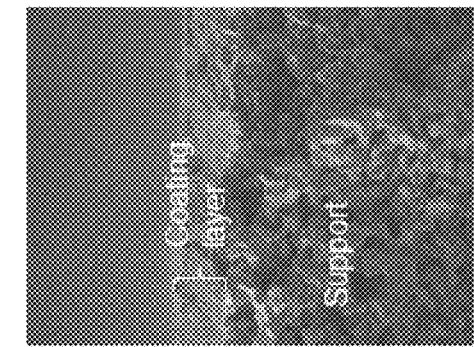
Figure 16F:
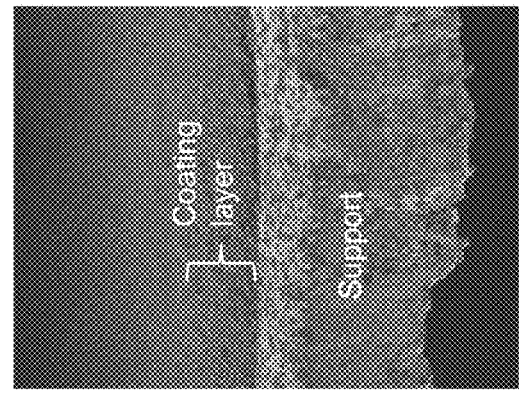

The microstructures of the three samples are analyzed by SEM/EDS. FIGS. 16A, 16C, and 16E show surface textures under 10,000× magnification of the one-layer 200 nm YSZ coating, one-layer 50 nm YSZ coating, and two-layer 200 nm/50 nm YSZ coating, respectively. Finer surface textures are shown with the 50 nm YSZ coating. However, there are some holes 1602 and micro-cracks 1604 in the one-layer coating made with the 50 nm particles. The membrane sheet 100 is cut to reveal the textures along the membrane thickness. FIGS. 16B, 16D, and 16F show fractured (or cut) cross-sectional textures of the one-layer 200 nm YSZ coating (1,000× magnification), one-layer 50 nm YSZ coating (2,500× magnification), and two-layer 200 nm/50 nm YSZ coating (2,500 magnification), respectively. The rough cutting causes delamination of the ceramic coating 102. Ceramic particles 112 are present in the support pores 116 after the coating layer 102 above the support 104 is peeled off. Even though there are cavities 1602 and microcracks 1604 on the one-layer 50 nm YSZ coating surface, the cross-sectional micrographs show a continuous coating layer 102 without cracks 1604 (FIG. 16D). The surface cavity 1602 and micro-cracks 1604 on this sample are likely caused by accidental incorporation of fugitive large particulates into the coating layer 102 during the preparation. The two-layer coating 102 with 200 nm/50 nm YSZ particles yields more uniform microstructures on the surface and in cross-section.

TABLE 7

Coating with different sizes of YSZ particles

| | Support sheet | | First coating | | | Second coating | | | |
|---|---|---|---|---|---|---|---|---|---|
| Sample ID 2018- | Avg thickness, μm | Porosity, % | Name | Solid in coating sol, wt. % | Vol used, ml | Name | Solid in coating sol, wt. % | Vol used, ml | Loading density, mg/cm² |
| 618-2 | 46 | 38.6 | 1.0M Ni YSZ 200 nm | 0.5 | 10 | | | | 3.3 |
| 611-2 | 48 | 40.2 | 0.25M Ni YSZ 50 nm | 0.5 | 10 | | | | 3.1 |
| 509-11 | 43 | 32.7 | 1.0M Ni YSZ 200 nm | 0.5 | 12.5 | 50 nm YSZ (F2) | 0.25 | 5 | 3.1 |

Figure 17A:
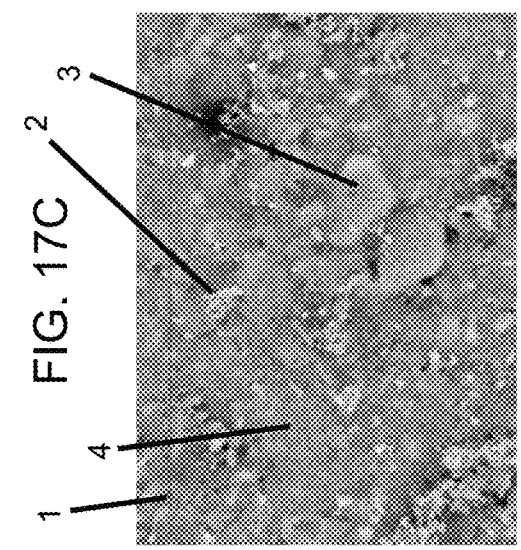
FIGS. 17A-17C are micrographs and corresponding tables illustrating the surface compositions of coatings made from different particle sizes.
Figure 17B:
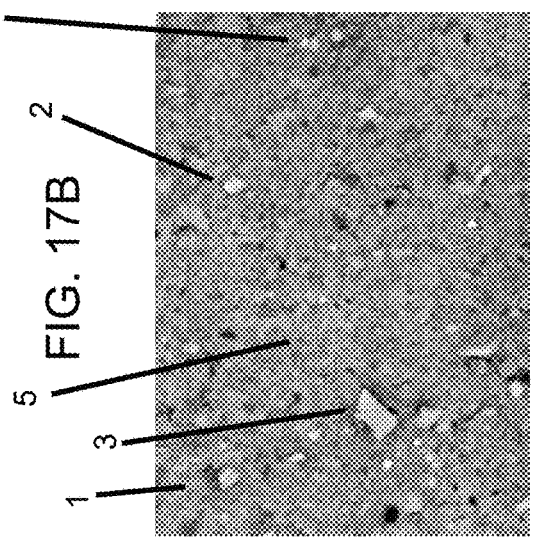
Figure 17C:
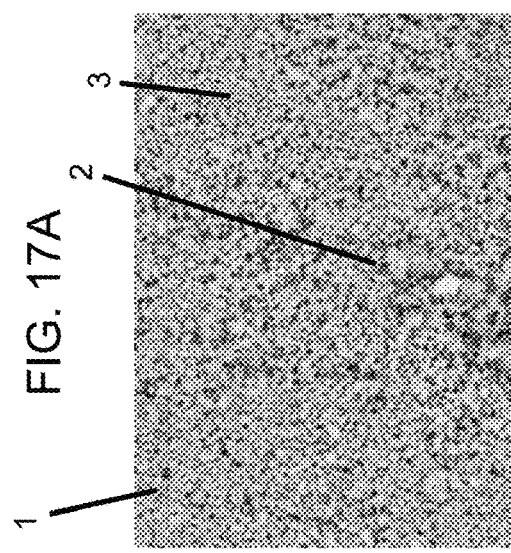

Uniformity of the NiO promoter 806 on the coating layer is checked by EDS analysis of different spots. FIG. 17 shows surface compositions of the three membrane coatings under 5,000× magnification. The compositions are normalized by atomic ratio to Zr. The atomic compositions on local spots are consistent with the whole area. Absence of segregated Ni particles is confirmed. The NiO sintering promoter is fully doped into the YSZ crystal at Ni/Zr atomic ratio over a range of 0.02/1.0 to 0.05/1.0 in these three samples analyzed.

Figure 18:
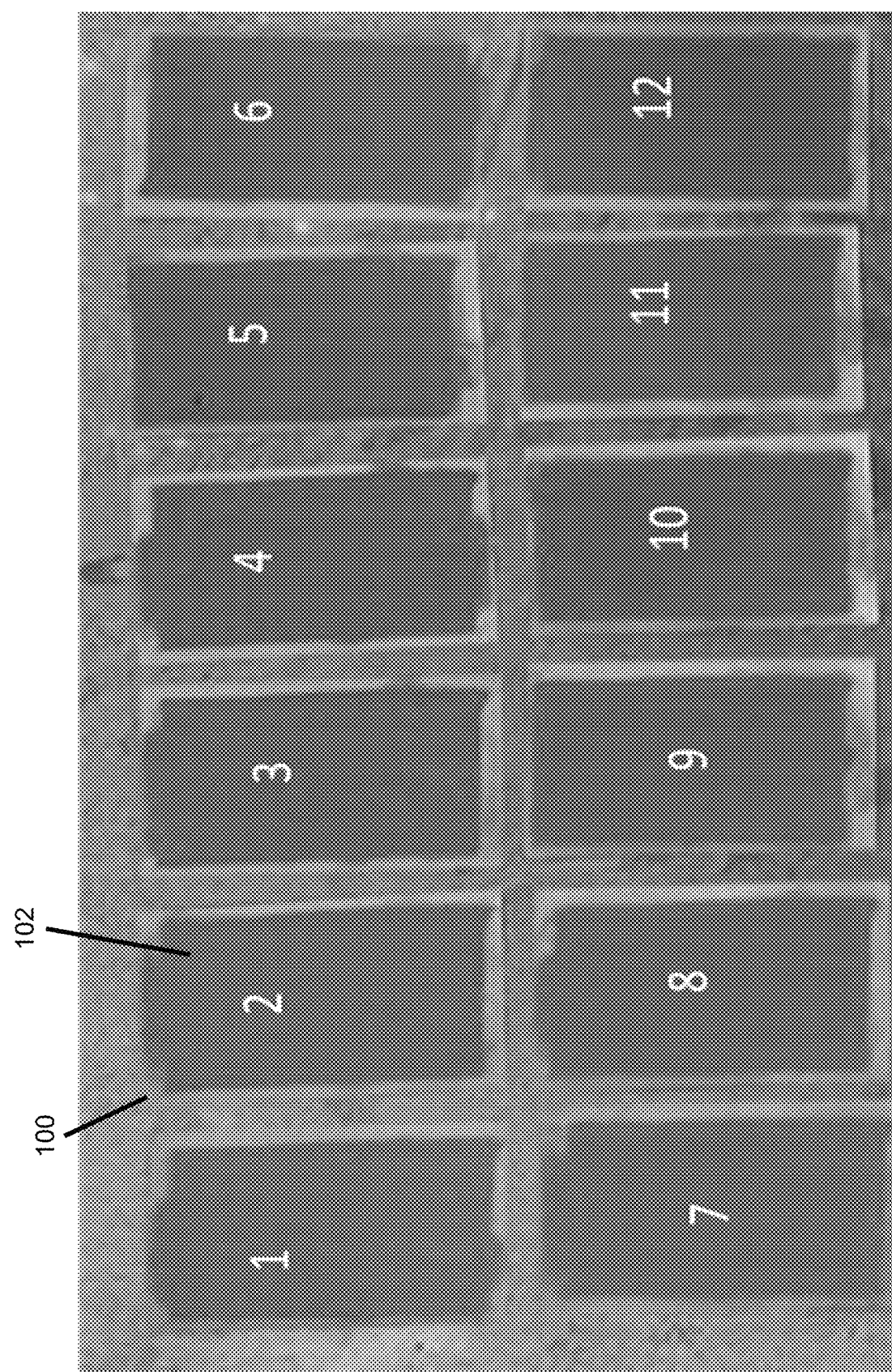
FIG. 18 is a photograph illustrating the morphologies of coatings of different thicknesses according to embodiments.

Example VII. Preparation of Membrane Coatings of Different Thickness and Membrane Scale-Up The 200 nm YSZ powder impregnated with 1.0M Nickel nitrate solution is used for the first layer coating 102, while the 50 nm YSZ powder without addition of any sintering promoter is used for the second layer of coating 102. By keeping the solid concentration of 0.5 wt. % for the 200 nm YSZ solution and 0.25 wt. % for the 50 nm YSZ solution, the coating thickness is varied by changing the amounts of solution used for vacuum filtering. A 3.5 cm×5.5 cm coupon is cut out of a porous Ni sheet 104 and coated on 3.0 cm×5.0 cm area. Table 8 lists 12 membrane samples 100 coated with loading density ranging from 0.6 to 4.3 mg/cm². The coated samples 100 are sintered in a continuous hydrogen furnace, in which the membrane samples 100 travel through a tunnel furnace that is controlled with a temperature profile from 25 to 815° C. and with counter current hydrogen gas flow. FIG. 18 shows the surface morphologies of the membrane samples 100 after sintering. All the membrane sheets 100 stay flat have the same surface textures. No cracks or delamination are observed. The thickness of the ceramic membrane coating 102 is determined by the thickness difference of a membrane coupon 100 before coating and after sintering. The resulting membrane thickness ranges from 2.2 to 23.0 μm.

Figure 19:
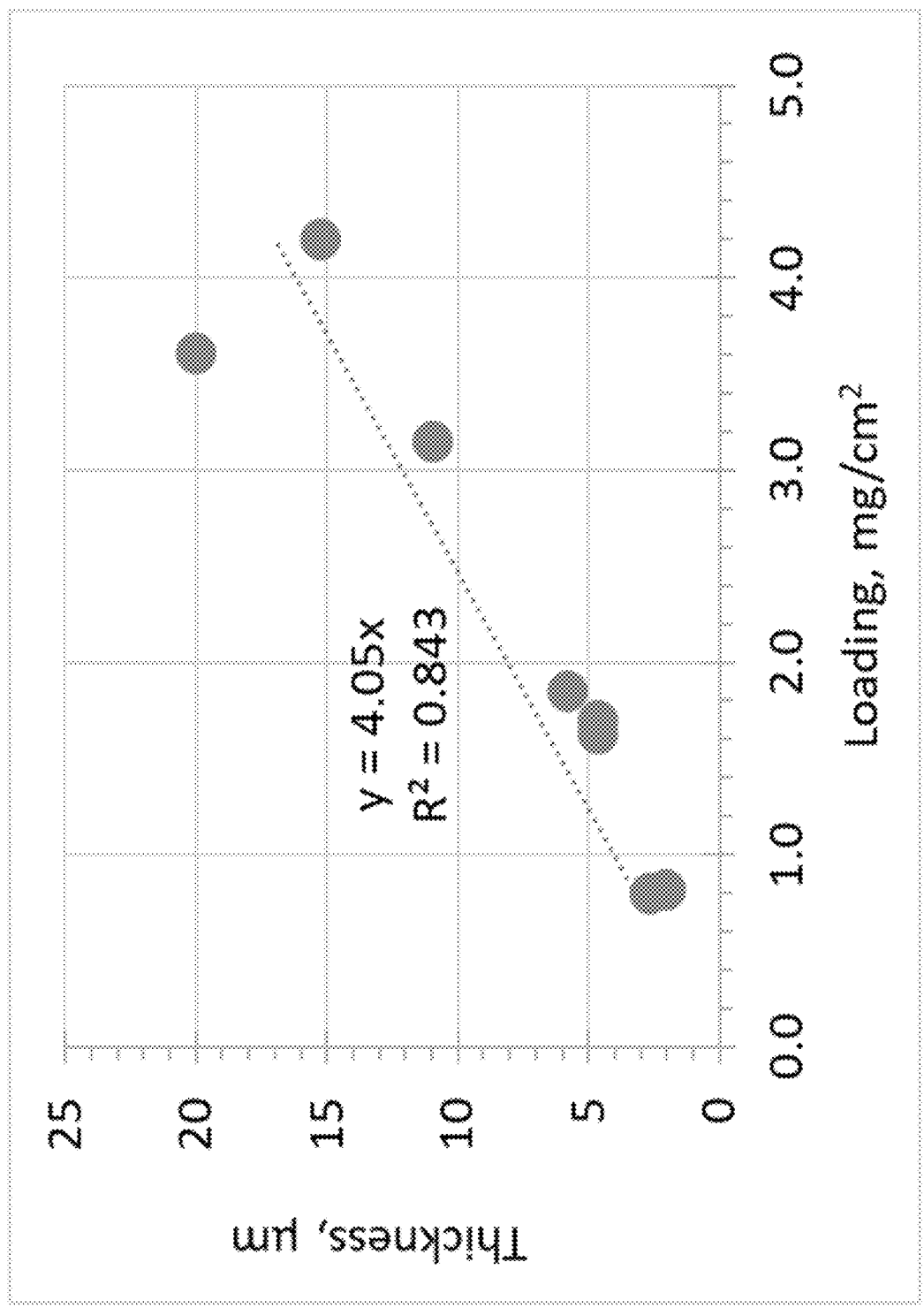
FIG. 19 is a plot illustrating the correlation between thickness and loading density.

FIG. 19 shows a linear correlation of the membrane thickness with loading density, which is expected. This example demonstrates the versatility of making membrane coatings 102 of desirable thickness with the design concept and preparation method of this embodiment.

Scale-up of the membrane preparation is demonstrated by making ceramic coatings on a 21 cm×21 cm porous Ni sheet. A Ni sheet of thickness 44 μm and porosity 45% is first coated with 80 cc of 1.0 wt. % 200 nm Ni–YSZ solution and followed with 60 cc of 0.25 wt. % 50 nm YSZ coating solution using a vacuum filtration technique. The sintering promoter NiO is added by impregnating the 200 nm YSZ and 50 nm YSZ powder with respective 1.0 M and 0.25M Ni nitrate solution, calcining the impregnated powder at 400° C., and milling the calcined powder, prior to being used for coating solution preparation. The coated sheet is dried under environmental conditions and sintered in the continuous tunnel furnace as described above. The resulting membrane sheet is shown in FIG. 3A. No crack, no delamination, no pinholes, and no deformation is seen. The sheet remains as flat and strong as the bare Ni support sheet (FIG. 3B). The coating thickness is 14.5 μm on average.

TABLE 8

Ceramic coatings of different thickness with 200 nm and 50 nm YSZ particles

| | Support sheet | | Volume used, ml | | Coating | |
|---|---|---|---|---|---|---|
| Sample ID-20180402 | Thickness, μm | Porosity, % | 1st coating | 2nd coating | Loading, mg/cm² | Thickness, μm |
| 1 | 49 | 42 | 3.0 | None | 1.1 | NA |
| 2 | 49 | 45 | 3 | 1 | 0.6 | 8.8 |
| 3 | 49 | 47 | 3 | 1 | 0.8 | 2.2 |
| 4 | 49 | 45 | 3 | 1 | 0.8 | 2.8 |
| 6 | 49 | 43 | 6 | None | 1.7 | 4.8 |
| 7 | 49 | 44 | 6 | 2 | 1.6 | 4.8 |
| 8 | 49 | 44 | 5 | 2 | 1.8 | 6.0 |
| 9 | 49 | 42 | 10 | 4 | 3.6 | 20.2 |
| 10 | 47 | 43 | 10 | 4 | 3.2 | 23.0 |

TABLE 8-continued

Ceramic coatings of different thickness with 200 nm and 50 nm YSZ particles

| Sample ID-20180402 | Support sheet | | Volume used, ml | | Coating | |
|---|---|---|---|---|---|---|
| | Thickness, μm | Porosity, % | 1st coating | 2nd coating | Loading, mg/cm² | Thickness, μm |
| 11 | 47 | 43 | 10 | 4 | 3.1 | 11.2 |
| 12 | 47 | 43 | 10 | 4 | 4.2 | 15.4 |

Example VIII. Porous Ceria Coatings

A Sm-doped ceria powder ($Sm_{0.20}Ce_{0.80}O_{2-x}$) of surface area 30-40 m²/g and particle size (D50) of 0.1-0.4 μm is used to coat the porous metal sheet 104. This powder material has crystal size of about 50 nm. Cobalt is further added to the Sm-doped ceria as a sintering promoter 806. The powder is mixed with a solvent and a dispersant to produce a homogeneous slurry. The slurry is applied onto a 3 cm×5 cm area of a porous Ni sheet 104 to obtain about 3.0 mg/cm² solid loading. The coated sample is dried at 80° C. The dried sample is sintered in the continuous furnace as the YSZ coating 102 in the above example. The sintered samples show no cracks and/or delamination. FIG. 20A (5,000× magnification) shows a highly porous surface texture of the coating and no cracks even with the powder of such small crystal sizes. The membrane sheet 100 is broken to reveal the cross-sectional structure. The coating has an excellent adhesion onto the support sheet. After the sheet is bent so severely to break, the coating layer remains in intimate contact with the support and penetration of the ceramic particles into the underneath support pore is revealed (FIG. 20B). The coating layer thickness is about 10 μm. Because the small primary particles are used for coating, the resulting membrane has the pores so fine that they are even difficult to be seen under high magnification (10,000×) in FIG. 20B. EDS analysis confirms the membrane composition of $Co_{0.02}Sm_{0.18}CeO_{2-\delta}$.

This example shows that the membrane structures demonstrated with YSZ materials can also be made with other durable metal oxide materials such as ceria.

Example IX. Ceramic Coating with Polymeric Binder 200 nm YSZ powder is attrition milled in IPA for 2 hrs. The milled powder is mixed with a dilute PTFE (Polytetrafluoroethylene) slurry (DuPont, DISP 30), C12EO10/$H_2O$ solution, and PS-236/$H_2O$ solution to form a homogeneous mixture denoted as D2. The mixture contains 0.85 wt. % YSZ, 0.051 wt. % PTFE, 1.7 wt. % C12EO10, and 0.85 wt. % PS-236. In the mixture, YSZ, PTFE, C12EO10 and PS-26 function as the solid matrix, binder, surfactant, and dispersant, respectively. The PTFE solution has a median particle size (D50) of about 200 nm. 8.0 cc of the D2 solution is used to coat 3 cm×5 cm area of a porous Ni sheet by vacuum filtering. After drying, 1.9 mg/cm² of coating is obtained. The results are summarized in Table 9.

TABLE 9

Composite coating of PTFE + YSZ

| Sample ID-2018 | Support thickness, μm | Support porosity, % | Vol of coating sol, ml | Coating loading, mg/cm² |
|---|---|---|---|---|
| 0523-14 | 44 | 31.3 | 8.0 | 1.91 |

Figure 1:
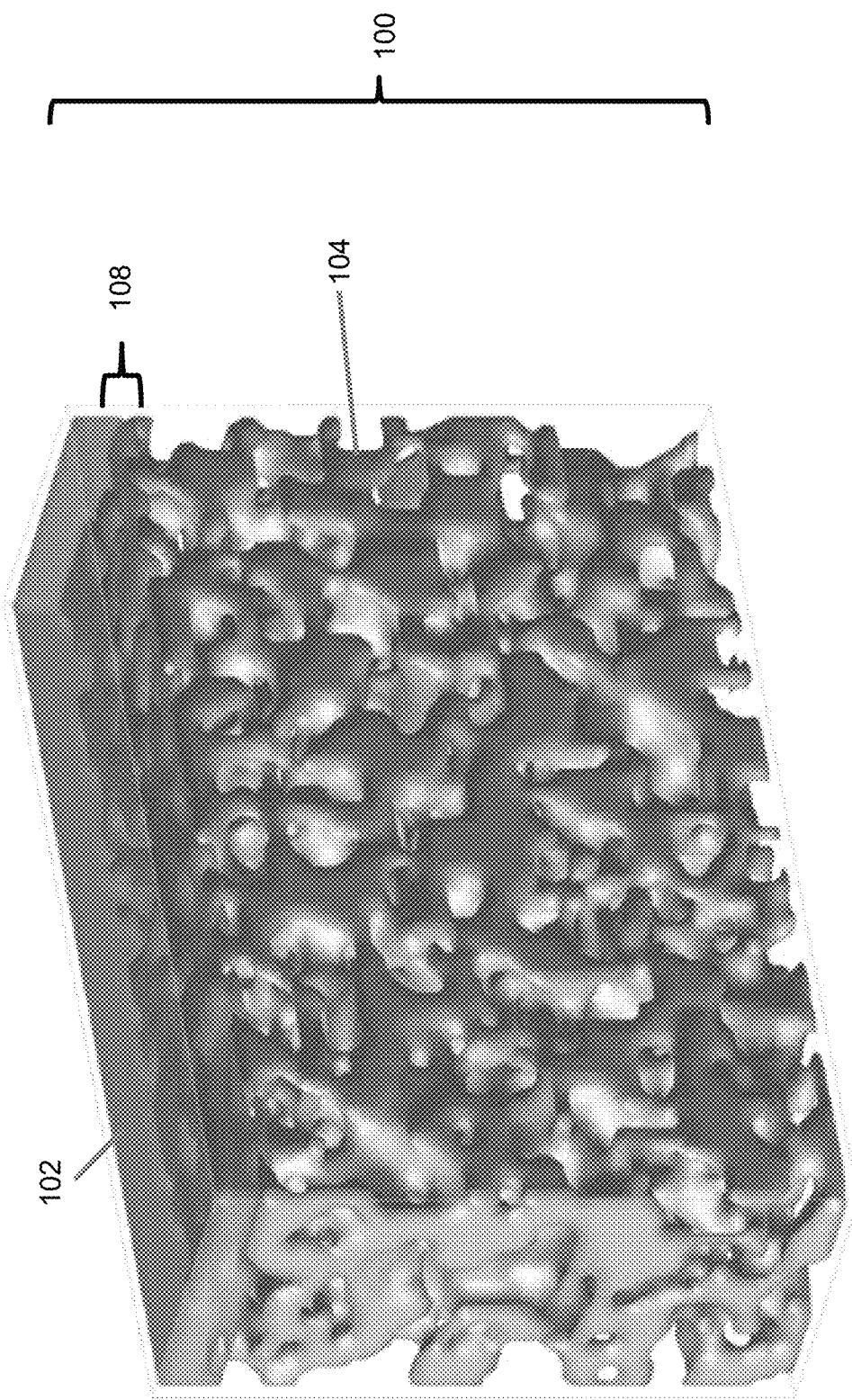
FIG. 1 is a perspective view of a ceramic/metal sheet membrane according to an embodiment.
Figure 21B:
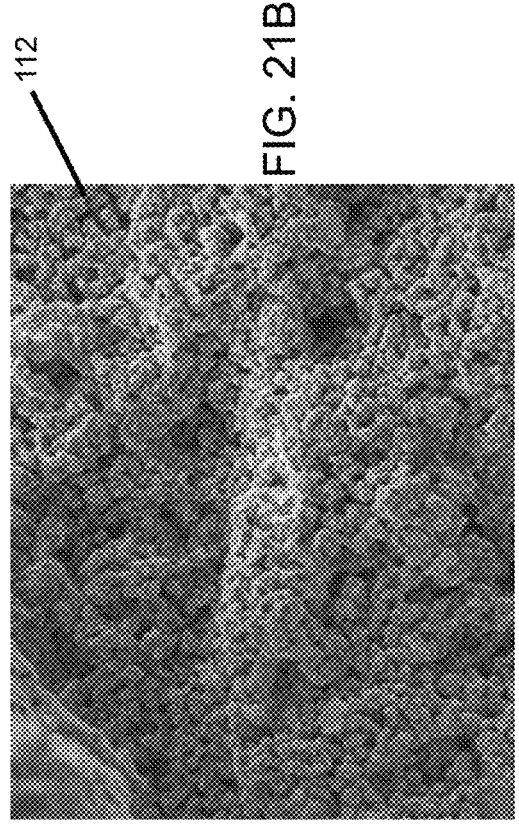
FIGS. 21A-21C are micrographs illustrating the morphology, surface texture and cross section, respectively of a YSZ+PTFE membrane according to an embodiment.
Figure 21C:
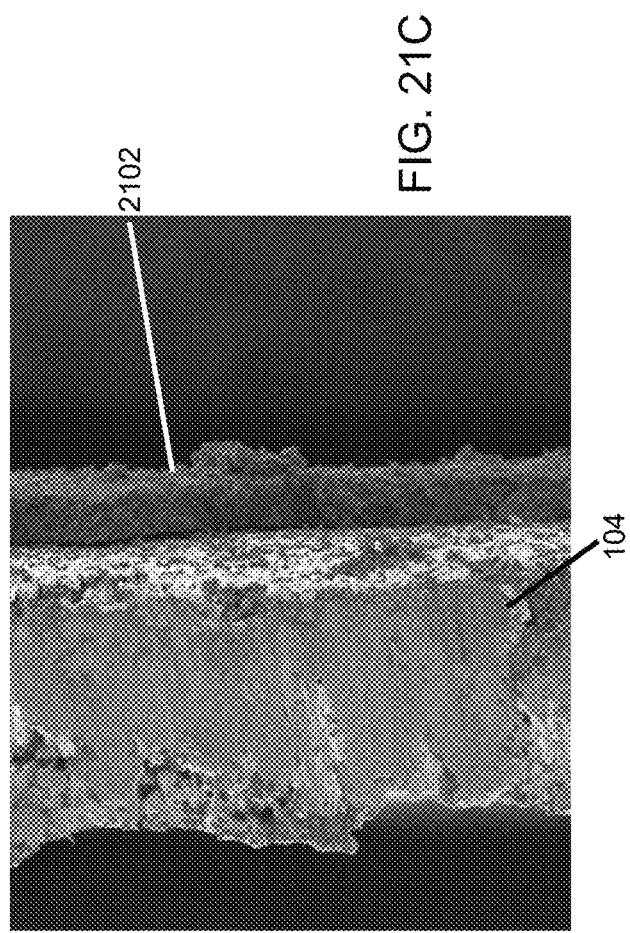
Figure 21A:
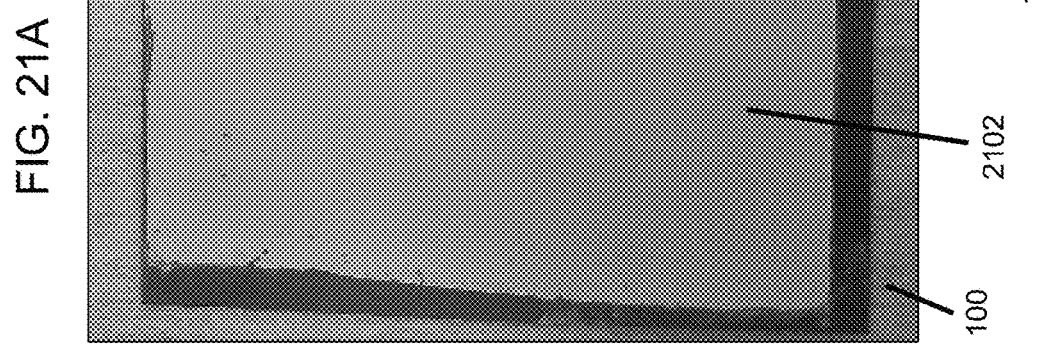
Figure 22:
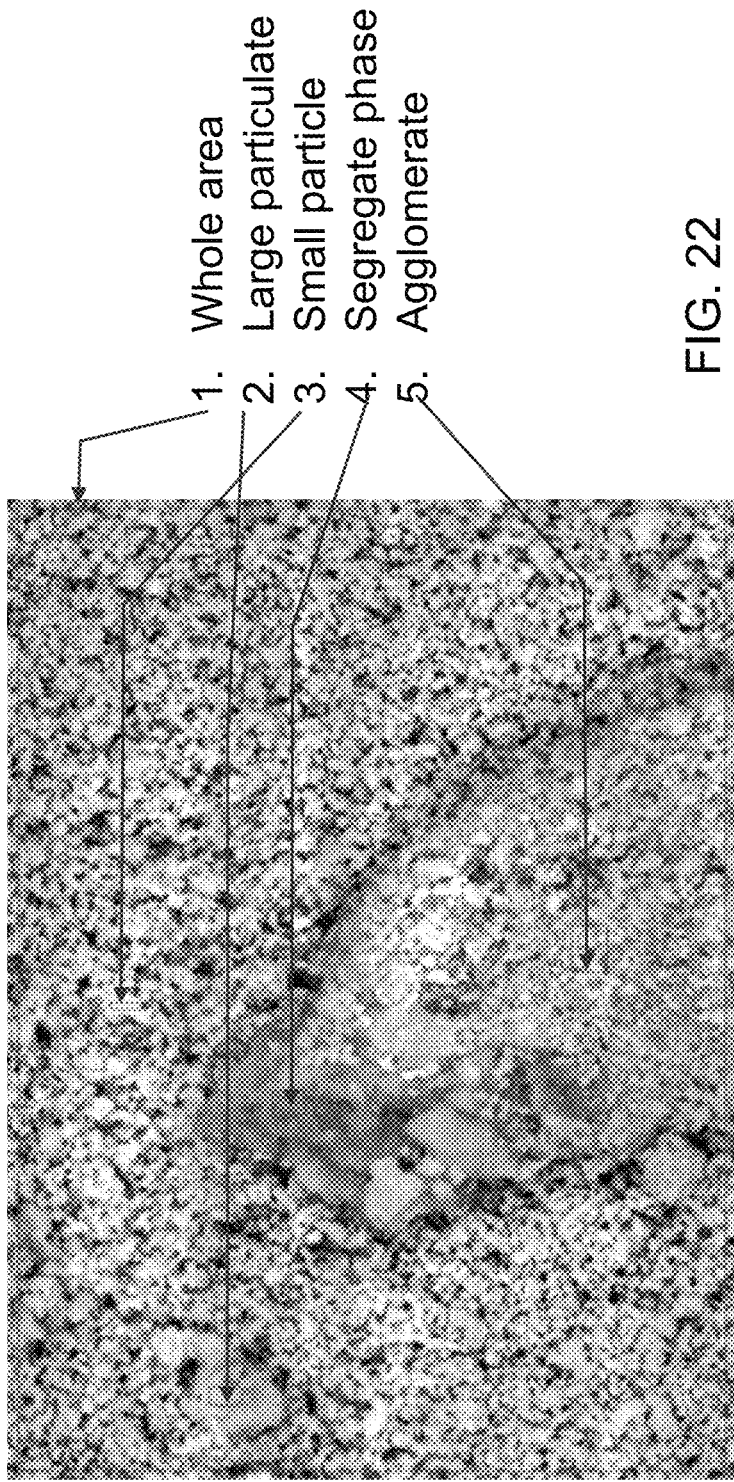
FIG. 22 is a micrograph and corresponding table illustrating the surface composition of a YSZ+PTFE membrane according to an embodiment.
Figure 23B:
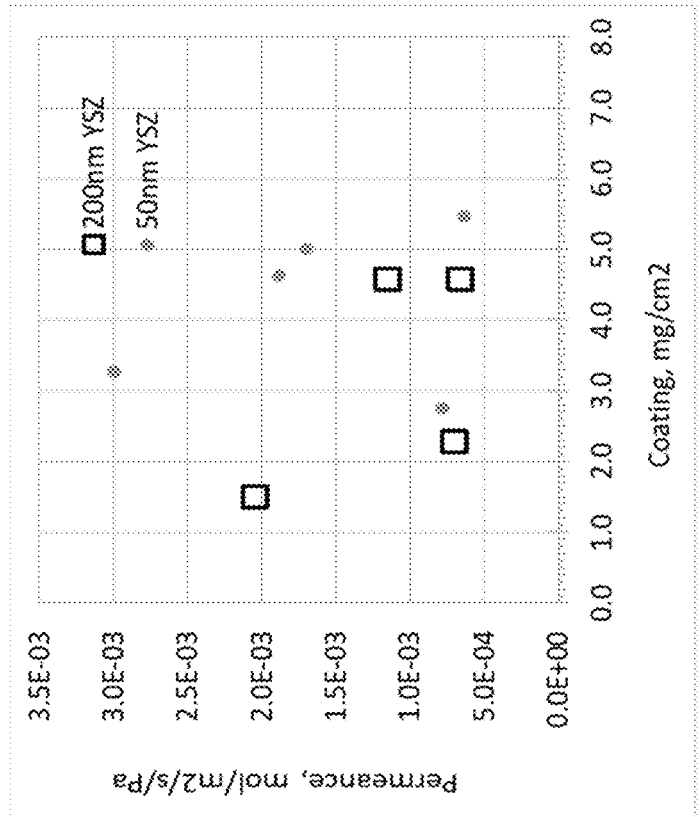
FIGS. 23A and 23B are plots of the gas permeance rate versus pressure gradient and impact of membrane loading on gas permeance, respectively, of ceramic coatings according to an embodiment.
Figure 23A:
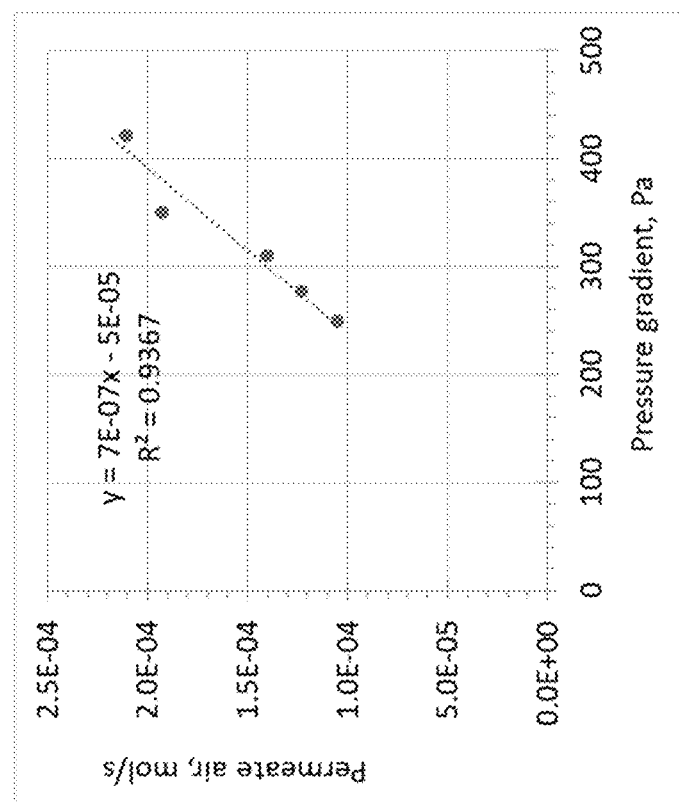

The coating is heated in a furnace from 22 to 350° C. at 10° C./min, to 400° C. at 5° C./min, and at 400° C. for 5 min. After the heating, the membrane coupon 100 is cooled down to room temperature at 15° C./min. The heat treatment turns the coating into a hydrophilic membrane 2102 of good adhesion. Stability of the coating is evaluated by heating the membrane coupon 100 in a KOH solution at 120° C. for 5 days. FIG. 21A shows that the membrane sheet 100 stays flat and the hydrophilic coating layer 2102 remains on. The membrane surface microstructures are shown in FIG. 21B (10,000× magnification). The packed YSZ particles 112 comprise the major constituent of the hydrophilic membrane coating 2102. The hydrophilic membrane sheet 2102 is broken to reveal the cross-sectional structure (FIG. 21C, 1,000× magnification). The average coating thickness is about 10 μm. Penetration of the YSZ particle into the support pore is evident on the spot where the coating layer is broken off. The membrane compositions are analyzed by EDS. The atomic compositions in five spots (areas) are shown in FIG. 23. The F content indicates presence of PTFE. The Ni content indicates depth of the hydrophilic coating layer 2102. No F atom is detected on spot 1—the whole area shown in the SEM image (5,000× magnification), and on spots 2 and 3 where the solid particles concentrate. Significant amounts of F are found on spots 4 and 5. The Ni content on those two spots is also higher than spots 1-3, which suggests thinner membrane coatings 2102. The EDS analysis indicates that PTFE agglomerates after aging in hot KOH solution and its binding function to hold the YSZ particles diminishes as a result.

This example shows that the YSZ particles can be adhered to the porous metal sheet 104 as a continuous membrane layer 2102 by use of a polymeric binder. The composite coating does not require high temperature sintering as pure ceramic coatings do. But, appropriate thermal treatment of the membrane coating 2102 is still necessary to let the binder form a binding net and obtain good membrane adhesion. The polymer binder can be destroyed or degraded if the membrane 2102 is heated at high temperatures either in liquid phase or in gas phase.

Example X. Gas Permeance of Ceramic Membrane Coatings

Gas permeance of the ceramic membrane coatings 102 may be characterized by air permeation measurements. A membrane disc of 2.5 cm diameter is cut out of the membrane sheet and mounted onto a test cell with a silicone rubber O-ring of 2.0 inner diameter. Air flow is introduced from the membrane coating side at a controlled pressure, while the permeated air comes out of the back side of the membrane under atmospheric pressure. The feed air conditions are 23-24.5° C. and 6-7% RH. The air permeation rate versus pressure gradient is plotted in FIG. 23A. The experimental data are regressed with a linear equation. Air permeance is obtained from the slope, while the breakthrough pressure is determined at zero permeation rate. For hydrophilic metal oxide coatings 2102, water vapor can condense in the pores by capillary condensation so that a certain pressure gradient is needed to break up the condensed water. Table 10 lists air permeance measurement results with two groups of ceramic membranes 2102. The first group of membranes 2102 have a one-layer coating with the 200 nm YSZ particles 112, while the second group of membranes 2102 have two layers of coating with the 200 nm YSZ followed by the 50 nm YSZ particles 112. A sintering promoter 806 is used for all the 200 nm YSZ coatings. The permeance versus the membrane loading is plotted in FIG. 23B to see any correlation. In general, the permeance should decrease with increasing amounts of coating deposited if the microstructures are the same or similar among different membrane coatings 2102. At the same loading level, a membrane 2102 made of smaller particles 2102 should have lower permeance. Scattering of data points in the plots for the two groups of membranes 2102 in FIG. 23B suggests that there could be variance in the microstructures among different membrane samples tested. The difference could result from use of different sintering promoters 806.

test cell 2400 with a silicone rubber O-ring of 2.0 inner diameter. Liquid 2402 is pumped from a feed tank 2402 into the feed side of the membrane cell 2400 with a pump 2406 and injected onto the surface of the membrane 100 from a feed tube 2408 located along the centerline of the cell 2400. The raffinate is collected from an outlet tube 2410 slightly away from the centerline. The feed pressure is controlled by the valve 2412 on the exit line. The permeate side is maintained under atmospheric pressure. Under steady state operating conditions, the permeate 2414 is collected in a permeate collector 2416 and recorded. The membrane 100 is first tested with de-ionized water and then, the feed is switched to a 50 nm zirconia colloidal solution (ZR50, Nyacol Nano Technologies, Inc.). The original 14 wt. % concentrate is diluted to 0.44 wt. % for testing of the membrane filtration efficiency. Table 11 lists experimental results of the membrane coatings 100 with one-layer 200 nm YSZ particles 112 and two-layer 200 nm YSZ particles 112 followed with the 50 nm YSZ particles 112. Table 12 lists testing results of one-layer membrane coatings 102 with the 50 nm YSZ particle.

The permeation rate may change with the run time. The permeance values listed in the tables 11-12 for de-ionized water are calculated based on the permeation rate measured at 20 min. The permeance values for the colloidal solution filtration are calculated based on the permeation rate measured at 40 min, because it takes a longer time for the permeation to become stabilized during the filtration tests. The colloidal solution looks like milk. All the membranes tested produce permeates as clear as de-ionized water. The results confirm that all these ceramic membranes 102 are effective for filtering out 50 nm particles.

TABLE 10

Air permeance of one-layer and two-layer YSZ membrane coatings

| | One-layer coating | | | | | | Two-layer coating | | |
|---|---|---|---|---|---|---|---|---|---|
| | | | | Membrane coupon ID 2018- | | | | | |
| | 0330-9 | 0521-1 | 0403-9 | 0327-1 | 0222-1 | 0402-10 | 0330-4 | 0307-08 | 0307-6 |
| Support thickness, µm | 49 | 46 | 49 | 49 | 49 | 50 | 50 | 47 | 45 |
| Porosity, % | 41 | 37 | 41 | 44 | 44 | 43 | 43 | 45 | 38 |
| Membrane sheet, µm | NA | 55 | 65 | 74 | 75 | 59 | 67 | 70 | 67 |
| Coating material | Ni-YSZ 200 nm | LiSi-YSZ 200 m | Ni-YSZ 200 nm | Mn-YSZ 200 nm | Mn-YSZ 200 nm/ YSZ 50 nm | Ni-YSZ 200 nm/ YSZ 50 nm | Ni-YSZ 200 nm/ Ni-YSZ 50 nm | Ni-YSZ 200 nm/ YSZ 50 nm | LiSi-YSZ 200 nm/ YSZ 50 nm |
| Membrane loading, mg/cm² | 1.5 | 2.2 | 4.5 | 4.5 | 2.7 | 3.2 | 4.6 | 5.0 | 5.4 |
| Sintering temperature, ° C. | 805 | 805 | 805 | 805 | 750 | 815 | 805 | 750 | 750 |
| Permeance, mol/s/m²/Pa | 2.1E−03 | 7.3E−04 | 1.2E−03 | 6.9E−04 | 8.0E−04 | 3.0E−03 | 1.9E−03 | 1.7E−03 | 6.5E−04 |
| Break through pressure, Pa | 84 | 219 | 172 | 226 | 241 | 142 | 185 | 68 | 162 |

Figure 24B:
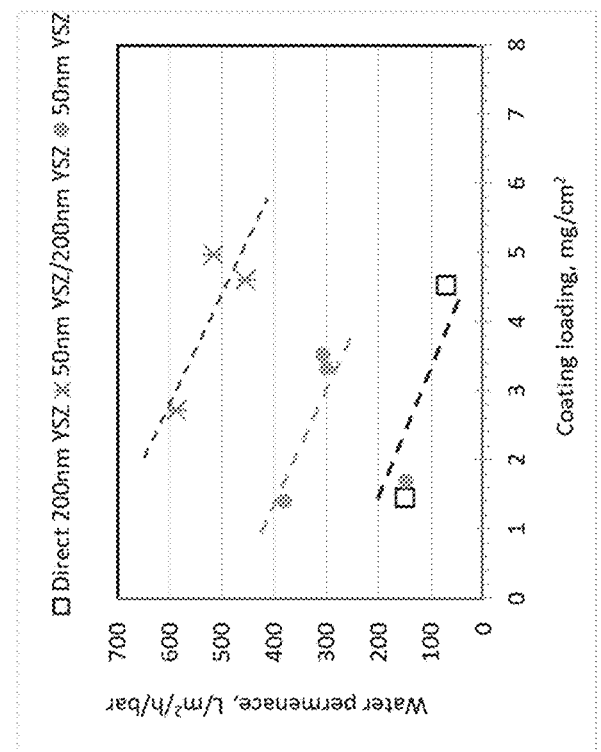
FIG. 24B is a plot of the permeance as a function of coating loading for coatings according to embodiments.
Figure 24A:
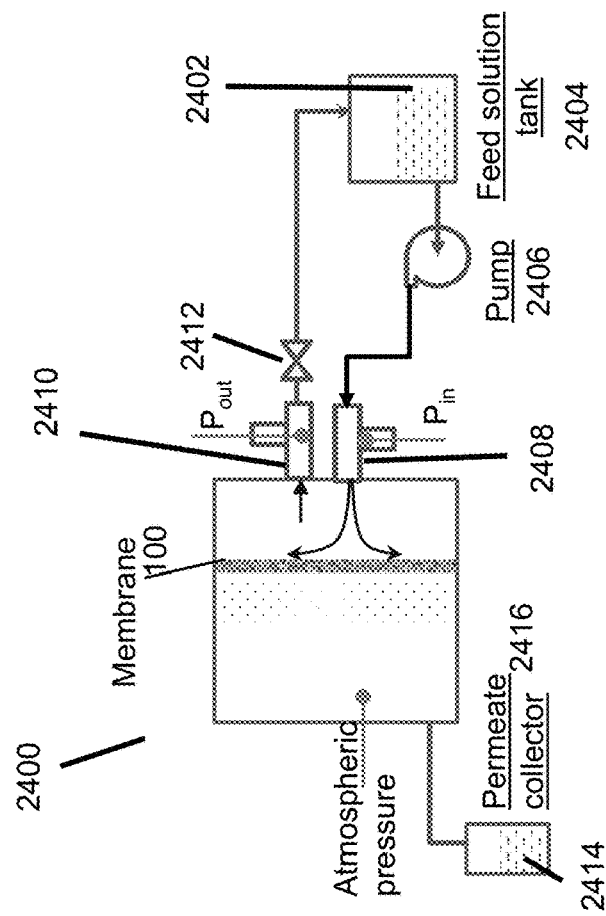
FIG. 24A is a schematic diagram illustrating the test setup for the measurement of permeance and filtering efficiency according to an embodiment.

Example XI Water Permeance and Filtration Characteristics of the Ceramic Membranes Water permeation and filtrating efficiency are tested on a differential disk-type membrane cell 2400 schematically illustrated in FIG. 24A. A membrane disc of 2.5 cm diameter is cut out of the membrane sheet 100 and mounted onto the Water permeance for the three kinds of ceramic coatings 102 is plotted versus coating loading in FIG. 24B. For each kind of membrane coatings 102, water permeance tends to decrease with increasing coating loading, which is expected. Deviation from this trend indicates formation of very different pore structures. One-layer coatings 102 with either 200 nm YSZ or 50 nm YSZ particles 112 yields lower water permeance than the two-layer coating 102 of the 200 nm YSZ particles 112 followed with the 50 nm YSZ particles 112. Thus, membranes 112 of graded pore structures are preferable for obtaining high permeance and filtering efficiency.

TABLE 11

Water permeance and filtering efficiency of ceramic membrane coatings based on 200 nm YSZ particles

| | 200 nm YSZ membrane | | 50 nm YSZ/ 200 nm YSZ membrane | | |
|---|---|---|---|---|---|
| Sample ID 2018- | 0330-9 | 0403-9 | 0222-1 | 0330-4 | 0307-8 |
| Support thickness, μm | 50 | 45 | 49 | 50 | 49 |
| Support porosity, % | 41 | 41 | 44 | 43 | 45 |
| Membrane sheet thickness, μm | | 65 | 75 | 67 | 70 |
| Coating material | Ni-YSZ 200 nm | Ni-YSZ 200 nm | Mn-YSZ 200 nm/ 50 nm YSZ | Ni-YSZ 200 nm/ 50 nm Ni-YSZ | Ni-YSZ 200 nm/ 50 nm YSZ |
| Loading, mg/cm$^2$ | 1.5 | 4.5 | 2.7 | 4.6 | 5.0 |
| Sintering T, °C | 805 | 805 | 750 | 805 | 750 |
| Permeance measurement with deionized water | | | | | |
| ΔP, bar | 0.70 | 0.67 | 0.74 | 0.93 | 0.95 |
| Permeance, liter/h/m$^2$/bar | 149 | 72 | 586 | 455 | 518 |
| Filtration measurement with ZR50 colloidal solution | | | | | |
| Feed conductivity, μS/cm | 621 | 621 | 621 | 621 | 621 |
| ΔP, bar | 0.79 | 0.67 | 0.45 | 0.59 | 0.60 |
| Permeance, liter/h/m$^2$/bar | 29 | 39 | 17 | 12 | 15 |
| Permeate | | | | | |
| Conductivity, μS/cm | 301 | 462 | 348 | 315 | 333 |
| Appearance | Clear | Clear | Clear | Clear | Clear |
| Reduction of conductivity | 51.5% | 25.6% | 44.0% | 49.3% | 46.4% |

TABLE 12

Water permeance and filtering efficiency of ceramic membrane coatings with 50 nm YSZ particles

| Sample ID 2018- | 20180522-12 | 20180522-11 | 20180521-13 | 20180522-8 |
|---|---|---|---|---|
| Support thickness, μm | | | | |
| Support porosity, % | 38 | 40 | 37 | 44 |
| Membrane sheet thickness, μm | 52.3 | 53.2 | 53.8 | 59.3 |
| Coating material | 0.25M Ni-YSZ 50 nm | 0.25M Ni-YSZ 50 nm | 0.25M Ni-YSZ 50 nm | 50 nm YSZ |
| Loading, mg/cm$^2$ | 1.4 | 1.7 | 3.3 | 3.5 |
| Sintering T, °C | 805 | 805 | 805 | 805 |
| Permeance measurement with deionized water | | | | |
| ΔP, bar | 0.06 | 0.84 | 0.93 | 0.76 |
| Permeance, liter/h/m$^2$/bar | 382 | 150 | 301 | 308 |
| Filtration measurement with ZR50 colloidal sol | | | | |
| Feed conductivity, μS/cm | 621 | 621 | 621 | 621 |
| ΔP, bar | 0.06 | 0.31 | 0.34 | 0.38 |
| Permeance, liter/h/m$^2$/bar | 130 | 21 | 13 | 30 |
| Permeate | | | | |
| Conductivity, S/m | 324 | 189 | 58 | 216 |
| Appearance | Clear | Clear | Clear | Clear |
| Reduction of conductivity | 47.8% | 69.6% | 90.7% | 65.2% |

Figure 25:
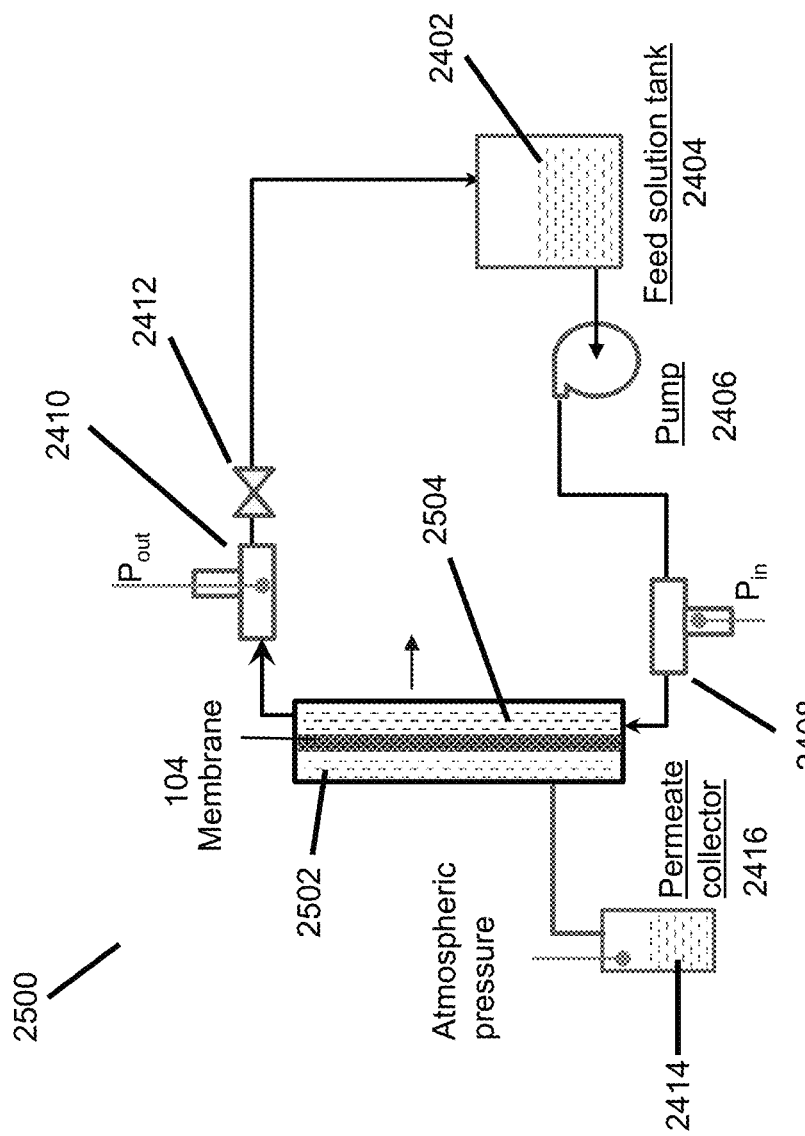
FIG. 25 is a schematic diagram illustrating the test setup for the measurement of cross flow filtration of a liquid.

Example XII Cross Flow Filtration of Particulate-Containing Liquid with the Thin Membrane Sheet Cross-flow filtration with thin membrane sheets 100 is illustrated with thin porous metal sheets 104 in this example. A thin porous nickel sheet 104 is cut into a rectangular coupon and fixed inside a flow cell 2500 with a rubber gasket. The test setup is illustrated in FIG. 25. The membrane coupon 104 is supported by four 0.8 mm-wide beams that form five 3.2 mm wide×1.0 mm deep permeate flow channels 2502. A 0.25 mm-thick corrugated polyester cloth is placed between the membrane coupon and the supporting beam as a liner. The feed flow channel is 20 mm wide×1 mm deep×42 mm long. Liquid fluid 2402 is pumped with a pump 2406 into the feed channel 2504 to flow over the surface of the membrane 104 at a predetermined velocity. The feed side pressure is controlled by the outlet valve 2412. The permeate side is maintained under atmospheric pressure.

Figure 26B:
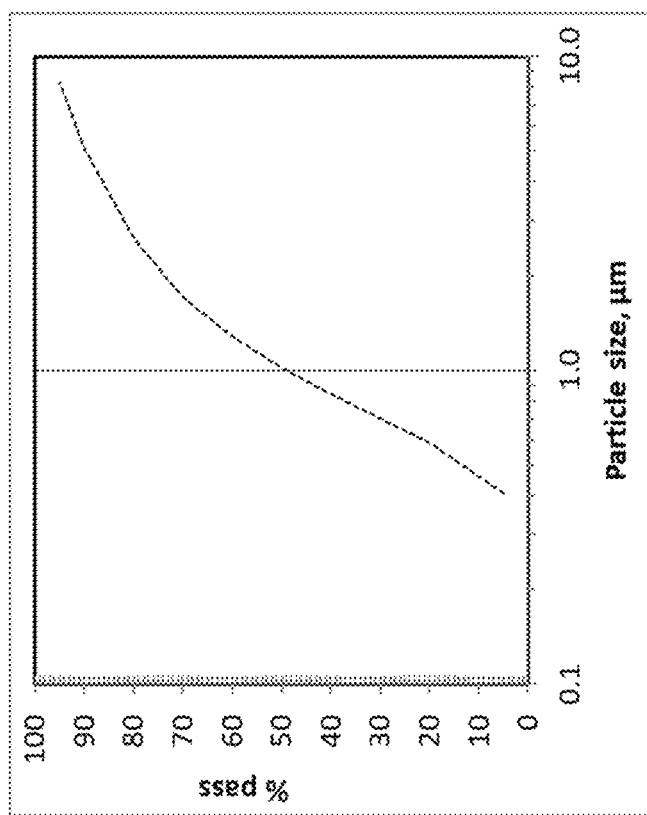
FIGS. 26A and 26B are plots of the particle size distribution of zeolite suspensions used for filtration testing.
Figure 26A:
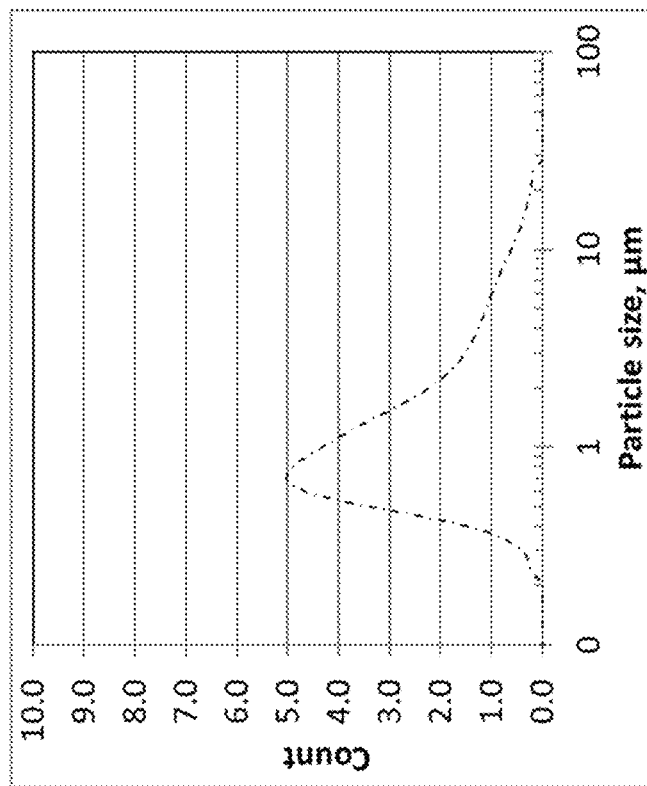
Figures 27A, 27B:
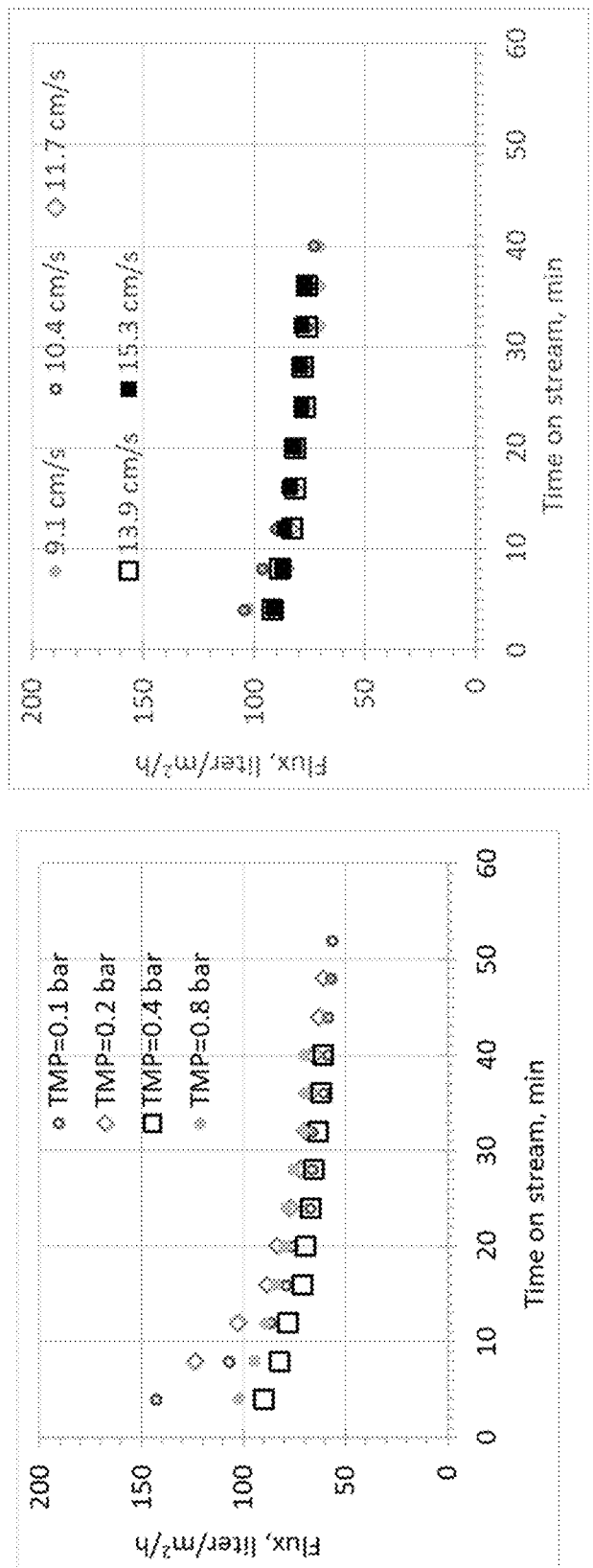
FIGS. 27A and 27B are plots illustrating the filtration performance of a porous nickel sheet membrane.

Attrition-milled zeolite crystals suspended in water at about 0.44 wt. % solid loading is used for the filtration tests. FIGS. 26A and 26B shows the particle size distribution profile measured with a Microtrac particle size analyzer. The mean particle size (d50) is about 1.0 μm. The fraction of the particles 112 smaller than 0.4 μm is less than 5%. The suspension is stable and the particles 112 do not sediment by gravity. The turbidity, total dissolved solids (TDS), and conductivity are 110 ppm, 64 ppm, and 136 μS/cm, respectively. The filtration is conducted at different trans-membrane-pressure (TMP) and different feed flow rates. All the permeates collected look as clear as de-ionized water. By contrast, the feed solution looks cloudy like skim milk. Typically, flux decreases with time at the beginning and then stabilizes. Increasing TMP shows little impact on the flux (FIGS. 27A and 27B) within the range of 0.1 to 0.8 bar tested. Classical Darcy's law states that the permeation flux in porous media increases proportionally with pressure gradient applied to the media. The insensitivity of flux to TMP observed here suggests formation of a filtration cake layer on the membrane surface and its flow resistance becomes much more significant than the porous Ni membrane sheet 104. Under constant TMP, the flux is not much affected by increasing cross-flow velocity within the range of 9.1 to 15.3 cm/s tested.

Figures 28A, 28B:
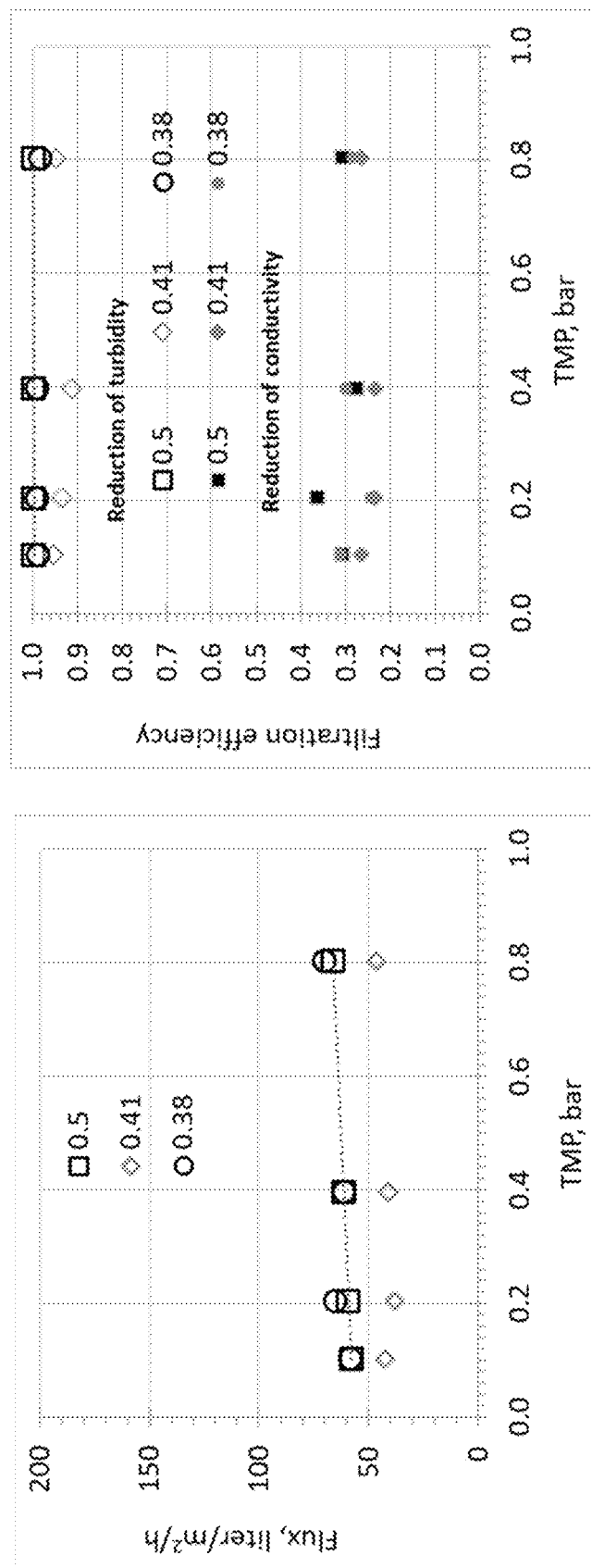
FIGS. 28A and 28B are plots comparing the filtration performance of three porous nickel sheet membranes.

Filtration performances of three porous Ni sheet membranes 104 of different porosity are compared in FIGS. 28A and 28B with the permeate collected at a filtration time of 40 min. The three membrane sheets 104 have comparable thickness (44-46 μm). The membranes 104 of 0.50 and 0.38 porosity have similar flux (FIG. 28A) and similar filtration efficiency (FIG. 28B). With these two membranes 104, the turbidity (open symbol) and conductivity (filled symbol) are reduced by >99% and about 20-30%, respectively. The membrane 104 of 0.41 porosity somehow shows slightly lower flux and lower filtering efficiency than the other two membranes 104. The difference likely results from variance in microstructures of the membrane sheet 104.

The porous metal sheet membranes 104 are also tested for filtration of the 50 nm zirconia colloidal solution with 0.44 wt. % solid loading. Turbidity, TDS, and conductivity of the colloidal solution are 176 ppm, 307 ppm, and 653 microS/cm, respectively. Filtration performances of the three membranes 104 are compared in Table 13. The permeate obtained with all the membranes 104 looks cloudy, indicating that the membrane pore size is not small enough to block the particles 908 in the colloidal solution. A fraction of the particulate in the feed is retained by the membrane 104. The membrane 104 of 0.50 porosity showed 84% reduction of the turbidity and 47% reduction of the conductivity. Thus, it is possible to engineer the pore structure of the porous metal sheet 104 to filter the particles at 50 nm level.

TABLE 13

Filtration of 50 nm colloidal solution with the porous metal sheet membranes

| Membrane | | | |
|---|---|---|---|
| ID 2018- | 0618-4 | 0618-3 | 0618-2 |
| Thickness, mm | 0.044 | 0.044 | 0.046 |
| Porosity | 0.38 | 0.41 | 0.50 |
| Filtration condition | | | |
| Temperature, ° C. | 23.4 | 23.4 | 23.4 |
| Cross flow velocity, cm/s | 8.6 | 8.4 | 8.5 |
| Feed inlet pressure, bar | 0.145 | 0.145 | 0.145 |
| Feed outlet pressure, bar | 0.062 | 0.062 | 0.062 |
| Permeate pressure, bar | 0 | 0 | 0 |
| TMP, bar | 0.103 | 0.103 | 0.103 |
| Results | | | |
| Flux, liter/h/m$^2$ | 22.9 | 22.9 | 36.5 |
| Permeance, liter/h/m$^2$/bar | 221 | 221 | 352 |
| Turbidity reduction, % | 23.1% | 25.0% | 84% |
| TDS reduction, % | 33.6% | 33.6% | 47% |
| Conductivity reduction, % | 33.5% | 33.5% | 47% |

Example XIII Filtration of Fine Particulates from Air with the Porous Metal Sheet Membrane of this Invention Particles 908 smaller than 2.5 µm can form stable suspensions in air or gas. These fine particulates are very difficult to remove and can be very harmful to human health. In this example, carbon black particulates are used to demonstrate the effectiveness of the membranes of this embodiment for removal of fine particulates 908. Black carbon (BC) particulates are produced due to in-complete combustion from open burning (OB) and controlled combustion (CC) of a range of carbonaceous products, including natural gas, liquified petroleum gas, gasoline, diesel, jet fuel, heating oil, wax, coal, woods, vegetable oil, and biomass. Their generation is ubiquitous. The current International Agency for Research on Cancer (IARC) evaluation is that carbon black is possibly carcinogenic to humans. The Occupational Safety and Health Administration (OSHA) has set the legal limit (permissible exposure limit) for carbon black exposure in the workplace as 3.5 mg/m$^3$ over an 8-hour workday. The carbon back (CB) materials tested in this work are i) 30 nm extra conductive black (ECB) (1000 m$^2$/g), ii) 95 nm lamp black (LB) (29 m$^2$/g), iii) 280 nm mid thermal black (9 m$^2$/g), and iv) 280 nm rubber carbon black (8 m$^2$/g), which cover a broad range of carbon blacks commonly encountered.

Figures 29A, 29B:
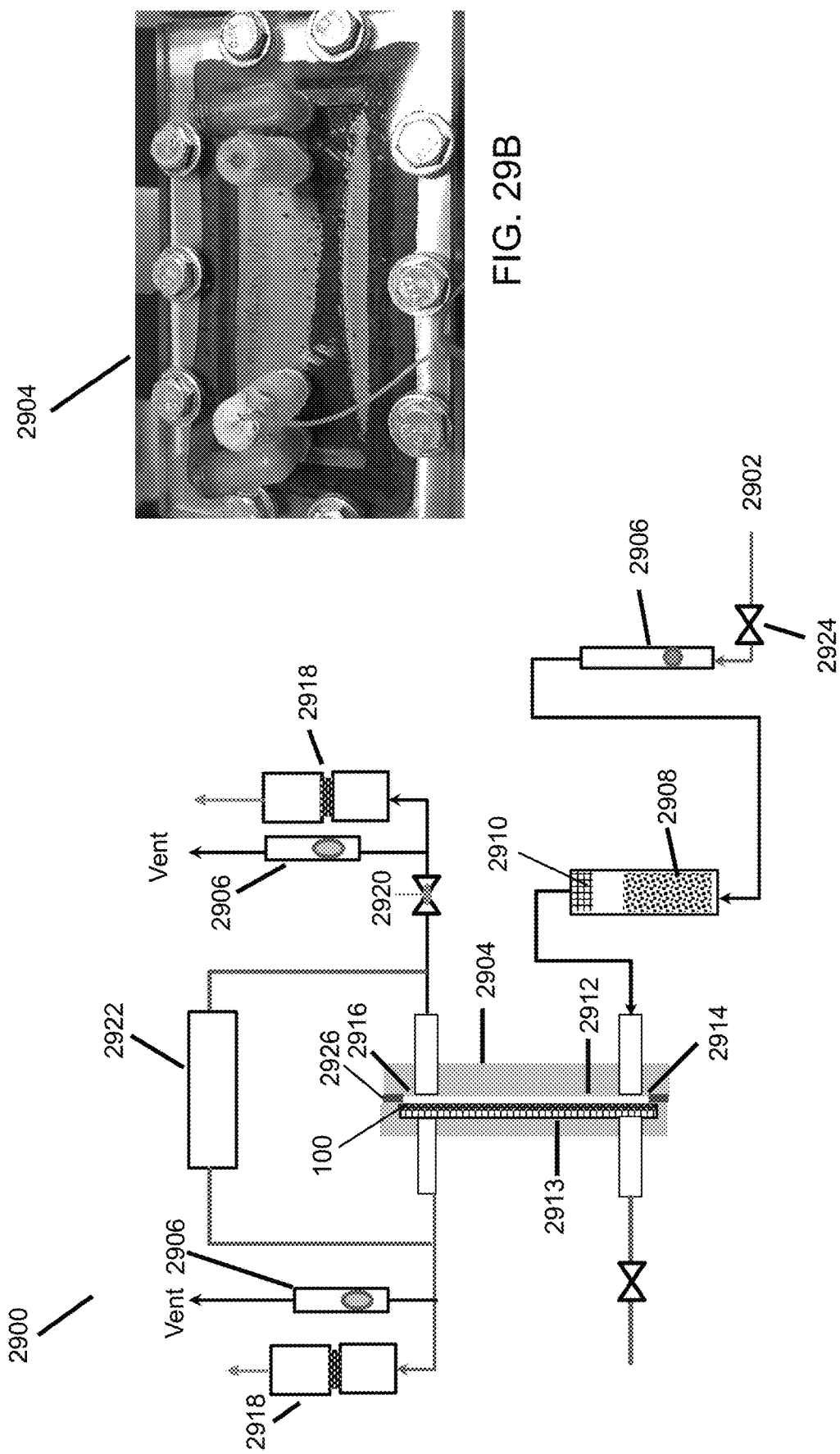
FIG. 29A is a schematic diagram of an air filtration testing apparatus.
FIG. 29B is a photograph of an air filtration test cell.

FIG. 29A shows a process flow diagram of the testing system 2900. In-house air 2902 is delivered by an air compressor (not shown) and its feed rate into the test cell 2904 is adjusted by a rotameter 2906. The feed air goes through a fluidized bed 2908 packed with black carbon powder and zirconia beads to load the carbon black particulate. Large particulates entrained by the air are filtered out with a mesh filter 2910, such as a 400 mesh metal filter. The CB-laden air enters the feed side 2912 of a membrane test cell 2904 from a first end 2914 and comes out from a second end 2916 opposite the first end 2914. The outlet air flow rate is measured with a rotameter 2906 and sent to ventilation. The CB content in the feed air is determined by sampling the outlet air with a particulate matter (PM) disk collector 2918. Air pressure in the feed side 2912 is controlled by use of a needle valve 2920 on the outlet line. The permeate air flow is monitored by use of a rotameter 2906 and sent to ventilation. The CB content in the permeate air is determined by sampling the permeate air with a PM collector. A manometer 2922 is used to measure the pressure gradient between the permeate 2913 and the feed 2912 side of the membrane 100. Filtration is conducted in two operation modes. In once-through mode, the feed air outlet valve 2920 is closed, and the feed air 2902 is forced to go through the membrane 100. In cross-flow mode, a fraction of feed air 2902 moves through the membrane 100 while the rest comes out of the cell 2900. In the once-through filtration, all the particulates 908 are retained by the membrane 100 inside the cell 2904. In the cross-flow filtration, the particulates 908 can be swept out of the membrane surface to prevent accumulation inside the cell 2904.

The rectangular test cell (FIG. 29B) has a transparent glass cover to observe the membrane surface. The back plate of the cell provides ten 92.4 mm long×0.3 mm wide and 1.5 mm deep beams to support the membrane sheet 100, which form 10 permeation channels of 92.4 mm long×3.5 mm wide×1.5 mm deep. A 0.25 mm-thin corrugated polyester cloth is used as a liner between the membrane sheet and support beams. The membrane 100 is sealed with a silicone rubber gasket 2926 to form 45 mm wide×100 mm long×1.0 mm high feed channel.

Figures 30A, 30B:
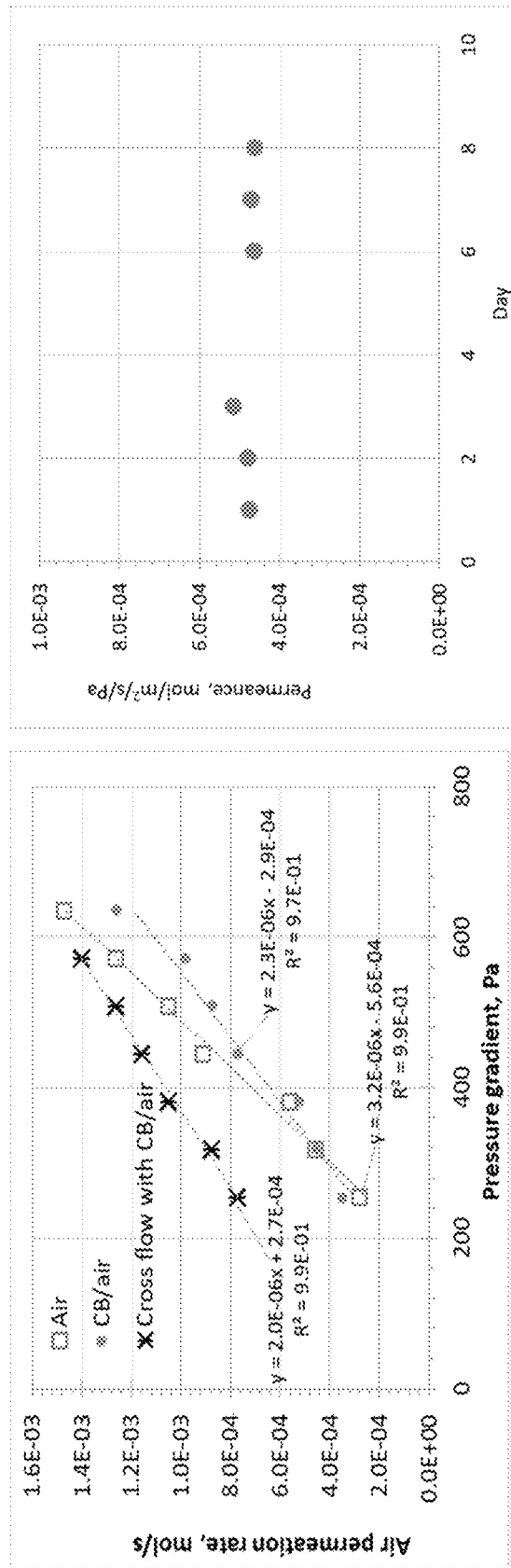
FIGS. 30A and 30B are plots illustrating permeation at different pressure gradients and the stability of once-through filtration with carbon black in air, respectively, of a porous nickel membrane according to an embodiment.

An as-prepared porous nickel sheet 104 of 49 µm thickness and 0.469 porosity is tested for filtration of 280 nm thermal BC. The membrane 104 is first tested for once-through of in-house air without any CB loading. FIG. 30A shows that the permeation rate increases with pressure gradient across the membrane 104. The experimental data are regressed with a linear equation to calculate the air permeance and break through pressure. The results are listed in Table 14. The break through pressure is the pressure gradient required to start permeation. The feed side is switched to the CB-laden air to conduct once-through filtration. Increase of the permeation rate with pressure gradient is well described by a linear equation. The permeance for CB filtration is slightly lower than the pure air. Finally, cross-flow filtration of the CB-laden air is conducted by keeping a constant feed air flow rate and adjusting pressure gradient. The permeance value listed in Table 14 shows that the air permeance measured in cross-flow filtration is slightly lower than in the once-through. The cross-flow filtration shows a negative break through pressure. CB content in the feed and permeate is measured by sampling respective feed and permeate air with a PM collector 2918. In the PM collector 2918, a polyether sulfone (PES) membrane disk is used to collect the CB. The CB content is calculated based on the weight collected and the volume of flow-through gas. The CB concentration in the feed air is about 693 mg/m$^3$. By contrast, no CB is collected from the permeate air. The CB is completely removed by the membrane 104.

Figure 31B:
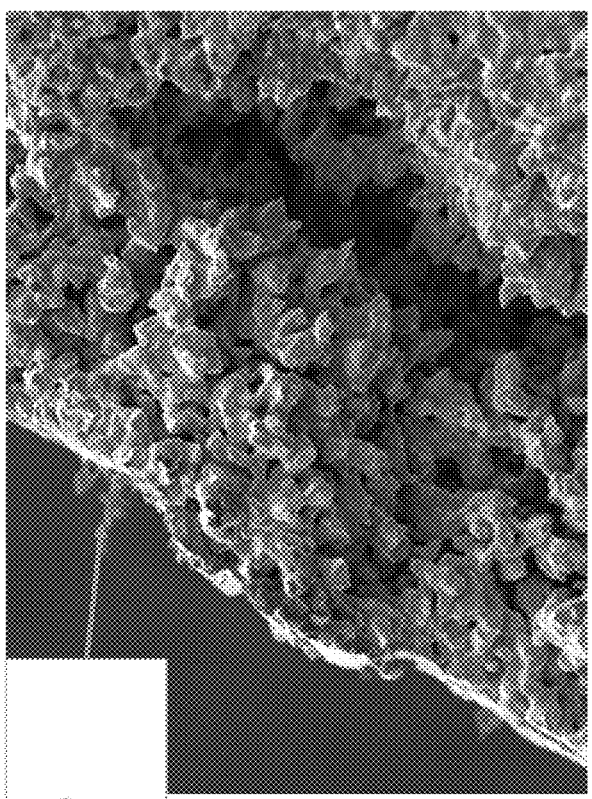
FIGS. 31A and 31B are micrographs illustrating the texture of the surface of a porous nickel sheet exposed to carbon black in air and a fractures surface of the porous nickel sheet, respectively.
Figure 31A:
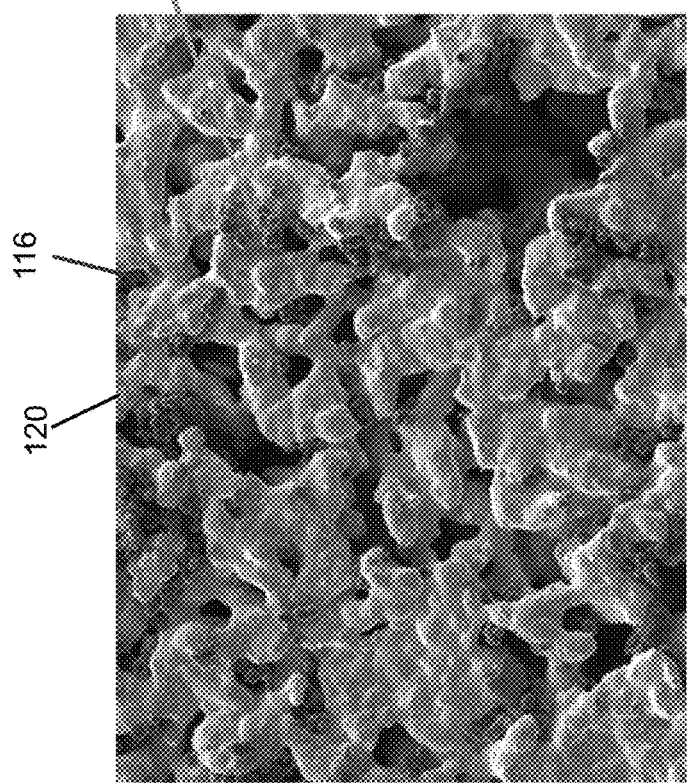

To assess the stability of the membrane 100, once-through filtration with CB/air is conducted continuously for more than a week. FIG. 30B shows that air permeance is stable over 8 days of testing period. This result is very unexpected, because the conventional wisdom is that permeance would quickly decline as the CB accumulates on the membrane surface. It is found that the CB does not stick on the present the surface of the membrane 100 and fine CB particulates tend to form large agglomerates. As a result, the accumulated CB agglomerates inside the feed channel can be easily swept off and cleaned. The cleaned membrane is re-tested, and the results are compared to the as-prepared one in Table 14. The permeance for once-through and cross-flow filtration of CB/air is slightly decreased. The microstructures of the porous metal sheet used for CB filtration tests are analyzed by SEM. The surface (5,000× magnification) and wall structures (2,500× magnification) are shown in FIGS. 31A and 31B, respectively. The CB particles 3100 are smaller than the metal sheet pores (FIG. 31A). Interestingly, the small particles tend to form agglomerates among themselves when they hit the membrane surface rather than going through the membrane. The SEM image of a fractured sheet (FIG. 31B) confirms the absence of CB particles 3100 inside the membrane sheet 100. The pores in the present membrane sheet 100 are not through holes and instead, are 3-D networked structures. Thus, the particulate may bounce back when it hits the bottom of a surface pore.

TABLE 14

Filtration testing results of one porous Nickel sheet membrane as-prepared (49 μm thickness, 0.469 porosity) with 280 nm thermal BC (N990)

|  | Once-through | | Cross-flow (V = 195 cm/s) |
| --- | --- | --- | --- |
|  | Air | CB/air | CB/air |
| As-prepared membrane coupon | | | |
| CB loading in feed air, μg/m$^3$ | 0 | 6.93E+05 | 6.93E+05 |
| CB in permeate air, μg/m$^3$ | 0 | 0 | 0 |
| Permeance, mol/m$^2$/s/Pa | 8.0E−04 | 5.8E−04 | 5.0E−04 |
| Break through pressure, Pa | 1.8E+02 | 1.3E+02 | −1.4E+02 |
| After cleaning of the tested coupon | | | |
| CB loading in feed air, μg/m$^3$ | 0 | 2.75E+05 | 1.16E+05 |
| CB in permeate air, μg/m$^3$ | 0 | 0.00E+00 | 0.00E+00 |
| Permeance, mol/m$^2$/s/Pa | 4.7E−04 | 4.4E−04 | 4.4E−04 |
| Break through pressure, Pa | 1.0E+02 | 1.2E+02 | −5.5E+01 |

Figure 32:
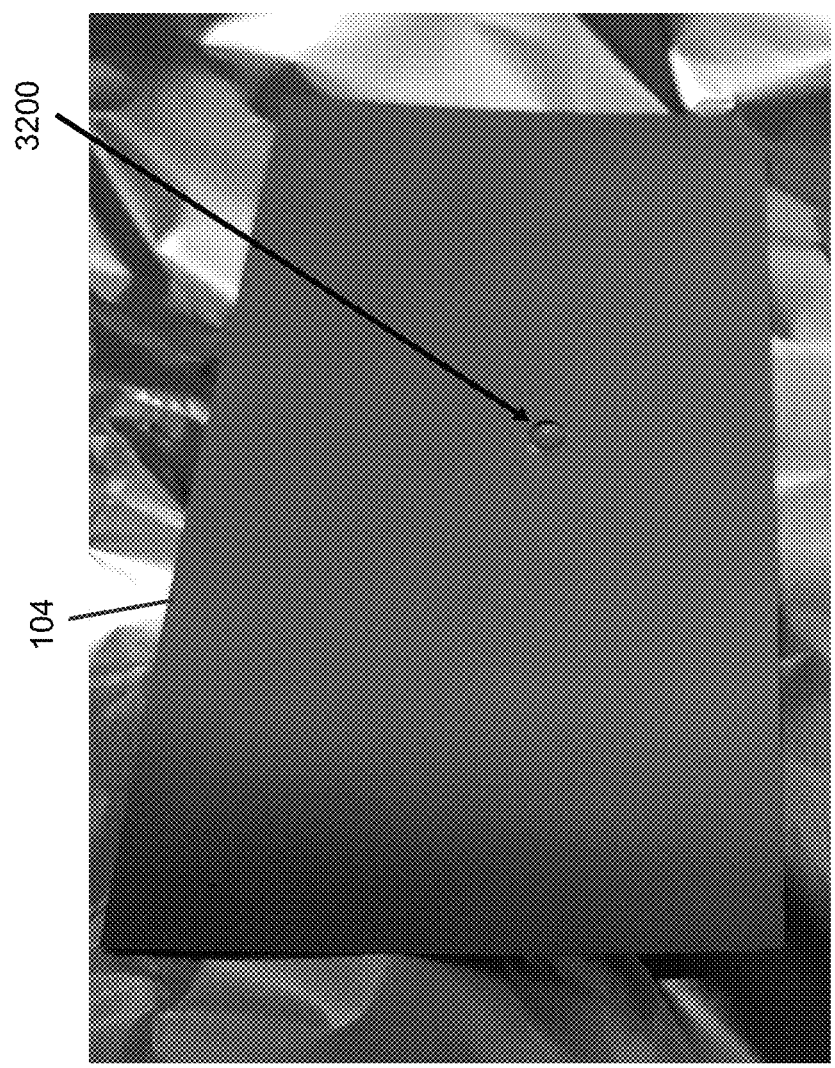
FIG. 32 is a photograph of a hydrophobic this porous metal sheet.

Example XIV Filtration of Fine Particulates from Air with Surface-Treated Thin Porous Metal Sheet Membrane of this Invention The porous metal sheet 104 as-prepared may be hydrophilic such that its filtration performance can be significantly affected by humidity in air. To reduce this variance, the as-prepared porous metal sheet 104 is surface treated to become hydrophobic by eliminating surface hydroxyl function groups. There are many ways to make a hydrophobic surface. In this example, the as-prepared metal sheet 104 is immersed in a methyl siloxane solvent and then the sheet 104 is heated in an oven at 100° C. for about 10 min. The metal sheet 104 turns hydrophobic. As shown in FIG. 32, a water droplet 3200 does not wet the metal sheet surface. Table 15 shows the testing results of a porous metal sheet 104 after the hydrophobic surface treatment. The porosity is 0.463, unchanged before and after the treatment, indicating that the treatment occurs on the surface. The break through pressures for pure air and for CB/air filtration all turn negative, which suggests that the gas permeation through the hydrophobic membrane surface is not affected by air humidity. Air permeance does not decrease with CB/air filtration, which suggests that the CB does not block the membrane surface and/or absorb into the membrane pore. No CB in the permeate air is detected, confirming complete removal of the CB by the present membrane.

TABLE 15

Filtration of 280 nm thermal CB with hydrophobic metal sheet membrane (49 μm thickness, 0.463 porosity, 28.3° C., 40% RH)

|  | Once-through | | Cross-flow (87 cm/s) |
| --- | --- | --- | --- |
|  | Air | CB/air | CB/air |
| CB loading in feed air, μg/m$^3$ | 0 | 1.85E+05 | 1.85E+05 |
| CB in permeate air, μg/m$^3$ | 0 | 0.00E+00 | 0.00E+00 |
| Permeance, mol/m$^2$/s/Pa | 4.2E−04 | 5.3E−04 | 4.4E−04 |
| Breakup pressure, Pa | −1.7E+02 | −1.1E+02 | −2.5E+01 |

To show the effectiveness of the present porous metal sheet membrane 104 for filtering of a wide range of CB particulates, a mixture of ECB (30 nm), lamp black (90 nm), rubber black (280 nm), and thermal back (280 nm) at 25 wt. % is used. Table 16 lists filtration testing results with the mixed CB. No CB in the permeate air is measured. The membrane sheet provides very high air permeance.

TABLE 16

Filtration of mixed CB (30-280 nm) with the hydrophobic porous metal sheet membrane (49 μm thickness, 0.454 porosity before and 0.454 after treatment)

|  | Once-through | | Cross-flow (87 cm/s) |
| --- | --- | --- | --- |
|  | Air | CB/air | CB/air |
| CB loading in feed air, μg/m$^3$ | 0 | 5.97E+04 | 5.97E+04 |
| CB in permeate air, μg/m$^3$ | 0 | 0.00E+00 | 0.00E+00 |
| Permeance, mol/m$^2$/s/Pa | 1.9E−03 | 1.8E−03 | 6.7E−04 |
| Break through pressure, Pa | 3.3E+01 | 2.7E+01 | −2.7E+01 |

Because the particles 3100 do not stick to the porous metal sheet membrane 104, the membrane 104 after filtration tests can be readily regenerated or cleaned. In a trial, the used membrane surface is gently swept with a cleanroom cloth wetted with 91% concentrated isopropanol (rubbing alcohol). In another trial, the used membrane surface is rinsed with 50/50 mixture of the 91% concentrate with water. The filtration testing results are summarized in Table 17. Both cleaning methods are effective. The air permeance for filtration of CB 3100 is even higher than pure air. This can be explained in that the in-house air may be purified in situ by the CB material. The results confirm that the membrane pores are not blocked or hindered by the CB particles 3100.

TABLE 17

Filtration of mixed CB (30-280 nm) with regenerated porous metal sheet membrane (49 μm thickness, membrane sheet porosity = 0.465)

| | Once-through | | Cross-flow (87 cm/s) |
|---|---|---|---|
| | Air | CB/air | CB/air |
| Wiped membrane surface | | | |
| CB loading in feed air, μg/m³ | 0 | 6.0E+04 | 6.0E+04 |
| CB in permeate air, μg/m³ | 0 | 0 | 0 |
| Permeance, mol/m²/s/Pa | 4.0E−04 | 4.7E−04 | 5.8E−04 |
| Break through pressure, Pa | 7.2E+01 | 7.1E+01 | −5.4E+01 |
| Flushed membrane surface | | | |
| CB loading in feed air, μg/m³ | 0 | 5.5E+04 | 5.5E+04 |
| CB in permeate air, μg/m³ | 0 | 0 | 0 |
| Permeance, mol/m²/s/Pa | 4.4E−04 | 5.1E−04 | 6.8E−04 |
| Break through pressure, Pa | 1.1E+02 | 9.6E+01 | −3.6E+01 |

Figure 33B:
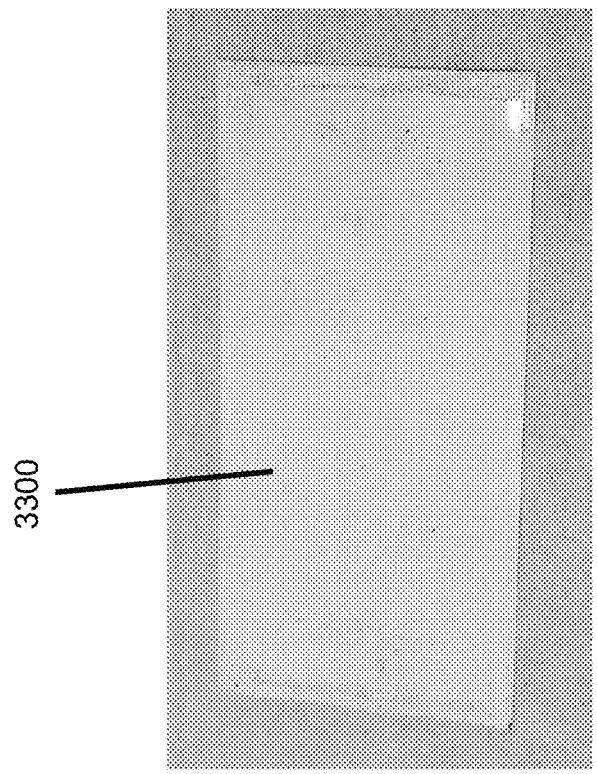
FIGS. 33A and 33B are photographs of a PES membrane after filtration of carbon black in air.
Figure 33A:
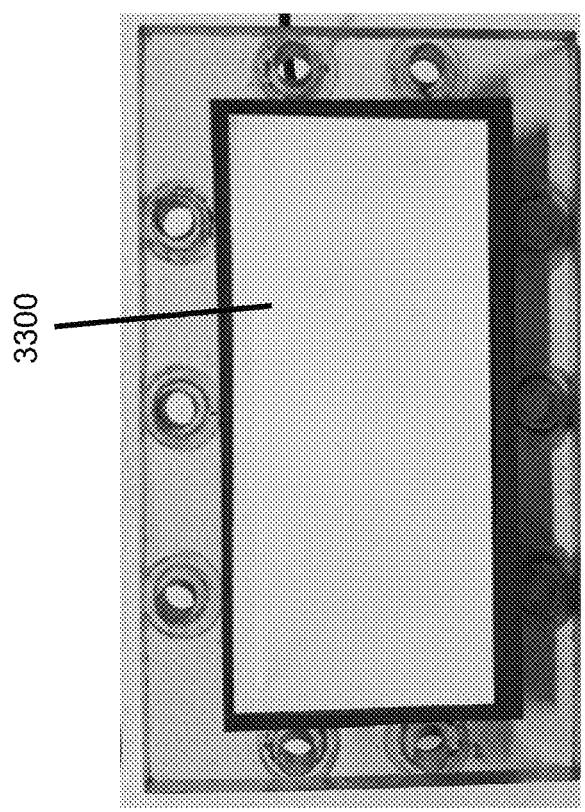

Example XV Filtration of Fine Particulates from Air with Polymeric Membrane Sheets for Comparison Polyether sulfone (PES) membrane sheets 3300 are tested for comparison. A membrane sheet 3300 is cut into 5.0 cm×11.0 cm coupon and tested in the same membrane cell as used for testing of the thin porous metal sheet membrane in the above examples. The results are summarized in Table 18. The two PES membrane sheets 3300 of respective 0.45 and 0.1 μm pore size specification have air permeance comparable to the porous metal sheets tested. However, the CB particle penetrates through these membranes. FIG. 33A shows no or little CB deposit on the 0.1 μm PES membrane surface after once-through tests of CB/air at different pressure gradients. The CB deposit becomes more evident on the back side of the membrane sheet (FIG. 33B), indicating penetration of the CB into and through the membrane 3300. The same phenomenon is observed with the 0.45 μm membrane sheet.

TABLE 18

Permeance of PES membrane sheets with air and CB/air (once-through, 280 nm thermal CB particles N990)

| | 119 μm thick PES membrane of 0.45 μm pore | | 131 μm thick PES membrane of 0.10 μm pore | |
|---|---|---|---|---|
| | Air | CB/air | Air | CB/air |
| Permeance, mol/m²/s/Pa | 7.5E−04 | 7.5E−04 | 2.1E−04 | 5.0E−04 |
| Break through pressure, Pa | 3.3E+01 | 2.5E+01 | 1.1E+02 | 5.0E+02 |

The collection efficiency of PES membranes 3300 of different pore sizes is determined by use of a 2.5 cm diameter disk filter. The PES membrane coupon 3300 is placed on a well-supported metal mesh 104 for filtering of a given volume of CB/air. The amount of CB 3100 collected by the membrane 3300 is measured by the weight change of the membrane coupon and normalized by the gas volume filtered. Table 19 shows that the CB content collected increases with decreasing PES pore size. To effectively collect the CB particles 3100, 0.03 μm PES membrane is used. Air permeance of this membrane is very low. Because of the absorption of CB particles 3102 inside these membranes, their regeneration becomes very difficult.

TABLE 19

Impact of PES membrane pore size on amount of CB collected on a once-through disk-filter (280 nm thermal CB N990)

| | CB loading, μg/m³ | | |
|---|---|---|---|
| PES membrane pore | 0.45 μm pore | 0.2 μm pore | 0.1 μm pore |
| CB/air feed 1 | | 2.0E+05 | 2.7E+05 |
| CB/air feed 2 | 5.9E+04 | 6.3E+04 | 1.2E+05 |

The invention claimed is:

1. A filtering device for removal of particulate matters having a size less than five micrometers from a fluid comprising:
    at least one feed channel configured to introduce a feed fluid to a membrane surface;
    at least one thin porous metal-based membrane sheet having a thickness in a range of 20 to 220 μm and a porosity in a range of 20 to 60%, wherein less than 20% of surface pores of the at least one thin porous metal-based membrane sheet have a size greater than 3 μm, and less than 1% of the surface pores have a size greater than 10 μm; and
    at least one channel for discharge of permeate away from the at least one thin porous metal-based membrane.

2. The filtering device of claim 1, wherein the at least one thin porous metal-based membrane sheet comprises greater than 60% by weight of nickel, a nickel alloy or a stainless steel.

3. The filtering device of claim 1, wherein the at least one thin porous metal-based membrane sheet comprises:
    a porous ceramic membrane layer disposed on a first surface of a porous metal support sheet, wherein the porous metal support sheet has a thickness in a range of 20 to 200 μm and a porosity in a range of 20 to 60%, wherein less than 20% of surface pores of the porous ceramic membrane layer have a size greater than 3 μm, and less than 1% of the surface pores have a size greater than 10 μm;
    wherein the porous ceramic membrane layer has a thickness above a surface of the porous metal support sheet in a range of about 0 to about 25 μm and has a penetration depth below a surface of the porous metal support sheet in a range of about 0 to about 10 μm; and
    wherein the porous ceramic membrane layer comprises primary ceramic particles having an average size in a range of 10 to 300 nm.

4. The filtering device of claim 3, wherein the primary ceramic particles comprise zirconia, ceria, alumina crystalline particles and mixture thereof.

5. The filtering device of claim 4, wherein the zirconia particles are doped with structural stabilizers and sintering promoters (M) at an atomic ratio of M/Zr in a range of 1/99 to 25/75.

6. The filtering device of claim 5, wherein the structural stabilizers and sintering promoters (M) comprise yttrium oxide, nickel oxide, iron oxide, cobalt oxide, manganese oxide, silicone oxide, silicates, or mixtures thereof.

7. The filtering device of claim 4, wherein the ceria particles are doped with structural stabilizers and sintering promoters (M) at an atomic ratio of M/Zr in a range of 1/99 to 25/75.

8. The filtering device of claim 7, wherein the structural stabilizers and sintering promoters (M) comprise alkaline earth metal oxide, rare earth metal oxide, nickel oxide, iron oxide, cobalt oxide, manganese oxide, or mixtures thereof.

9. The filtering device of claim 1, wherein the at least one thin porous metal-based membrane sheet is sintered at temperatures in a range of 500 to 1000° C. in a non-oxidizing gas environment.

10. The filtering device of claim 9, wherein the non-oxidizing gas environment comprises hydrogen, nitrogen, or their mixture.

11. The filtering device of claim 3, wherein the porous ceramic membrane layer comprises surface pores having a size in a range of 50 to 200 nm.

12. The filtering device of claim 3, wherein the porous ceramic membrane layer has surface pore sizes in a range of 10 to 50 nm.

13. The filtering device of claim 3, wherein the porous ceramic membrane layer has surface pore sizes in a range of 2 to 10 nm.

14. The filtering device of claim 1, wherein the at least one feed channel comprises a straight channel with a hydraulic diameter less than 1 mm.

15. The filtering device of claim 1, wherein the at least one channel for discharge of the permeate comprises a straight channel with a hydraulic diameter less than 1 mm.

16. The filtering device of claim 1, wherein the at least one thin porous metal-based membrane sheet is hydrophobic.

17. The filtering device of claim 1, wherein the fluid comprises gas or air.

18. The filtering device of claim 1, wherein the fluid comprises liquid or water.

19. A filtering device for removal of particulate matters having a size less than five micrometers and adsorbable species from a fluid comprising:
- at least one feed channel configured to introduce a feed fluid to a membrane surface;
- at least one thin porous metal-based membrane sheet having a thickness in a range of 20 to 200 μm and a porosity in a range of 20 to 60%, wherein less than 20% of the surface pores of the at least one thin porous metal-based membrane sheet have a size greater than 10 μm;
- at least one adsorbent material distributed over a membrane area at a thickness about 20 μm to about 10 mm to take up the adsorbable species from the fluid permeated through the at least one thin porous metal-based membrane sheet;
- at least one channel for discharge of permeate away from the at least one thin porous metal-based membrane sheet and adsorbent material.

20. The filtering device of claim 1, wherein the at least one feed channel comprises a straight channel with a hydraulic diameter in a range from about 0.5 mm to about 3.0 mm.

21. The filtering device of claim 1, wherein the at least one channel for discharge of the permeate comprises a straight channel with a hydraulic diameter in a range from about 0.5 mm to about 3.0 mm.

* * * * *